(12) United States Patent
Ikai

(10) Patent No.: US 11,044,493 B2
(45) Date of Patent: Jun. 22, 2021

(54) PREDICTION IMAGE GENERATION DEVICE, MOVING IMAGE DECODING DEVICE, AND MOVING IMAGE CODING DEVICE

(71) Applicant: SHARP KABUSHIKI KAISHA, Sakai (JP)

(72) Inventor: Tomohiro Ikai, Sakai (JP)

(73) Assignee: SHARP KABUSHIKI KAISHA, Sakai (JP)

( * ) Notice: Subject to any disclaimer, the term of this patent is extended or adjusted under 35 U.S.C. 154(b) by 258 days.

(21) Appl. No.: 16/074,049

(22) PCT Filed: Jan. 26, 2017

(86) PCT No.: PCT/JP2017/002764
§ 371 (c)(1),
(2) Date: Jul. 30, 2018

(87) PCT Pub. No.: WO2017/135151
PCT Pub. Date: Aug. 10, 2017

(65) Prior Publication Data
US 2019/0045218 A1 Feb. 7, 2019

(30) Foreign Application Priority Data
Feb. 1, 2016 (JP) .............................. JP2016-017444

(51) Int. Cl.
*H04N 19/59* (2014.01)
*H04N 19/513* (2014.01)
(Continued)

(52) U.S. Cl.
CPC ............. *H04N 19/59* (2014.11); *H04N 19/45* (2014.11); *H04N 19/513* (2014.11); *H04N 19/52* (2014.11); *H04N 19/523* (2014.11)

(58) Field of Classification Search
CPC .............................. H04N 19/59; H04N 19/45
See application file for complete search history.

(56) References Cited

U.S. PATENT DOCUMENTS

2002/0167424 A1* 11/2002 Kondo ............. G11B 20/00086
341/50
2004/0240550 A1* 12/2004 Suzuki ................. H04N 19/523
375/240.16
(Continued)

FOREIGN PATENT DOCUMENTS

WO 2015/009068 A1 1/2015

OTHER PUBLICATIONS

Jian Lou et al., CE3: Fixed Interpolation filter tests by Motorola Mobility, Joint Collaborative Team on Video Coding of ITU-T SG16 WP3 and ISO/IEC JTC1/SC29/WG11, 6th Meeting: Torino IT, Jul. 14-22, 2011; JCTVC-F574r2.
(Continued)

*Primary Examiner* — Jerry T Jean Baptiste
(74) *Attorney, Agent, or Firm* — ScienBiziP, P.C.

(57) ABSTRACT

Coding efficiency is improved. A motion compensation filter unit acts on a motion vector applied image obtained by acting a motion vector on a reference image. The motion compensation filter unit causes filter coefficients mcFilter[i][k] designated by a phase i and a filter coefficient position k to act on the motion vector applied image. The filter coefficients mcFilter[i][k] includes filter coefficients calculated by using filter coefficients mcFilter[p][k] (p≠i) and filter coefficients mcFilter[q][k] (q≠i).

7 Claims, 30 Drawing Sheets

(51) Int. Cl.
*H04N 19/523* (2014.01)
*H04N 19/52* (2014.01)
*H04N 19/44* (2014.01)

(56) References Cited

U.S. PATENT DOCUMENTS

| | | | |
|---|---|---|---|
| 2010/0284392 A1* | 11/2010 | Sato | G10L 19/038 |
| | | | 370/342 |
| 2013/0077886 A1* | 3/2013 | Kondo | G06T 9/004 |
| | | | 382/238 |
| 2013/0182780 A1 | 7/2013 | Alshin et al. | |
| 2016/0156912 A1 | 6/2016 | Alshina et al. | |

OTHER PUBLICATIONS

Jianle Chen et al., CE4: Experimental results of DCTIF application for Chroma MC by Samsung, Joint Collaborative Team on Video Coding of ITU-T SG16 WP3 and ISO/IEC JTC1/SC29/WG11, 4th Meeting: Daegu KR, Jan. 20-28, 2011;JCTVC-D347.
Video/JVET, "Algorithm Description of Joint Exploration TestModel 1 (JEM 1)", International Organization for Standardization Organisation Internationale De Normalisation ISO/IEC JCT1/SC29/WG11 Coding of Moving Pictures and Audio, ISO/IEC JCT1/SC29/WG11/N15790, Oct. 2015, Geneva, CH.
Tsukuba T et al.: "SCE3: Results of test 3.6 on Generalized Residual Prediction with shorter-tap MC filter", Joint Collaborative Team on Video Coding (JCT-VC), Apr. 15, 2013.
Alshina E et al.: "About phase calculation and up-sampling filter coefficients in JCTV-M0188 and CTV-M0322", Joint Collaborative Team on Video Coding (JCT-VC), Apr. 17, 2013.

\* cited by examiner

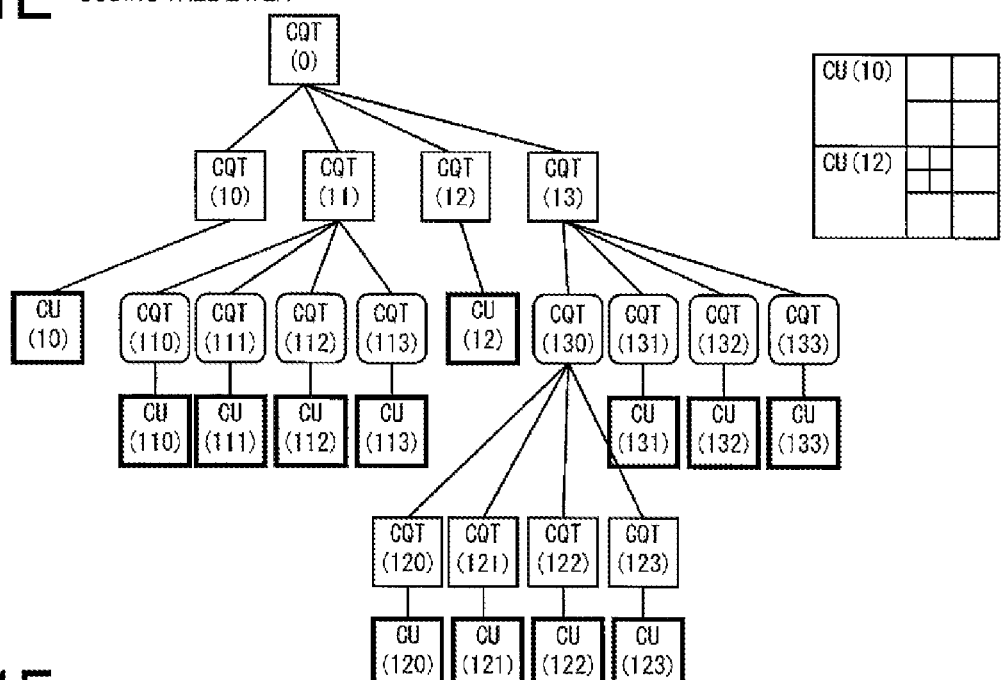

FIG. 2A
2Nx2N
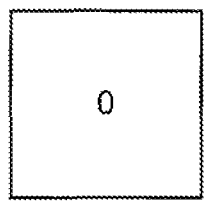
FIG. 2B
2NxN
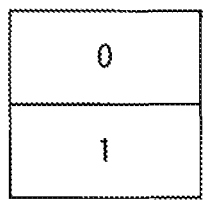
FIG. 2C
2NxnU
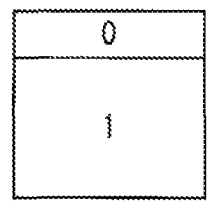
FIG. 2D
2NxnD
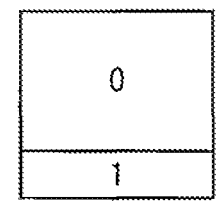
FIG. 2E
Nx2N
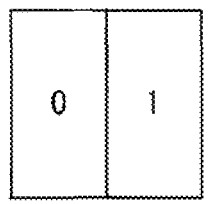
FIG. 2F
nLx2N
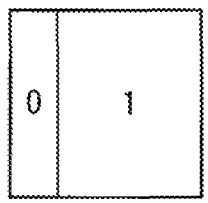
FIG. 2G
nRx2N
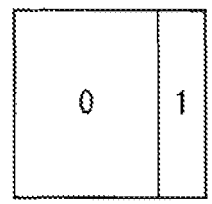
FIG. 2H
NxN
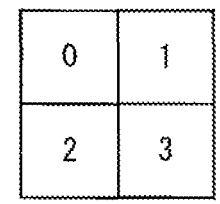
refIdxLX
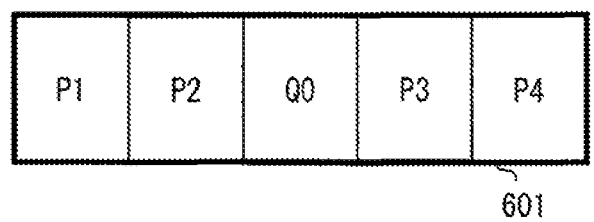
FIG. 3

FIG. 24A

|  | BASIC VECTOR ACCURACY | blkW >= 64 | blkW < 64 |
|---|---|---|---|
| I | 1/8pel (mvBaseAccu=3) | shiftS=0 (1/8pel) | shiftS=1 (1/4pel) |
| II | 1/16pel (mvBaseAccu=4) | shiftS=0 (1/16pel) | shiftS=2 (1/4pel) |
| III | 1/64pel (mvBaseAccu=6) | shiftS=0 (1/64pel) | shiftS=4 (1/4pel) |

FIG. 24B

| BASIC VECTOR ACCURACY | blkW >= 64 | blkW >= 32 && blkW < 64 | blkW < 32 |
|---|---|---|---|
| 1/64pel | shiftS=0 (1/64pel) | shiftS=2 (1/16pel) | shiftS=4 (1/4pel) |

FIG. 24C

| BASIC VECTOR ACCURACY | blkW >= 128 | blkW >= 64 && blkW < 128 | blkW >= 32 && blkW < 64 | blkW >= 16 && blkW < 32 | blkW < 16 |
|---|---|---|---|---|---|
| 1/64pel | shiftS=0 (1/64pel) | shiftS=1 (1/32pel) | shiftS=2 (1/16pel) | shiftS=3 (1/8pel) | shiftS=4 (1/4pel) |

USING MOTION VECTOR ACCURACY FLAG TOGETHER

FIG. 25A

| BASIC VECTOR ACCURACY | VECTOR ACCURACY FLAG | GREAT BLOCK SIZE | SMALL BLOCK SIZE |
|---|---|---|---|
| 1/16pel | mvd_dequant_flag = 0 | shiftS=0 | shiftS=2 |
|  | mvd_dequant_flag = 1 | shiftS=4 (FULL PEL) | shiftS=4 (FULL PEL) |

FIG. 25B

| BASIC VECTOR ACCURACY | VECTOR ACCURACY FLAG | GREAT BLOCK SIZE | SMALL BLOCK SIZE |
|---|---|---|---|
| 1/16pel | mvd_dequant_flag = 0 | shiftS=0 | shiftS=2 |
|  | mvd_dequant_flag = 1 | shiftS=3 (HALF PEL) | shiftS=4 (FULL PEL) |

FIG. 25C

| BASIC VECTOR ACCURACY | VECTOR ACCURACY FLAG | GREAT BLOCK SIZE | SMALL BLOCK SIZE |
|---|---|---|---|
| 1/16pel | mvd_dequant_flag = 0 | shiftS=0 | shiftS=1 |
|  | mvd_dequant_flag = 1 | shiftS=2 | shiftS=3 (HALF PEL) |

WITHOUT MOTION VECTOR ACCURACY FLAG

FIG. 26A

| QP |  | QP<24 | QP>=24 |  |  |
|---|---|---|---|---|---|
| shiftS |  | 0 | 1 |  |  |

FIG. 26B THREE BRANCH

| QP | QP<12 |  | QP>=12 && QP<36 |  | QP>=36 |
|---|---|---|---|---|---|
| shiftS | 0 |  | 1 |  | 2 |

FIG. 26C FIVE BRANCH

| QP | QP<12 | QP>=12 && QP<18 | QP>=18 && QP<24 | QP>=24 && QP<36 | QP>=36 |
|---|---|---|---|---|---|
| shiftS | 0 | 1 | 2 | 3 | 4 |

USING MOTION VECTOR ACCURACY FLAG TOGETHER

| BASIC VECTOR ACCURACY | VECTOR ACCURACY FLAG | SMALL QP | GREAT QP |
|---|---|---|---|
| 1/16pel | mvd_dequant_flag = 0 | shiftS=0 | shiftS=2 |
| | mvd_dequant_flag = 1 | shiftS=4 (FULL PEL) | shiftS=4 (FULL PEL) |

| BASIC VECTOR ACCURACY | VECTOR ACCURACY FLAG | SMALL QP | GREAT QP |
|---|---|---|---|
| 1/16pel | mvd_dequant_flag = 0 | shiftS=0 | shiftS=4 |
| | mvd_dequant_flag = 1 | shiftS=3 (HALF PEL) | shiftS=4 (FULL PEL) |

FILTER COEFFICIENTS mcFilter OF PHASE i (0-NPHASES-1)
AND COEFFICIENT POSITION k(0-NTAPS-1)

```
mcFilter[NPHASES][NTAPS] =
{
  {  0, 0,   0, 64,  0,   0, 0,  0 },
  {  0, 1,  -3, 63,  4,  -2, 1,  0 },
  { -1, 2,  -5, 62,  8,  -3, 1,  0 },
  { -1, 3,  -8, 60, 13,  -4, 1,  0 },
  { -1, 4, -10, 58, 17,  -5, 1,  0 },
  { -1, 4, -11, 52, 26,  -8, 3, -1 },
  { -1, 3,  -9, 47, 31, -10, 4, -1 },
  { -1, 4, -11, 45, 34, -10, 4, -1 },
  { -1, 4, -11, 40, 40, -11, 4, -1 },
  { -1, 4, -10, 34, 45, -11, 4, -1 },
  { -1, 4, -10, 31, 47,  -9, 3, -1 },
  { -1, 3,  -8, 26, 52, -11, 4, -1 },
  {  0, 1,  -5, 17, 58, -10, 4, -1 },
  {  0, 1,  -4, 13, 60,  -8, 3, -1 },
  {  0, 1,  -3,  8, 62,  -5, 2, -1 },
  {  0, 1,  -2,  4, 63,  -3, 1,  0 }
};
```

```
mcFilter[NPHASES][NTAPS] =
{
    {  0,  0,   0, 64,  0,   0, 0,  0 },
    {  0,  1,  -3, 63,  4,  -2, 1,  0 },
    { -1,  2,  -5, 62,  8,  -3, 1,  0 },
    { -1,  3,  -8, 60, 13,  -4, 1,  0 },
    { -1,  4, -10, 58, 17,  -5, 1,  0 },
    { -1,  4, -11, 52, 26,  -8, 3, -1 },
    { -1,  3,  -9, 47, 31, -10, 4, -1 },
    { -1,  4, -11, 45, 34, -10, 4, -1 },
    { -1,  4, -11, 40, 40, -11, 4, -1 },
    { -1,  4, -10, 34, 45, -11, 4, -1 },
    { -1,  4, -10, 31, 47,  -9, 3, -1 },
    { -1,  3,  -8, 26, 52, -11, 4, -1 },
    {  0,  1,  -5, 17, 58, -10, 4, -1 },
    {  0,  1,  -4, 13, 60,  -8, 3, -1 },
    {  0,  1,  -3,  8, 62,  -5, 2, -1 },
    {  0,  1,  -2,  4, 63,  -3, 1,  0 }
};
```

FIG. 32B

```
mcFilter[NPHASES][NTAPS] =
{
    {  0,  0,   0, 64,  0,   0, 0,  0 },
    {  0,  1,  -3, 63,  4,  -2, 1,  0 },
    { -1,  2,  -5, 62,  8,  -3, 1,  0 },
    { -1,  3,  -8, 60, 13,  -4, 1,  0 },
    { -1,  4, -10, 58, 17,  -5, 1,  0 },
    { -1,  4, -11, 52, 26,  -8, 3, -1 },
    { -1,  3,  -9, 47, 31, -10, 4, -1 },
    { -1,  4, -11, 45, 34, -10, 4, -1 },
    { -1,  4, -11, 40, 40, -11, 4, -1 },
    { -1,  4, -10, 34, 45, -11, 4, -1 },
    { -1,  4, -10, 31, 47,  -9, 3, -1 },
    { -1,  3,  -8, 26, 52, -11, 4, -1 },
    {  0,  1,  -5, 17, 58, -10, 4, -1 },
    {  0,  1,  -4, 13, 60,  -8, 3, -1 },
    {  0,  1,  -3,  8, 62,  -5, 2, -1 },
    {  0,  1,  -2,  4, 63,  -3, 1,  0 }
};
```

PREDICTION IMAGE GENERATION DEVICE, MOVING IMAGE DECODING DEVICE, AND MOVING IMAGE CODING DEVICE

TECHNICAL FIELD

The disclosure relates to a prediction image generation device, a video decoding device, and a video coding device.

BACKGROUND ART

In order to efficiently transmit or record a video, there have been used a video coding device which generates coded data by coding a video, and a video decoding device which generates a decoded image by decoding the coded data.

Specific examples of a video coding scheme include schemes proposed in H.264/MPEG-4. AVC or High-Efficiency Video Coding (HEVC).

In such a video coding scheme, images (pictures) constituting a video are managed by a hierarchical structure including slices obtained by diving the images, units of coding (also referred to as Coding Units) obtained by dividing the slices, and prediction units (PUs) and transform units (TUs) which are blocks obtained by dividing the coding units, and each block is coded/decoded.

In such a video coding scheme, generally, an input image is coded/decoded to obtain a local decoded image, based on which local decoded image a prediction image is generated, the prediction image is subtracted from the input image (original image) to obtain a prediction residual (also referred to as a "difference image" or a "residual image"), and the prediction residual is coded. Examples of a method for generating a prediction image include inter-prediction, and intra-prediction.

Examples of recent technologies of video coding and decoding include NPL 1.

CITATION LIST

Non Patent Literature

NPL 1: Video/JVET, "Algorithm Description of Joint Exploration TestModel 1 (JEM 1)", INTERNATIONAL ORGANIZATION FOR STANDARDIZATION ORGANISATION INTERNATIONALE DE NORMALISATION ISO/IEC JTC1/SC29/WG11 CODING OF MOVING PICTURES AND AUDIO, ISO/IEC JTC1/SC29/WG11/N15790, October 2015, Geneva, CH.

SUMMARY

Technical Problem

In the recent technologies of video coding and decoding, a motion compensation filter is used in motion compensation processing when a prediction image is generated. On the other hand, an increase in accuracy of motion compensation increases necessary filter coefficients, and a first problem arises that a capacity of a memory needed to store filter coefficients increases.

Further, in the recent technologies of video coding and decoding, a prediction image is generated by using a motion vector with high accuracy. On the other hand, a code amount of a difference vector increases to use a motion vector with high accuracy. Thus, a second problem arises that coding efficiency is not necessarily improved.

The disclosure provides an image decoding device, an image coding device, and a prediction image generation device capable of solving at least any of the first and second problems.

Solution to Problem

To solve the above-described problems, a prediction image generation device according to one aspect of the disclosure is a prediction image generation device for generating a prediction image by performing motion compensation on a reference image. The prediction image generation device includes a filter unit configured to act on a motion vector applied image with 1/Mac pixel accuracy obtained by acting a motion vector on the reference image, wherein the filter unit causes filter processing using filter coefficients mcFilter[i][k] designated by a phase i (where i is an integer of 0 or greater and Mac−1 or less) and a filter coefficient position k (where k is an integer of 0 or greater and Ntaps−1 or less, Ntaps is the number of taps) to act on the motion vector applied image, and the filter coefficients mcFilter[i][k] have a relationship of a weighted average between filter coefficients mcFilter[p][k] (P≠i) and filter coefficients mcFilter[q][k] (Q≠i).

To solve the above-described problems, a prediction image generation device according to one aspect of the disclosure is a prediction image generation device for generating a prediction image for each prediction block by performing motion compensation on a reference image, the prediction image generation device including: a motion vector derivation unit configured to derive a motion vector for each prediction block by adding a difference vector to a prediction vector or subtracting the difference vector from the prediction vector, wherein the motion vector derivation unit switches accuracy of a motion vector derived for the prediction block according to the size of the prediction block.

To solve the above-described problems, a prediction image generation device according to one aspect of the disclosure is a prediction image generation device for generating a prediction image for each prediction block by performing motion compensation on a reference image, the prediction image generation device including: a motion vector derivation unit configured to derive a motion vector for each prediction block by adding a difference vector to a prediction vector or subtracting the difference vector from the prediction vector, wherein the motion vector derivation unit switches accuracy of the motion vector derived for the prediction block according to magnitude of a quantization parameter for the prediction block.

To solve the above-described problems, a prediction image generation device according to one aspect of the disclosure is a prediction image generation device for generating a prediction image by performing motion compensation on a reference image, the prediction image generation device including: a motion vector derivation unit configured to derive a motion vector by adding a dequantized difference vector to a prediction vector or subtracting the dequantized difference vector from the prediction vector, wherein the motion vector derivation unit switches accuracy of dequantization processing on a difference vector according to a quantization value of the quantized difference vector.

To solve the above-described problems, a prediction image generation device according to one aspect of the disclosure is a prediction image generation device for generating a prediction image by performing motion compensation on a reference image, the prediction image generation device including: a motion vector derivation unit configured to derive a motion vector by adding a difference vector to a prediction vector or subtracting the difference vector from the prediction vector, wherein the motion vector derivation unit switches accuracy of dequantization processing on the difference vector according to a quantization value of a quantized difference vector in a case that a flag indicating accuracy of the motion vector indicates a first value, and performs the dequantization processing on the difference vector with fixed accuracy regardless of a quantization value of the quantized difference vector in a case that the flag indicating accuracy of the motion vector indicates a second value.

To solve the above-mentioned problems, a prediction image generation device according to one aspect of the disclosure is a prediction image generation device for generating a prediction image by performing motion compensation on a reference image, the prediction image generation device including: a motion vector derivation unit configured to derive a motion vector by adding a difference vector to a prediction vector or subtracting the difference vector from the prediction vector, wherein the motion vector derivation unit switches accuracy of dequantization processing on the difference vector between first accuracy and second accuracy according to a quantization value of a quantized difference vector in a case that a flag indicating accuracy of the motion vector indicates a first value, switches the accuracy of the dequantization processing on the difference vector between third accuracy and fourth accuracy according to the quantization value of the quantized difference vector in a case that a flag indicating the accuracy of the motion vector indicates a second value, and at least any of the first accuracy and the second accuracy has higher accuracy than the third accuracy and the fourth accuracy.

Advantageous Effects of Invention

According to the configuration above, at least any of the first and second problems can be solved.

BRIEF DESCRIPTION OF DRAWINGS

FIGS. 1A to 1F are diagrams illustrating a hierarchical structure of data of a coded stream according to the present embodiment.

FIGS. 2A to 2H are diagrams illustrating patterns for a PU partition mode. FIGS. 2A to 2H respectively illustrate partition shapes in cases that the PU partition mode is 2N×2N, 2N×N, 2N×2N×nD, N×2N, nL×2N, nR×2N, and N×N.

FIG. 3 is a conceptual diagram illustrating an example of a reference picture list.

FIGS. 24A to 24C are tables illustrating a relationship between basic vector accuracy according to the present embodiment and a parameter (shiftS) indicating motion vector accuracy configured (switched) depending on a block size of a target block.

FIGS. 25A to 25C are tables illustrating a relationship between basic vector accuracy and a parameter (shiftS) indicating motion vector accuracy configured (switched) depending on a block size of a target block and a motion vector accuracy flag according to the present embodiment.

FIGS. 26A to 26C are tables illustrating a parameter shiftS) indicating motion vector accuracy configured (switched) depending on QP according to the present embodiment.

FIG. 31 is a diagram illustrating one example of filter coefficients according to the present embodiment.

FIG. 32A is a diagram illustrating an example in which the motion compensation filter unit according to the present embodiment calculates filter coefficients of an odd phase from filter coefficients of an even phase. FIG. 32B is a diagram illustrating an example in which the motion compensation filter unit according to the present embodiment calculates filter coefficients of an even phase from filter coefficients of an odd phase.

FIG. 33A illustrates the transmission device equipped with the image coding device and FIG. 33B illustrates the reception device equipped with the image decoding device.

FIG. 34A illustrates the recording device equipped with the image coding device and FIG. 34B illustrates the reproducing device equipped with the image decoding device.

DESCRIPTION OF EMBODIMENTS

First Embodiment

Hereinafter, embodiments of the disclosure are described in detail with reference to the drawings.

Figure 14:
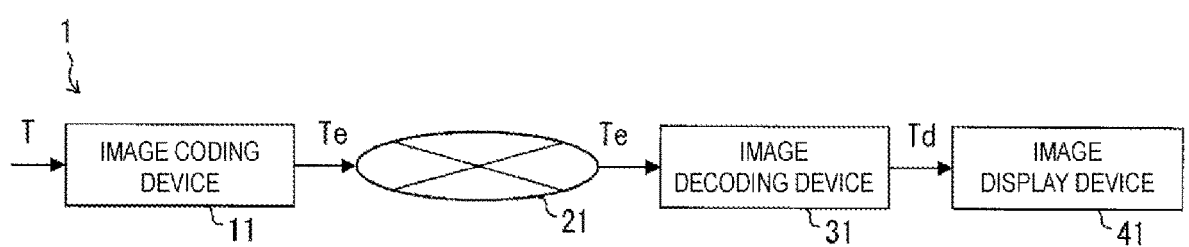
FIG. 14 is a schematic diagram illustrating a configuration of an image transmission system according to an embodiment of the disclosure.

FIG. 14 is a schematic diagram illustrating a configuration of an image transmission system 1 according to the present embodiment.

The image transmission system 1 is a system in which a code obtained by coding a coding target image is transmitted and the image obtained by decoding the transmitted code is displayed. The image transmission system 1 is configured to include an image coding device (video coding device) 11, a network 21, an image decoding device (video decoding device) 31, and an image display device 41.

Signals T representing an image of a single layer or multiple layers are input to the image coding device 11. A layer is a concept used to distinguish multiple pictures in a case that a certain time period is constituted by one or more pictures. For example, scalable coding applies in a case that the same picture is coded in multiple layers which are different in an image quality or resolution, and view scalable coding applies in a case that pictures different in a viewpoint are coded in multiple layers. In a case that prediction is performed between pictures of multiple layers (inter-layer prediction, inter-view prediction), the coding efficiency is highly improved. Even in a case that prediction is not performed (simulcast), the coded data can be collected.

The network 21 transmits a coded stream Te generated by the image coding device 11 to the image decoding device 31. The network 21 includes the Internet, a Wide Area Network (WAN), or a Local Area Network (LAN), or a combination thereof. The network 21 is not necessarily limited to a bidirectional communication network, but may be a unidirectional or bidirectional communication network transmitting broadcast waves such as digital terrestrial broadcasting and satellite broadcasting. The network 21 may be substituted by a storage medium in which the coded stream Te is recorded such as a Digital Versatile Disc (DVD) and a Blue-ray Disc (BD).

The image decoding device 31 decodes each coded stream Te transmitted by the network 21, and generates one or multiple decoded layer images Td (decoded viewpoint images Td).

The image display device 41 displays all or some of one or multiple decoded layer images Td generated by the image decoding device 31. For example, in the view scalable coding, in the case of displaying all, a three-dimensional image (stereoscopic image) or free-viewpoint image is displayed, and in the case of displaying some, a two-dimensional image is displayed. The image display device 41 includes a display device, for example, a liquid crystal display and an organic Electro-luminescence (EL) display. In spatial scalable coding and SNR scalable coding, the image decoding device 31 and the image display device 41 display an enhancement layer image which is higher in an image quality in a case of having high processing capability. The image decoding device 31 and the image display device 41 display a base layer image for which the required processing capability and display capability are not as high as the enhancement layer in a case of having only lower processing capability.

Structure of Coded Stream Te

Before describing in detail, for the image coding device 11 and the image decoding device 31 according to the present embodiment, a description is given of a data structure of the coded stream Te which is generated by the image coding device 11 and decoded by the image decoding device 31.

FIGS. 1A to 1F are diagrams illustrating a hierarchical structure of data in the coded stream Te. The coded stream Te exemplarily contains a sequence and multiple pictures constituting the sequence. FIGS. 1A to 1F are diagrams respectively illustrating a sequence layer specifying a sequence SEQ, a picture layer specifying a picture PICT, a slice layer specifying a slice S, a slice data layer specifying slice data, a coding tree layer specifying a coded tree unit included in the slice data, and a coded unit layer specifying a Coding Unit (CU) included in the coding tree.

Sequence Layer

The sequence layer specifies a set of data to which the image decoding device 31 refers in order to decode the sequence SEQ to be processed (hereinafter, also referred to as a target sequence). The sequence SEQ contains, as illustrated in FIG. 1A, a Video Parameter Set, a Sequence Parameter Set (SPS), a Picture Parameter Set (PPS), a picture PICT, and Supplemental Enhancement information (SEI). Here, a value following "#" indicates a layer ID. FIGS. 1A to 1F illustrate examples in which there is coded data of #0 and #1, that is, a layer 0 and a layer 1, but types of layer and the number of layers are not limited thereto.

The video parameter set VPS specifies, for a video configured with multiple layers, set of coding parameters common to multiple videos and a set of coding parameters associated with multiple layers and individual layers contained in the video.

The sequence parameter set SPS specifies a set of coding parameters to which the image decoding device 31 refers in order to decode the target sequence. For example, a width and height of a picture are specified. There may be multiple SPSs. In this case, any of multiple SPSs is selected from the PPS.

The picture parameter set PPS specifies a set of coding parameters to which the image decoding device 31 refers in order to decode pictures in the target sequence. For example, the PPS includes a reference value of a quantization width (pic_init_qp_minus26) used to decode the picture and a flag indicating that a weighted prediction is applied (weighted_pred_flag). There may be multiple PPSs. In this case, any of multiple PPSs is selected from the pictures in the target sequence.

Picture Layer

The picture layer specifies a set of data to which the image decoding device 31 refers in order to decode a picture PICT to be processed (hereinafter, also referred to as a target picture). The picture PICT contains slices S0 to SNS-1 (NS represents the total number of slices contained in the picture PICT) as illustrated in FIG. 1B.

Hereinafter, the slices S0 to SNS-1 may be expressed with their suffixes omitted in a case of being not necessary to be distinguished from each other. The same holds for other data with a suffix which is contained in the coded stream Te described below.

Slice Layer

The slice layer specifies a set of data to which the image decoding device 31 refers in order to decode a slice S to be processed (also referred to as a target slice). The slice S contains a slice header SH and slice data SDATA, as illustrated in FIG. IC.

The slice header SH contains a coding parameter group to which the image decoding device 31 refers in order to determine a method of decoding a target slice. Slice type specifying information specifying a slice type (slice_type) is an example of the coding parameter contained in the slice header SH.

Examples of the slice type specifiable by the slice type specifying information include (1) I slice that is coded using intra prediction only, (2) P slice that is coded using unidirectional prediction or intra-prediction, and (3) B slice that is coded using unidirectional prediction, bidirectional prediction, or intra prediction.

The slice header SH may include reference to the picture parameter set PPS (pic_parameter_set_id) which is contained in the above sequence layer.

Slice Data Layer

The slice data layer specifies a set of data to which the image decoding device 31 refers in order to decode slice data SDATA to be processed. The slice data SDATA contains a Coded Tree Block (CTB) as illustrated in FIG. 1D. The CTB is a block having a fixed size (e.g., 64×64) constituting a slice, and may be also referred to as a Largest Cording Unit (LCU) or a Coded Tree Unit (CTU).

Coding Tree Layer

The coding tree layer specifies a set of data to which the image decoding device 31 refers in order to decode a coded tree block to be processed as illustrated in FIG. 1E. The coded tree block is partitioned by recursive quadtree partitioning. A node of a tree structure obtained by the recursive quadtree partitioning is called a coding tree. An intermediate node of the quadtree is a Coded Quad Tree (CQT) and the coded tree block itself is specified as a top CQT. The CQT contains a split flag (split_flag), and is partitioned into four coded tree units CQTs in a case that split_flag is 1. In a case that split_flag is 0, the coded tree unit CQT is not partitioned and has one Coded Unit (CU) as a node. The coded unit CU is a terminal node of the coding tree layer and is not partitioned any further in this layer. The coding unit CU is a basic unit for coding processing.

In a case that a size of the coded tree block CTB is 64×64 pixel, a size of the coded unit may be any of 64×64 pixel, 32×32 pixel, 16×16 pixel, and 8×8 pixel.

Coded Unit Layer

The coded unit layer specifies a set of data to which the image decoding device 31 refers in order to decode a coded unit to be processed, as illustrated in FIG. 1F. Specifically, the coding unit includes a coding tree, a prediction tree, a transform tree, and a CU header CUF. The coding tree specifies a split flag, a division pattern, a prediction mode, and the like.

The prediction tree specifies prediction information (reference picture index, motion vector, and the like) of each of prediction blocks which are obtained by partitioning the coded unit into one or multiple pieces. In other words, the prediction block/blocks is/are one or multiple non-overlapping areas which constitute the coding unit. The prediction tree includes one or multiple prediction blocks which are obtained by the above partitioning. Hereinafter, a unit of prediction obtained by further partitioning the prediction block is called a "sub-block". The sub-block (prediction block) is configured with one or multiples pixel. In a case that a size of the prediction block is equal to a size of the sub-block, the number of sub-blocks in the prediction block is one. In a case that a size of the prediction block is larger than a size of the sub-block, the prediction block is partitioned into the sub-blocks. For example, in a case that a size of the prediction block is 8×8 and a size of the sub-block is 4×4, the prediction block is partitioned horizontally into two and vertically into two to be partitioned into four sub-blocks.

Prediction processing is performed for each of these prediction blocks (sub-blocks). Hereinafter, the prediction block as a unit of prediction is also referred to as a prediction unit (PU).

A type of partition for the prediction tree is roughly classified into two for a case of the intra prediction and a case of the inter prediction. The intra prediction is prediction within an identical picture, and the inter prediction is prediction processing performed between pictures different from each other (e.g., between display times, between layer images).

In the case of the intra prediction, a partition method includes methods using 2N×2N (the same size as the coding unit) and N×N.

In the case of the inter prediction, a partition method includes coding in a PU partition mode (part_mode) in the coded data. The partitioning includes types of 2N×2N (the same size as the coding unit), 2N×N, 2N×nU, 2N×nD, N×2N, nL×2N, nR×2N, and N×N. Note that 2N×nU indicates that a 2N×2N coding unit are partitioned into two areas, 2N×0.5N and 2N×1.5N, in this order from the upside. 2N×nD indicates that a 2N×2N coding unit is partitioned into two areas, 2N×1.5N and 2N×0.5N, in this order from the upside. nL×2N indicates that a 2N×2N coding unit is partitioned into two areas, 0.5N×2N and 1.5N×2N, in this order from the left. nR×2N indicates that a 2N×2N coding unit is partitioned into two areas, 1.5N×2N and 0.5N×1.5N, in this order from the left. The number of partitions is any of 1, 2, or 4, and thus, the number of PUs included in the CU is 1 to 4. These PUs are expressed as PU0, PU1, PU2, and PU3 in this order.

Each of FIGS. 2A to 2H specifically illustrates a boundary location of PU partitioning in the CU for each partition type.

FIG. 2A illustrates a PU partition mode for 2N×2N in which the CU is not partitioned.

FIGS. 2B to 2D illustrate respectively partition shapes in cases that the PU partition modes are 2N×N, 2N×nU, and 2N×nD. Hereinafter, the partitions in the cases that the PU partition modes are 2N×N, 2N×nU, and 2N×nD are collectively referred to as a horizontally-long partition.

FIGS. 2E to 2G illustrate respectively partition shapes in the cases that the PU partition modes are N×2N, nL×2N, and nR×2N. Hereinafter, the partitions in the case that the PU partition types are N×2N, nL×2N, and nR×2N are collectively referred to as a vertically-long partition.

The horizontally-long partition and the vertically-long partition are collectively referred to as a rectangular partition.

FIG. 2H illustrates a partition shape in a case that the PU partition mode is N×N. The PU partition modes in FIGS. 2A and 2H are also referred to as square partitioning based on their partition shapes. The PU partition modes in of FIGS. 2B and 2G are also referred to as non-square partitioning.

In FIGS. 2A to 2H, the number assigned to each area indicates an identification number of the area, and the areas are processed in an order of the identification number. To be more specific, the identification number represents a scan order for partitioning.

In FIGS. 2A to 2H, an upper left corner is assumed to be a base point (origin) of the CU.

In the transform tree, the coding unit is partitioned into one or multiple transform blocks, and a location and size of each transform block is specified. In other words, the transform block/blocks is/are one or multiple non-overlapping areas which constitute the coding unit. The transform tree includes one or multiple transform blocks which are obtained by the above partitioning.

Partitioning in the transform tree includes that performed by allocating an area having the same size as the coding unit as a transform block, and that performed by the recursive quadtree partitioning similar to the partitioning of the tree block described above.

Transform processing is performed for each of these transform blocks. Hereinafter, the transform block as a unit of transform is also referred to as a transform unit (TU).

Prediction Parameter

A prediction image in a prediction unit is derived according to a prediction parameter associated with the prediction unit. The prediction parameter includes a prediction parameter for intra prediction or a prediction parameter for inter prediction. Hereinafter, the prediction parameter for inter prediction (inter-prediction parameter) is described. The inter-prediction parameter includes prediction list utilization flags predFlagL0 and predFlagL1, reference picture indices refIdxL0 and refIdxL1, and vectors mvL0 and mvL1. The prediction list utilization flags predFlagL0 and predFlagL1 are flags respectively indicating whether reference picture lists called L0 list and L1 list are used, and in a case that a value of each thereof is 1, the corresponding reference picture list is used. Here, assume that in a case that an expression "a flag indicating whether XX" is used herein, "1" corresponds to a case of XX and "0" corresponds to a case of not XX, and "1" represents true and "0" represents false in logical NOT, logical AND, or the like (the same applies hereinafter). However, other values may be used as a true value or a false value in actual device or methods. A case that two reference picture lists are used, that is, a case of predFlagL0=1 and predFlagL1=1, corresponds to bi-prediction. A case that one reference picture list is used, that is, a case of (predFlagL0, predFlagL1)=(1, 0) or (predFlagL0, predFlagL1)=(0, 1), corresponds to uni-prediction.

Information on the prediction list utilization flag can be expressed by an inter-prediction flag inter_pred_idc described below. In general, a prediction image generation unit (prediction image generation device) 308 and prediction parameter memory 307 which are described below use the prediction list utilization flag. In a case that information concerning which reference picture list is used or not used is decoded from the coded data, the inter-prediction flag inter_pred_idc is used.

Examples of a syntax element for deriving the inter-prediction parameter included in the coded data include a partition mode part_mode, a merge flag merge_flag, a merge index merge_idx, an inter-prediction flag inter_pred_idc, a reference picture index refIdxLX, a prediction vector index mvp_LX_idx, and a difference vector mvdLX, for example.

Example of Reference Picture List

Figure 5:
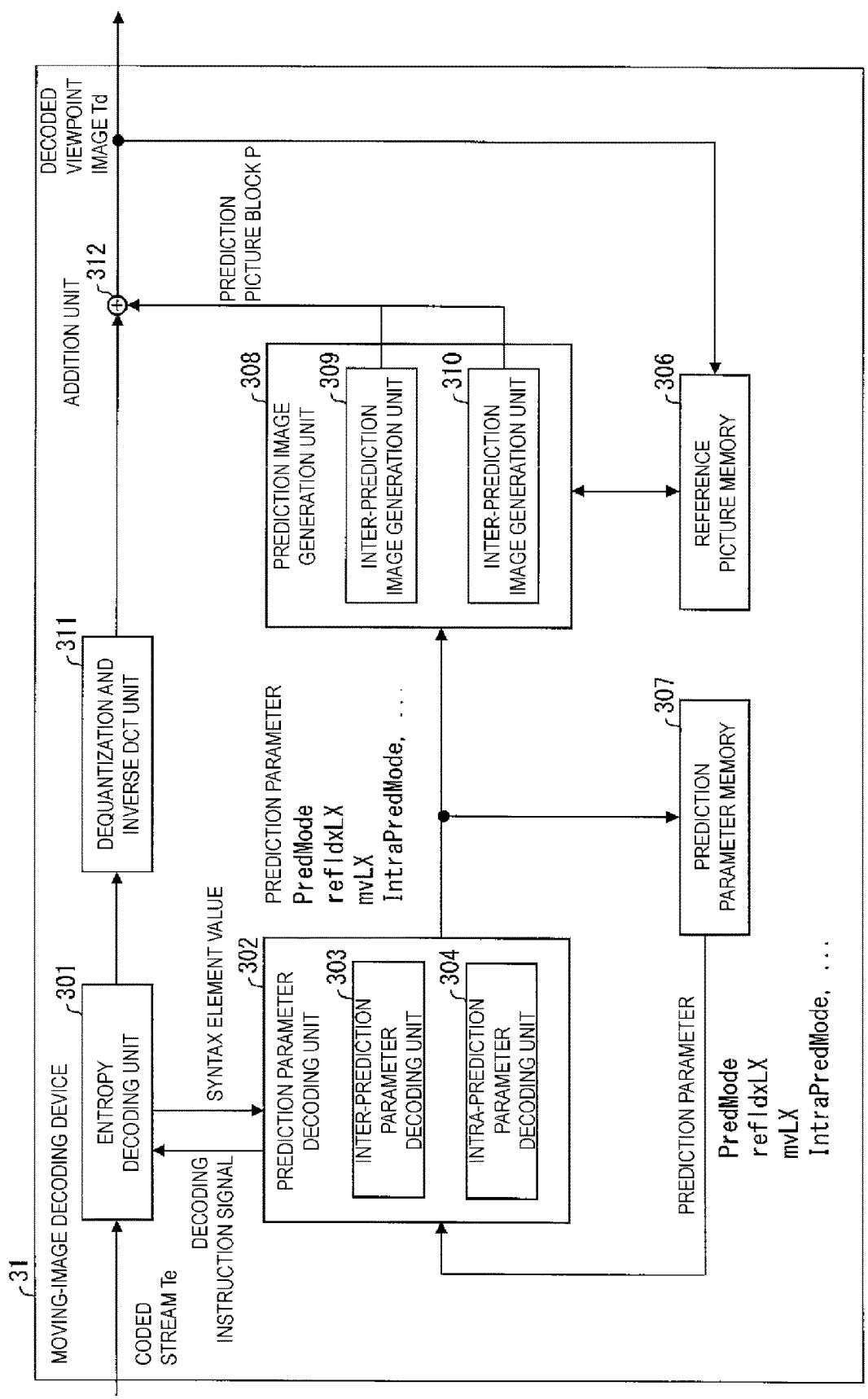
FIG. 5 is a schematic diagram illustrating a configuration of an image decoding device according to the present embodiment.

Next, a description is given of an example of the reference picture list. The reference picture list is a row constituted by the reference pictures stored in a reference picture memory 306 (FIG. 5). FIG. 3 is a conceptual diagram illustrating an example of the reference picture list. In a reference picture list 601, each of five rectangles horizontally aligned represents a reference picture. Signs P1, P2, Q0, P3, and P4 indicated from a left end to the right are signs representing corresponding reference pictures. The character "P" of P1 or the like represents a viewpoint P, and the character "Q" of Q0 represents a viewpoint Q different from the viewpoint P. A suffix of P or Q indicates a picture order count POC. A downward arrow immediately under "refIdxLX" represents that the reference picture index refIdxLX is an index for referring to a reference picture Q0 in the reference picture memory 306.

Example of Reference Pictures

Figure 4:
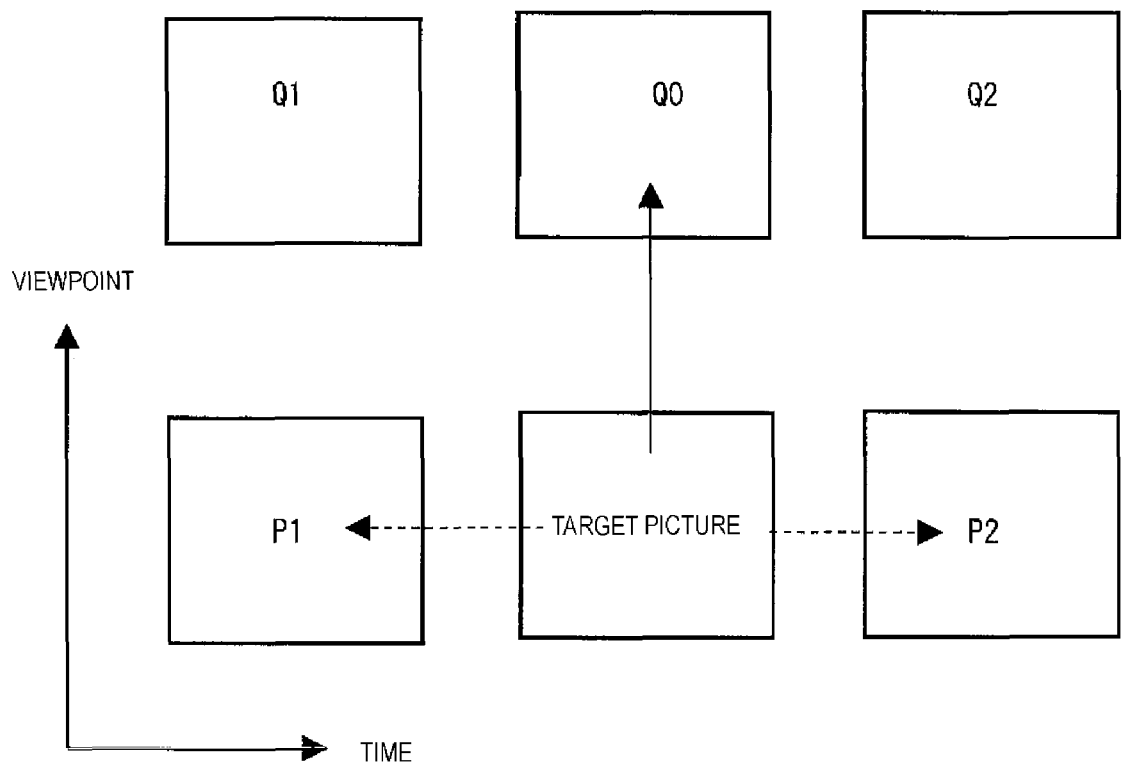
FIG. 4 is a conceptual diagram illustrating an example of reference pictures.

Next, a description is given of an example of the reference pictures which is used to derive a vector. FIG. 4 is a conceptual diagram illustrating an example of the reference pictures. In FIG. 4, a horizontal axis represents a display time and a vertical axis represents a viewpoint. Two rows and three columns of rectangles (six in total) illustrated in FIG. 4 represent pictures. The rectangle on a lower row and the second column from the left among six rectangles represents a decoding target picture (target picture) and the other five rectangles represent the reference pictures. The reference picture Q0 indicated by an upward arrow from the target picture is a picture the same as the target picture in a display time but different in a viewpoint. The reference picture Q0 is used in displacement prediction in which the target picture is used as a reference. The reference picture P1 indicated by a leftward arrow from target picture is the same as the target picture in a viewpoint and is a previous picture. The reference picture P2 indicated by a rightward arrow from the target picture is the same as the target picture in a viewpoint and is a future picture. The reference picture P1 or P2 is used in motion prediction in which the target picture is used as a reference.

Inter-Prediction Flag and Prediction List Utilization Flag

A relationship between the inter-prediction flag and the prediction list utilization flags predFlagL0 and predFlagL1 is mutually convertible as below. Therefore, the prediction list utilization flag may be used as the inter-prediction parameter, or inter-prediction flag may be used instead. In the following description, in determination using the prediction list utilization flag, the inter-prediction flag may be alternatively used. In contrast, in determination using the inter-prediction flag, the prediction list utilization flag may be alternatively used.

Inter-prediction flag=(predFlagL1<<1)+predFlagL0
predFlagL0=inter-prediction flag & 1
predFlagL1=inter-prediction flag>>1 where ">>" represents right shift and "<<" represents left shift.

Merge Prediction and AMVP Prediction

A prediction parameter decoding (coding) method includes a merge prediction (merge) mode and an Adaptive Motion Vector Prediction (AMVP) mode. A merge flag merge_flag is a flag identifying these modes. In both the merge prediction mode and the AMVP mode, a prediction parameter for an already processed block is used to derive a prediction parameter for a target PU. The merge prediction mode is a mode in which a prediction list utilization flag predFlagLX (or inter-prediction flag inter_pred_idc), a reference picture index refIdxLX, and a motion vector mvLX are not included in the coded data, and the prediction parameter already derived for a neighboring PU is used as it is. The AMVP mode is a mode in which the inter-prediction flag inter_pred_idc, the reference picture index refIdxLX, and the motion vector mvLX are included in the coded data. The motion vector mvLX is coded as a prediction vector index mvp_LX_idx identifying the prediction vector mvpLX and as a difference vector mvdLX.

The inter-prediction flag inter_pred_idc is data indicating types and the number of the reference pictures, and has a value Pred_L0, Pred_L1, or Pred_Bi. Pred_L0 and Pred_L1 indicate that the reference pictures stored in the reference picture lists called L0 list and L1 list, respectively, are used, and indicate that one reference picture is used (uni-prediction). The predictions using L0 list and L1 list are called L0 prediction and L1 prediction, respectively. Pred_Bi indicates that two reference pictures are used. (bi-prediction), and indicates that two reference pictures stored in L0 list and L1 list are used. The prediction vector index mvp_LX_idx is an index indicating a prediction vector, and the reference picture index refIdxLX is an index indicating a reference picture stored in the reference picture list. "LX" is a description method used in a case that the L0 prediction and the L1 prediction are not distinguished from each other, and a parameter for L0 list and a parameter for L1 list are distinguished by replacing "LX" with "L0" or "L1". For example, refIdxL0 is a reference picture index used for the L0 prediction, refIdxL1 is a reference picture index used for the L1 prediction, and refIdx (refIdxLX) is an expression used in a case that refIdxL0 and refIdxL1 are not distinguished from each other.

The merge index merge_idx is an index indicating whether any prediction parameter is used as a prediction parameter for the decoding target block, among prediction parameter candidates (merge candidate) derived from the block on which the processing is completed.

The "target block" may be a prediction block higher by one hierarchy than multiple prediction blocks, or may be a coded unit including the multiple prediction blocks.

Motion Vector and Displacement Vector

The motion vector mvLX can be also separated into a motion vector in a narrow sense (narrow-sense motion vector) indicating a displacement amount between the blocks on two pictures which are different in times, and a displacement vector (disparity vector, parallax vector) indicating a displacement amount between two blocks which are the same in a time. In the following description, the motion vector and the displacement vector are not distinguished from each other, and merely referred to as the motion vector mvLX. The prediction vector and difference vector for the motion vector mvLX are called respectively a prediction vector mvpLX and a difference vector mvdLX. Whether the motion vector mvLX or the difference vector mvdLX is a motion vector or a displacement vector is identified using the reference picture index refIdxLX associated with the vector.

Configuration of Image Decoding Device

Next, a description is given of a configuration of an image decoding device 31 according to the present embodiment. FIG. 5 is a schematic diagram illustrating the configuration of the image decoding device 31 according to the present embodiment. The image decoding device 31 is configured to include an entropy decoding unit 301, a prediction parameter decoding unit (prediction image generation device) 302, a reference picture memory (reference image storage unit, frame memory) 306, a prediction parameter memory (prediction parameter storage unit, frame memory) 307, a prediction image generation unit 308, a dequantization and inverse DCT unit 311, and an addition unit 312 and a residual storing unit 313 (residual recording unit).

The prediction parameter decoding init 302 is configured to include an inter-prediction parameter decoding unit (motion vector derivation unit) 303 and an intra-prediction parameter decoding unit 304. The prediction image generation unit 308 is configured to include an inter-prediction image generation unit 309 and an intra-prediction image generation unit 310.

The entropy decoding unit 301 performs entropy decoding on the coded stream Te input from outside to demultiplex and decode individual codes (syntax elements). Examples of the demultiplexed codes include the prediction information for generating the prediction image and residual information for generating the difference image.

The entropy decoding unit 301 outputs some of the demultiplexed codes to the prediction parameter decoding unit 302. Some of the demultiplexed codes are, for example, a prediction mode PredMode, partition mode part_mode, merge flag merge_flag, merge index merge_idx, inter-prediction flag inter_pred_idc, reference picture index refIdxLX, prediction vector index mvp_LX_idx, and difference vector mvdLX. Control on which code is to be decoded is based on an instruction from the prediction parameter decoding unit 302. The entropy decoding unit 301 outputs quantized coefficients to the dequantization and inverse DCT unit 311. The quantized coefficients are coefficients obtained by performing Discrete Cosine Transform (DCT) on the residual signal and quantization in the coding processing.

The inter-prediction parameter decoding unit 303 refers to the prediction parameter stored in the prediction parameter memory 307, based on the code input from the entropy decoding unit 301 to decode the inter-prediction parameter.

The inter-prediction parameter decoding unit 303 outputs the decoded inter-prediction parameter to the prediction image generation unit 308 and stores the parameter in the prediction parameter memory 307. The inter-prediction parameter decoding unit 303 is described in detail later.

The intra-prediction parameter decoding unit 304 refers to the prediction parameter stored in the prediction parameter memory 307, based on the code input from the entropy decoding unit 301 to decode the intra-prediction parameter. The intra-prediction parameter is a parameter used for processing to predict the picture block within one picture, for example, an intra-prediction mode IntraPredMode. The intra-prediction parameter decoding unit 304 outputs the decoded intra-prediction parameter to the prediction image generation unit 308 and stores the parameter in the prediction parameter memory 307.

The intra-prediction parameter decoding unit 304 may derive an intra-prediction mode different in luminance and color difference. In this case, the intra-prediction parameter decoding unit 304 decodes a luminance prediction mode IntraPredModeY as a prediction parameter for luminance, and a color difference prediction mode IntraPredModeC as a prediction parameter for color difference. The luminance prediction mode IntraPredModeY includes 35 modes, which correspond to planar prediction (0), DC prediction (1), and angular predictions (2 to 34). The color difference prediction mode IntraPredModeC uses any of the planar prediction (0), the DC prediction (1), the angular predictions (2 to 34), and LM mode (35). The intra-prediction parameter decoding unit 304 decodes a flag indicating whether IntraPredModeC is the same mode as the luminance mode, and may assign IntraPredModeC equal to IntraPredModeY in a case that the flag indicates the same mode as the luminance mode. The intra-prediction parameter decoding unit 304 may decode the planar prediction (0), the DC prediction (1), the angular predictions (2 to 34), and the LM mode (35) as IntraPredModeC in a case that the flag indicates a mode different from the luminance mode.

The reference picture memory 306 stores a block (reference picture block) of the reference pictures generated by the addition unit 312 in a predefined location for each decoding target picture and block.

The prediction parameter memory 307 stores the prediction parameters in a predefined location for each decoding target picture and block. To be more specific, the prediction parameter memory 307 stores the inter-prediction parameter decoded by the inter-prediction parameter decoding unit 303, the intra-prediction parameter decoded by the intra-prediction parameter decoding unit 304, and the prediction mode predMode demultiplexed by the entropy decoding unit 301. Examples of the stored inter-prediction parameter include the prediction list utilization flag predFlagLX (inter-prediction flag inter_pred_idc), the reference picture index refIdxLX, and the motion vector mvLX.

Input to the prediction image generation unit 308 are the prediction mode predMode which is input from the entropy decoding unit 301 and the prediction parameters from the prediction parameter decoding unit 302. The prediction image generation unit 308 reads out the reference picture from the reference picture memory 306. The prediction image generation unit 308 uses the input prediction parameters and the read out reference picture to generate a prediction picture block P (prediction image) in the prediction mode indicated by the prediction mode predMode.

Here, in a case that the prediction mode predMode indicates the inter-prediction mode, the inter-prediction image generation unit 309 uses the inter-prediction parameter input from the inter-prediction parameter decoding unit 303 and the read out reference picture to generate prediction picture block P by the inter-prediction. The prediction picture block P corresponds to the prediction unit PU. The PU corresponds to a part of a picture configured with multiple pixels as a unit for the prediction processing, that is, a decoding target block on which the prediction processing is performed in one time, as described above.

The inter-prediction image generation unit 309 reads out from the reference picture memory 306 a reference picture block at a location which is indicated by the motion vector mvLX with reference to the decoding target block from the reference picture indicated by the reference picture index refIdxLX with respect to the reference picture list having the prediction list utilization flag predFlagLX of 1 (L0 list or L1 list). The inter-prediction image generation unit 309 performs prediction on the read out reference picture block to generate the prediction picture block P. The inter-prediction image generation unit 309 outputs the generated prediction picture block P to the addition unit 312.

In a case that the prediction mode predMode indicates the intra-prediction mode, the intra-prediction image generation unit 310 uses the intra-prediction parameter input from the intra-prediction parameter decoding unit 304 and the read out reference picture to perform the intra-prediction. To be more specific, the intra-prediction image generation unit 310 reads out from the reference picture memory 306 the reference picture block in a predefined range from the decoding target block in the already decoded blocks of the decoding target picture. The predefined range is, for example, any of left, upper left, upper, and upper right neighboring blocks in a case that the decoding target block sequentially moves in an order of a so-called raster scan, and depends on the intra-prediction mode. The order of the raster scan is an order of sequentially moving from a left end to a right end of each row from an upper end to a bottom end in each picture.

The intra-prediction image generation unit 310 performs prediction on the read out reference picture block in the prediction mode indicated by the intra-prediction mode IntraPredMode to generate the prediction picture block. The intra-prediction image generation unit 310 outputs the generated prediction picture block P to the addition unit 312.

In a case that the intra-prediction parameter decoding unit 304 derives the intra-prediction mode different in luminance and color difference, the intra-prediction image generation unit 310 generates a luminance prediction picture block by any of the planar prediction (0), the DC prediction (1), and the angular predictions (2 to 34) depending on the luminance prediction mode IntraPredModeY. The intra-prediction image generation unit 310 generates a color difference prediction picture block by any of the planar prediction (0), the DC prediction (1), the angular predictions (2 to 344), and the LM mode (35) depending on the color difference prediction mode IntraPredModeC.

The dequantization and inverse DCT unit 311 dequantizes the quantized coefficients input from the entropy decoding unit 301 to find DCT coefficients. The dequantization and inverse DCT unit 311 performs Inverse Discrete Cosine Transform (inverse DCT) on the found DCT coefficients to compute a decoded residual signal. The dequantization and inverse DCT unit 311 outputs the computed decoded residual signal to the addition unit 312 and the residual storage unit 313.

The addition unit 312 adds the prediction picture blocks P input from the inter-prediction image generation unit 309 and intra-prediction image generation unit 310 and a signal value of the decoded residual signal input from the dequantization and inverse DCT unit 311 for each pixel to generate a reference picture block. The addition unit 312 stores the generated reference picture block in the reference picture memory 306, and outputs, to outside, a decoded layer image Td in which the generated reference picture blocks are integrated for each picture.

Configuration of Inter-Prediction Parameter Decoding Unit

Next, a description is given of a configuration of the inter-prediction parameter decoding unit 303.

Figure 6:
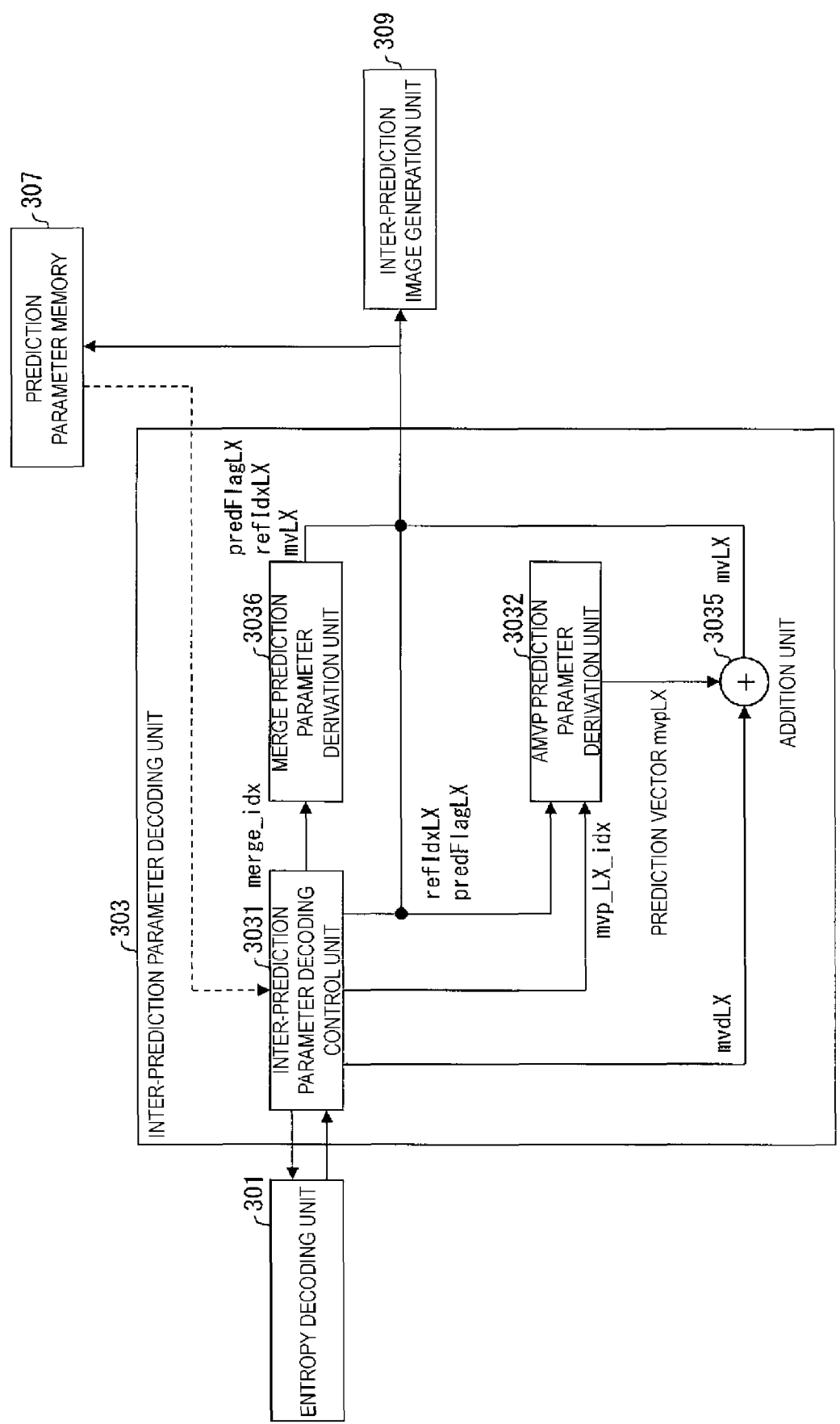
FIG. 6 is a schematic diagram illustrating a configuration of an inter-prediction parameter decoding unit according to the present embodiment.

FIG. 6 is a schematic diagram illustrating a configuration of the inter-prediction parameter decoding unit 303 according to the present embodiment. The inter-prediction parameter decoding unit 303 is configured to include an inter-prediction parameter decoding control unit (motion vector derivation unit) 3031, an AMVP prediction parameter derivation unit 3032, an addition unit 3035, and a merge prediction parameter derivation unit 3036.

The inter-prediction parameter decoding control unit 3031 instructs the entropy decoding unit 301 to decode the code (syntax element) associated with the inter-prediction to extract the code (syntax element) included in the coded data, for example, the partition mode part_mode, the merge flag merge_flag, the merge index merge_idx, the inter-prediction flag inter_pred_idc, the reference picture index refIdxLX, the prediction vector index mvp_LX_idx, and the difference vector mvdLX.

The inter-prediction parameter decoding control unit 3031 first extracts the merge flag. An expression that the inter-prediction parameter decoding control unit 3031 extracts a certain syntax element means instructing the entropy decoding unit 301 to decode a code of a certain syntax element to read the syntax element from the coded data. Here, in a case that the merge flag indicates a value of 1, that is, the merge prediction mode, the inter-prediction parameter decoding control unit 3031 extracts the merge index merge_idx as a prediction parameter related to the merge prediction. The inter-prediction parameter decoding control unit 3031 outputs the extracted merge index merge_idx to the merge prediction parameter derivation unit 3036.

In a case that the merge flag merge_flag is 0, that is, indicates the AMVP prediction mode, the inter-prediction parameter decoding control unit 3031 uses the entropy decoding unit 301 to extract the AMVP prediction parameter from the coded data. Examples of the AMVP prediction parameter include the inter-prediction flag inter_pred_idc, the reference picture index refIdxLX, the prediction vector index mvp_LX_idx, and the difference vector mvdLX. The inter-prediction parameter decoding control unit 3031 outputs the prediction list utilization flag predFlagLX derived from the extracted inter-prediction flag inter_pred_idc and the reference picture index refIdxLX to the AMVP prediction parameter derivation unit 3032 and the prediction image generation unit 308 (FIG. 5), and stores the predFlagLX and refIdxLX in the prediction parameter memory 307 (FIG. 5). The inter-prediction parameter decoding control unit 3031 outputs the extracted prediction vector index mvp_LX_idx to the AMVP prediction parameter derivation unit 3032. The inter-prediction parameter decoding control unit 3031 outputs the extracted difference vector mvdLX to the addition unit 3035.

Figure 7:
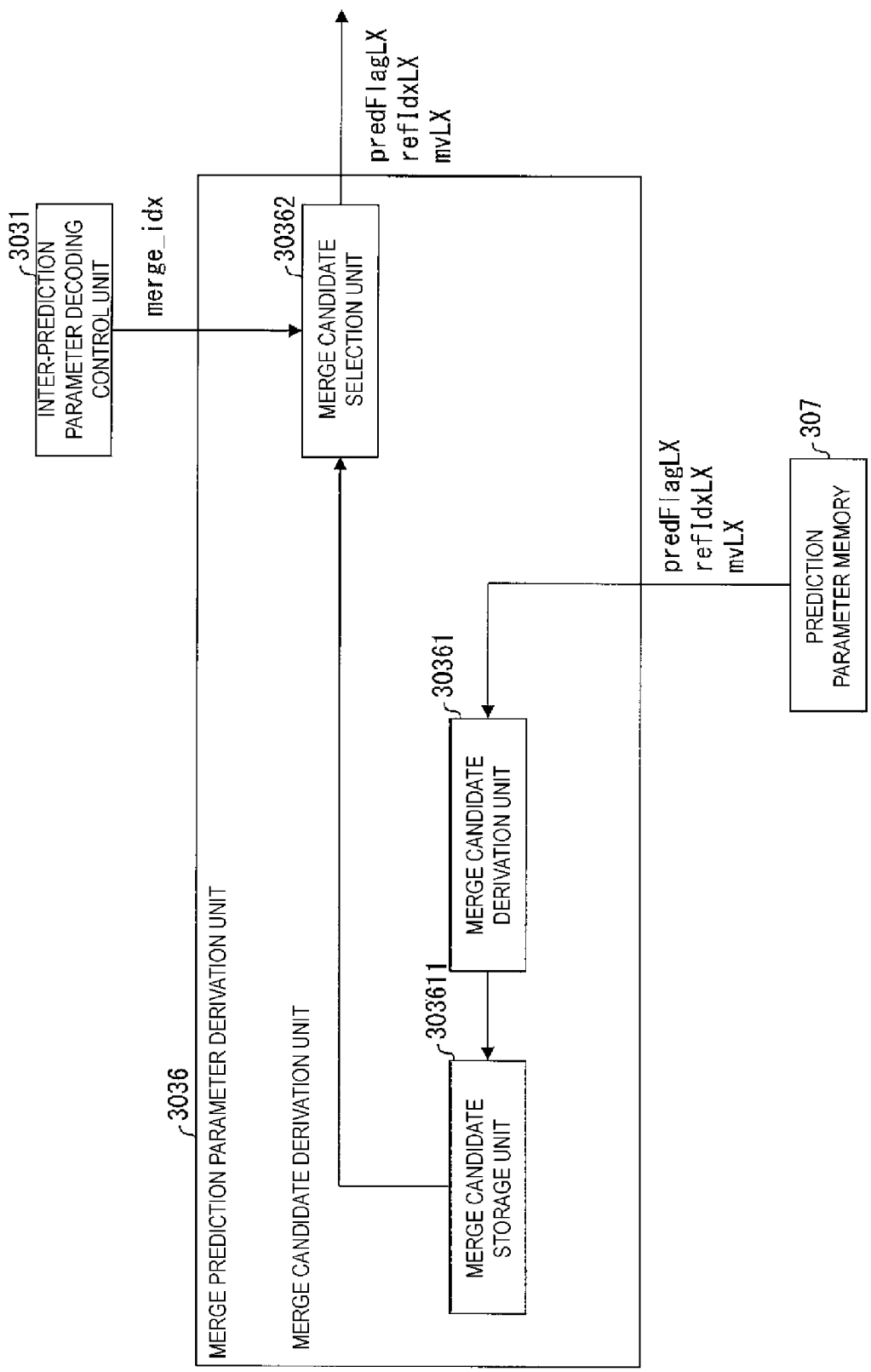
FIG. 7 is a schematic diagram illustrating a configuration of a merge prediction parameter derivation unit according to the present embodiment.

FIG. 7 is a schematic diagram illustrating a configuration of the merge prediction parameter derivation unit 3036 according to the present embodiment. The merge prediction parameter derivation unit 3036 includes a merge candidate derivation unit 30361 (prediction vector compute unit) and a merge candidate selection unit 30362. The merge candidate storage unit 303611 stores therein merge candidates input from the merge candidate derivation unit 30361. The merge candidate is configured to include the prediction list utilization flag predFlagLX, the motion vector mvLX, and the reference picture index refIdxLX. The merge candidate stored in the merge candidate storage unit 303611 is assigned with an index according to a prescribed rule.

The merge candidate derivation unit 30361 uses, without change, a motion vector and reference picture index refIdxLX of a neighboring block on which the decode processing has been already applied to derive the merge candidates. Affine prediction may be used as another way to derive the merge candidates. This method is described below in detail. The merge candidate derivation unit 30361 may use the affine prediction for spatial merge candidate derivation processing, temporal merging (inter-frame merge) candidate derivation processing, combined merge candidate derivation processing, and zero merge candidate derivation processing which are described below. The affine prediction is performed in units of sub-blocks, and the prediction parameter is stored in the prediction parameter memory 307 for each sub-block. Alternatively, the affine prediction may be performed in units of pixels.

Spatial Merge Candidate Derivation Processing

In the spatial merge candidate derivation processing, the merge candidate derivation unit 30361 reads out the prediction parameters (prediction list utilization flag predFlagLX, motion vector mvLX, reference picture index refIdxLX) stored by the prediction parameter memory 307 according to a prescribed rule to derive the read out prediction parameters as merge candidates. The read out prediction parameters are prediction parameters related to each of blocks in a predefined range from the decoding target block (e.g., all or some of blocks in contact with a lower left end, upper left end, and upper right end of the decoding target block). The merge candidates derived by the merge candidate derivation unit 30361 are stored in the merge candidate storage unit 303611.

Temporal Merge Candidate Derivation Processing

In the temporal merging derivation processing, the merge candidate derivation unit 30361 reads out, as merge candidates, prediction parameters for a block in a reference image including coordinates on the lower right of the decoding target block from the prediction parameter memory 307. As a method of specifying the reference image, the reference picture index refIdxLX specified in the slice header may be used, or a minimum one of the reference picture indices refIdxLX of the block neighboring to the decoding target block may be used, for example. The merge candidates derived by the merge candidate derivation unit 30361 are stored in the merge candidate storage unit 303611.

Combined Merge Candidate Derivation Processing

In the combined merging derivation processing, the merge candidate derivation unit 30361 uses vectors and reference picture indices of two different derived merge candidates which are already derived and stored in the merge candidate storage unit 303611 as vectors for L0 and L1, respectively, to combine, and thus derives a combined merge candidate. The merge candidate derived by the merge candidate derivation unit 30361 is stored in the merge candidate storage unit 303611.

Zero Merge Candidate Derivation Processing

In the zero merge candidate derivation processing, the merge candidate derivation unit 30361 derives a merge candidate including a reference picture index refIdxLX of 0 and both an X component and Y component of 0 of a motion vector mvLX. The merge candidate derived by the merge candidate derivation unit 30361 is stored in the merge candidate storage unit 303611.

The merge candidate selection unit 30362 selects, as an inter-prediction parameter for the target PU, a merge candidate assigned with an index corresponding to the merge index merge_idx input from the inter-prediction parameter decoding control unit 3031, among the merge candidates stored in the merge candidate storage unit 303611. The merge candidate selection unit 30362 stores the selected merge candidate in the prediction parameter memory 307 and outputs the candidate to the prediction image generation unit 308 (FIG. 5).

Figure 8:
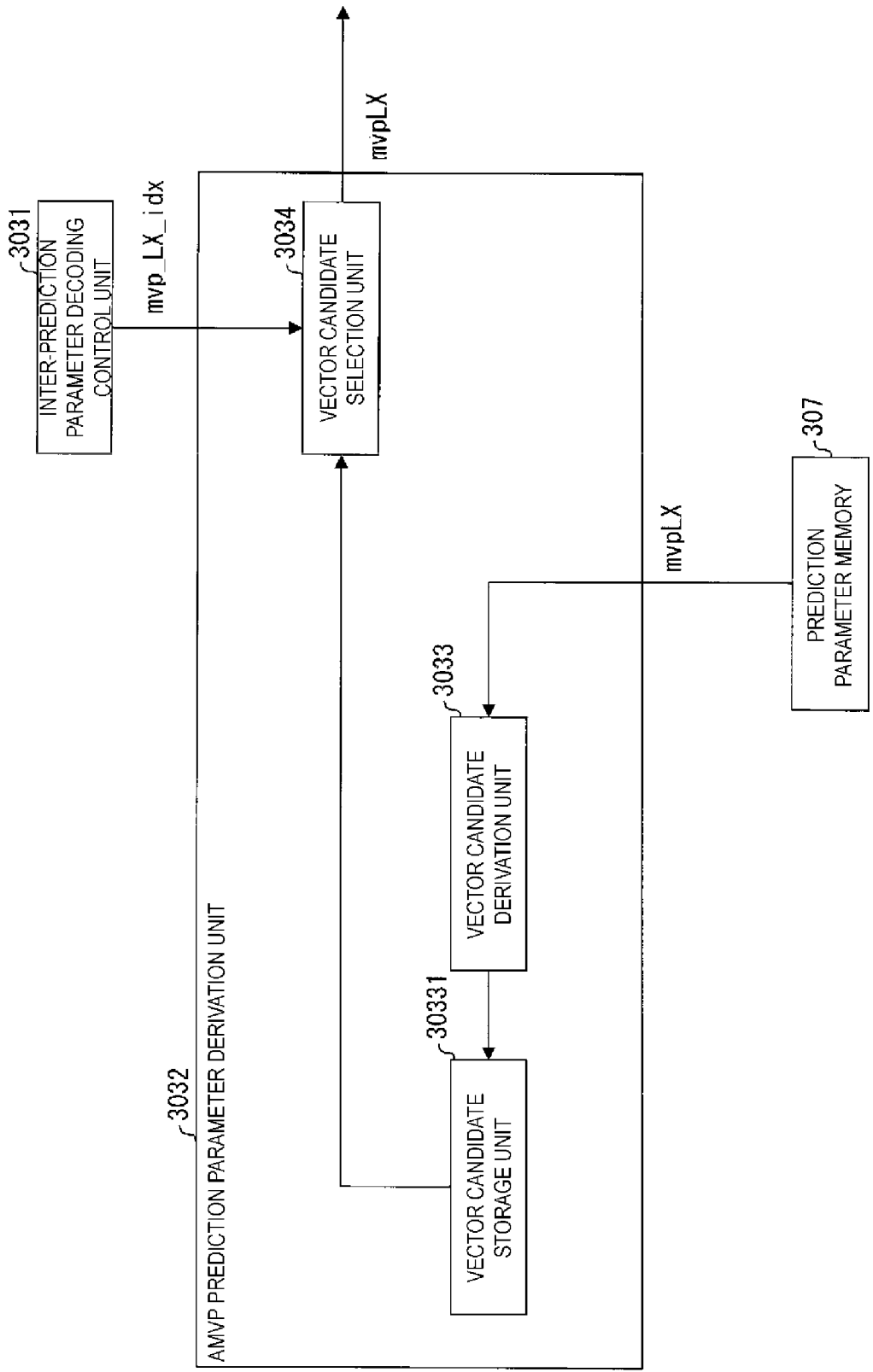
FIG. 8 is a schematic diagram illustrating a configuration of an AMVP prediction parameter derivation unit according to the present embodiment.

FIG. 8 is a schematic diagram illustrating a configuration of the AMVP prediction parameter derivation unit 3032 according to the present embodiment. The AMVP prediction parameter derivation unit 3032 includes a vector candidate derivation unit 3033 (vector compute unit) and a vector candidate selection unit 3034. The vector candidate derivation unit 3033 reads out the vector (motion vector or displacement vector) stored in the prediction parameter memory 307 as a prediction vector mvpLX, based on the reference picture index refIdx. The read out vector is a vector related to each of blocks in a predefined range from the decoding target block (e.g., all or some of blocks in contact with a lower left end, upper left end, and upper right end of the decoding target block).

The vector candidate selection unit 3034 selects, as a prediction vector mvpLX, a vector candidate indicated by the prediction vector index mvp_LX_idx input from the inter-prediction parameter decoding control unit 3031, among the vector candidates read out by the vector candidate derivation unit 3033. The vector candidate selection unit 3034 outputs the selected prediction vector mvpLX to the addition unit 3035.

The vector candidate selection unit 3034 may perform round processing which are described below on the selected prediction vector mvpLX.

A vector candidate storage unit 30331 stores therein the vector candidate input from the vector candidate derivation unit 3033. The vector candidates are configured to include the prediction vector mvpLX. The vector candidates stored in the vector candidate storage unit 30331 is assigned with an index according to a prescribed rule.

The vector candidate derivation unit 3033 uses the affine prediction to derive the vector candidates. The vector candidate derivation unit 3033 may use the affine prediction for spatial vector candidate derivation processing, temporal vector (inter-frame vector) candidate derivation processing, combined vector candidate derivation processing, and zero vector candidate derivation processing which are described below. The affine prediction is performed in units of sub-blocks, and the prediction parameter is stored in the prediction parameter memory 307 for each sub-block. Alternatively, the affine prediction may be performed in units of pixels.

Figure 9:
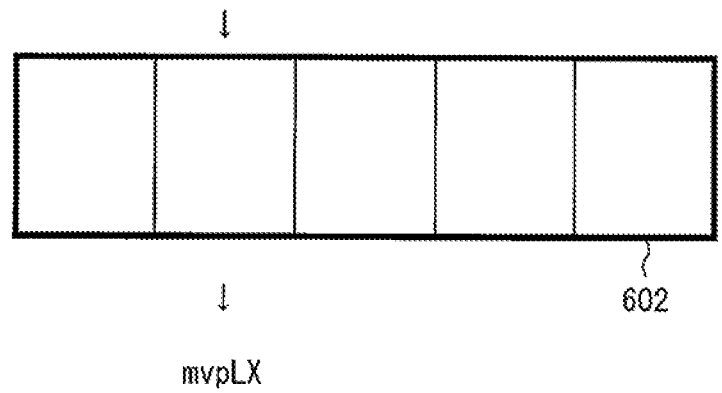
FIG. 9 is a conceptual diagram illustrating an example of vector candidates.

FIG. 9 is a conceptual diagram illustrating an example of the vector candidates. A prediction vector list 602 illustrated in FIG. 9 is a list constituted by multiple vector candidates derived by the vector candidate derivation unit 3033. In the prediction vector list 602, each of five rectangles horizontally aligned represents a region indicating a prediction vector. A downward arrow immediately under "mvp_LX_idx" located at the second rectangle from the left end, and mvpLX under the arrow indicate that the prediction vector index mvp_LX_idx is an index referring to the vector mvpLX in the prediction parameter memory 307.

The vector candidates are generated based on vectors related to blocks referred to by the vector candidate selection unit 3034. Each block referred to by the vector candidate selection unit 3034 may be a block on which the decode processing is completed, the block being in a predefined range from the decoding target block (e.g., neighboring block). The neighboring block includes a block spatially neighboring to the decoding target block such as a left block and an upper block, and a block temporally neighboring to the decoding target block such a block which is the same in a location as the decoding target block but different in a display time.

The addition unit 3035 adds the prediction vector mvpLX input from the AMVP prediction parameter derivation unit 3032 and the difference vector mvdLX input from the inter-prediction parameter decoding control unit 3031 to compute a motion vector mvLX. The addition unit 3035 outputs the computed motion vector mvLX to the prediction image generation unit 308 (FIG. 5).

Figure 10:
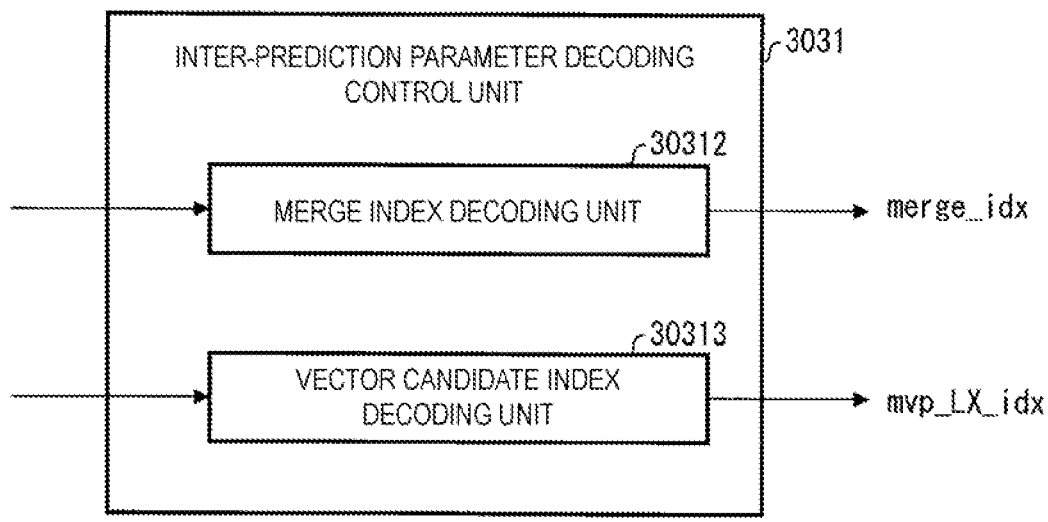
FIG. 10 is a schematic diagram illustrating a configuration of an inter-prediction parameter decoding control unit according to the present embodiment.

FIG. 10 is a schematic diagram illustrating a configuration of the inter-prediction parameter decoding control unit 3031 according to the present embodiment. The inter-prediction parameter decoding control unit 3031 is configured to include an addition prediction flag decoding unit 30311, a merge index decoding unit 30312, a vector candidate index decoding unit 30313, and a not illustrated partition mode decoding unit, merge flag decoding unit, inter-prediction flag decoding unit, reference picture index decoding unit, vector difference decoding unit, and the like. The partition mode decoding unit, the merge flag decoding unit, the merge index decoding unit, the inter-prediction flag decoding unit, the reference picture index decoding unit, the vector candidate index decoding unit 30313, and the vector difference decoding unit decode respectively the partition mode part_mode, the merge flag merge_flag, the merge index merge_idx, the inter-prediction flag inter_pred_idc, the reference picture index refIdxLX, the prediction vector index mvp_LX_idx, and the difference vector mvdLX.

Inter-Prediction Image Generation Unit 309

Figure 11:
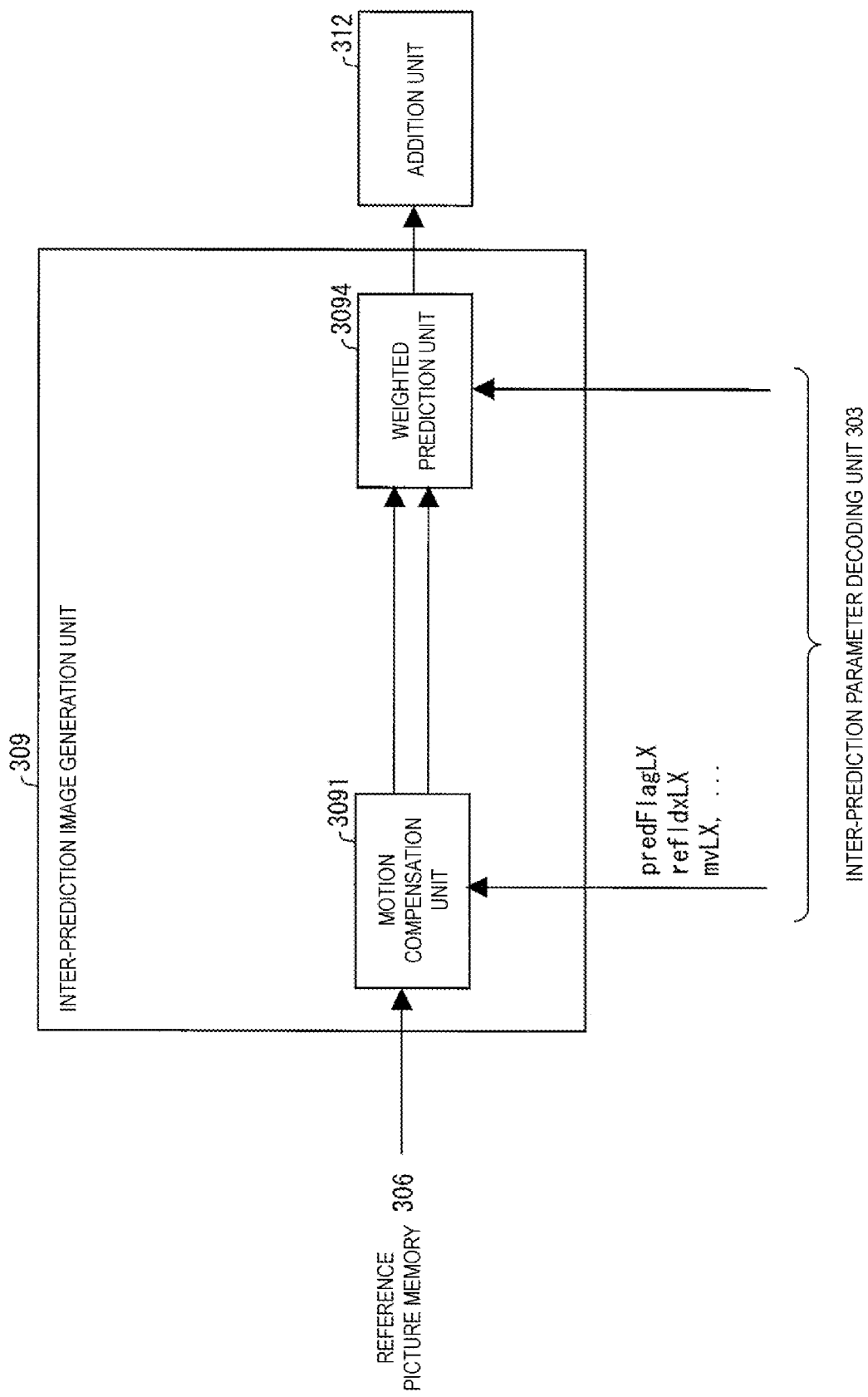
FIG. 11 is a schematic diagram illustrating a configuration of an inter-prediction image generation unit according to the present embodiment.

FIG. 11 is a schematic diagram illustrating a configuration of the inter-prediction image generation unit 309 according to the present embodiment. The inter-prediction image generation unit 309 is configured to include a motion compensation unit 3091 and a weighted prediction unit 3094.

Motion Compensation

The motion compensation unit 3091 reads out from the reference picture memory 306 a block which is displaced by a motion vector mvLX from a starting point as a location of the decoding target block for the reference picture specified by the reference picture index refIdxLX, based on the prediction list utilization flag predFlagLX, reference picture index refIdxLX, and motion vector mvLX that are input from the inter-prediction parameter decoding unit 303 to generate a motion compensation image. Here, in a case that the accuracy of the motion vector mvLX is not integer accuracy, a motion compensation image is generated by filtering called a motion compensation filter for generating a pixel at fractional position. Hereinafter, an L0 prediction motion compensation image is called predSamplesL0 and an L1 prediction motion compensation image is called predSamplesL1. These images are called predSamplesLX when not distinguished.

Weighted Prediction

The weighted prediction unit 3094 multiplies an input motion disparity image predSamplesLX by weight coefficients to generate a prediction picture block P (prediction image). The input motion disparity image predSamplesLX in the case of the residual prediction is an image on which the residual prediction is applied. In a case that one of reference list utilization flags (predFlagL0 or predFlagL1) is 1 (that is, in a case of the uni-prediction) and the weighted prediction is not used, processing by the following equation is performed to conform the input motion disparity image predSamplesLX (LX is L0 or L1) to the number of pixel bits.

$$predSamples[x][y]=Clip3(0,(1<<bitDepth)-1,(predSamplesLX[x][y]+offset1>>shift1)$$

where shift1=14−bitDepth, offset1=1<<(shift1−1).

In a case that both of the reference list utilization flags (predFlagL0 or predFlagL1) are 1 (that is, in a case of the bi-prediction) and the weighted prediction is not used, processing by the following equation is performed to average the input motion disparity images predSamplesL0 and predSamplesL1 to be conformed to the number of pixel bits.

predSamples[x][y]=Clip3(0,(1<<bitDepth)−1,(predSamplesL0[x][y]+predSamplesL1[x][y]+offset2)>>shift2)

where shift2=15−bitDepth, offset2=1<<(shift2−1)

Furthermore, in a case of the uni-prediction and that the weighted prediction is performed, the weighted prediction unit 3094 derives a weighted prediction coefficient w0 and an offset o0 from the coded data and performs processing by the following equation.

predSamples[x][y]=Clip3(0,(1<<bitDepth)−1,((predSamplesLX[x][y]*w0+2 log 2WD−1)>>log 2WD)+o0)

where log 2WD represents a variable indicating a prescribed shift amount.

Further, in a case of the hi-prediction and that the weighted prediction is performed, the weighted prediction unit 3094 derives weighted prediction coefficients w0, w1, o0, and o1 from the coded data and performs processing by the following equation.

predSamples[x][y]=Clip3(0,(1<<bitDepth)−1,(predSamplesL0[x][y]*w0+predSamplesL1[x][y]*w1+((o0+o1+1)<<log 2WD))>>(log 2WD+1))

Motion Vector Decoding Processing

Hereinafter, motion vector decoding processing according to the present embodiment will be specifically described with reference to FIGS. 15 to 27.

As clearly seen from the above-mentioned description, the motion vector decoding processing according to the present embodiment includes processing of decoding a syntax element related to an inter prediction (also referred to as motion syntax decoding processing) and processing of deriving a motion vector (motion vector derivation processing).

Motion Syntax Decoding Processing

Figure 15:
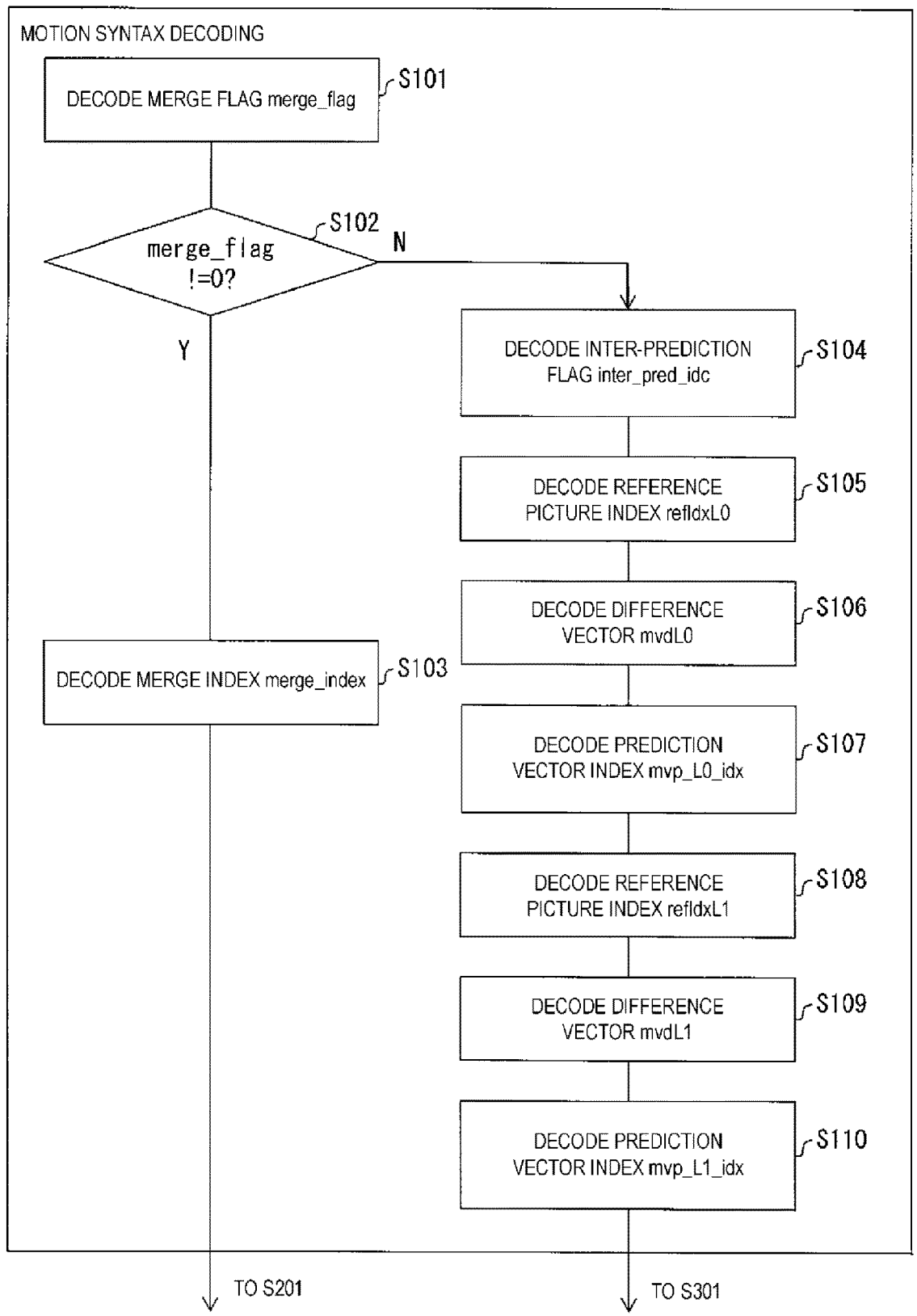
FIG. 15 is a flowchart illustrating a flow of inter-prediction syntax decoding processing performed by the inter-prediction parameter decoding control unit according to the present embodiment.

FIG. 15 is a flowchart illustrating a flow of inter-prediction syntax decoding processing performed by the inter-prediction parameter decoding control unit 3031. In the following description of FIG. 15, each step is performed by the inter-prediction parameter decoding control unit 3031 unless explicitly described otherwise.

First, a merge flag merge_flag is decoded in Step S101, and merge_flag !=0 ? is determined in Step S102.

In a case that merge_flag !=0 is true (Y in S102), a merge index merge_idx is decoded in S103, and the processing proceeds to motion vector derivation processing (S201) (FIG. 18A) in a merge mode.

In a case that merge_flag !=0 is false (N in S102), an inter-prediction flag inter_pred_idc is decoded in S104, a reference picture index refIdxL0 is decoded in S105, a syntax mvdL0 of a difference vector is decoded in S106, and a prediction vector index mvp_L0_idx is decoded in S107.

A reference picture index refIdxL1 is decoded in S108, a syntax mvdL1 of a difference vector is decoded in S109, a prediction vector index mvp_L1_idx is decoded in S110, and the processing proceeds to motion vector derivation processing (S301) (FIG. 18B) in an A MVP mode.

Note that, in a case that the inter-prediction flag inter_pred_idc is 0, that is, in a case that the inter-prediction flag inter_pred_idc indicates a L0 prediction (FRED_L0), the processing in S108 to S110 is unnecessary. On the other hand, in a case that the inter-prediction flag inter_pred_idc is 1, that is, in a case that the inter-prediction flag inter_pred_idc indicates a L1 prediction (PRED_L1), the processing in S105 to S107 is unnecessary. Further, in a case that the inter-prediction flag inter_pred_idc is 2, that is, in a case that the inter-prediction flag inter_pred_idc indicates a bi-prediction (PRED_B), each step of S105 to S110 is performed.

Difference Vector Decoding Processing

Figure 16:
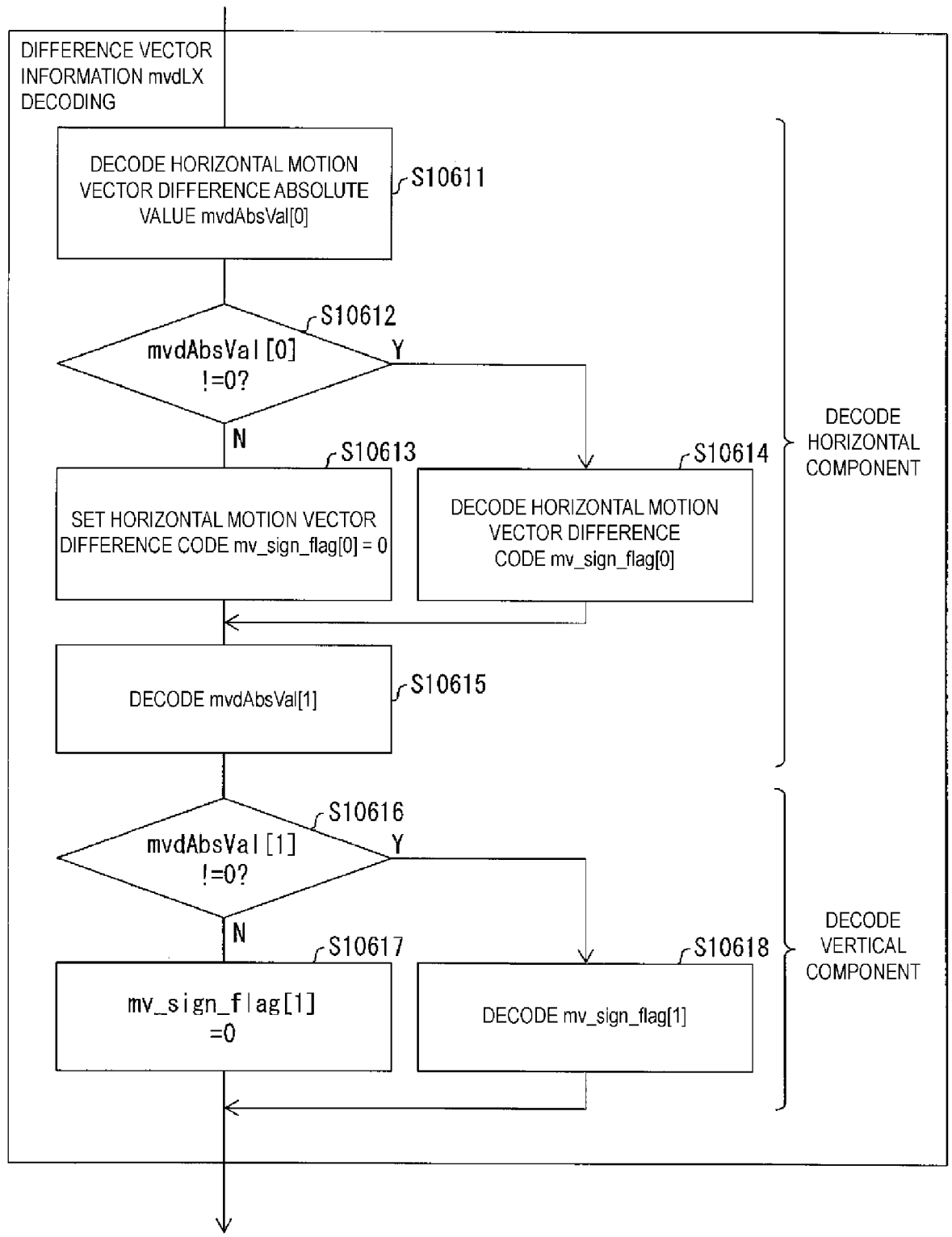
FIG. 16 is a flowchart illustrating an example of difference vector decoding processing according to the present embodiment.

FIG. 16 is a flowchart more specifically illustrating the difference vector decoding processing in Steps S106 and S109 mentioned above. The motion vector and the difference vector mvdLX are respectively represented by mvLX and mvdLX so far without distinguishing between a horizontal component and a vertical component thereof. Now, the horizontal component and the vertical component are respectively expressed by using [0] and [1] to clarify that syntaxes of the horizontal component and the vertical component are needed and processing for the horizontal component and the vertical component is needed.

As illustrated in FIG. 16, first, in Step S10611, a syntax mvdAbsVal[0] indicating horizontal motion vector difference absolute value is decoded from coded data. In Step S10612, whether the (horizontal) motion vector difference absolute value is 0 mvdAbsVal[0]!=0 is determined.

In a case that the horizontal motion vector difference absolute value mvdAbsVal[0] !=0 is true (Y in S10612), a syntax mv_sign_flag[0] indicating a sign (positive and negative) of the horizontal motion vector difference is decoded from the coded data in S10614, and the processing proceeds to S10615. On the other hand, in a case that mvdAbsVal[0] !=0 is false (N in S10612), mv_sign_flag[0] is set (inferred) to 0 in S10613, and the processing proceeds to S10615.

Subsequently, in Step S10615, a syntax mvdAbsVal[1] indicating a vertical motion vector difference absolute value is decoded. In Step S10612, whether the (vertical) motion vector difference absolute value is 0 mvdAbsVal[1]!=0 is determined.

In a case that mvdAbsVal[1] !=0 is true (Y in S10616), a syntax mv_sign_flag[1] indicating a sign (positive and negative) of the vertical motion vector difference is decoded from the coded data in S10618. On the other hand, in a case that mvdAbsVal[1] !=0 is false (N in S10616), the syntax mv_sign_flag[1] indicating the sign (positive and negative) of the vertical motion vector difference is set to 0 in S10617.

As described above, each of the motion vector difference absolute value mvdAbsVal and a code mvd_sign_flag of the motion vector difference are expressed by a vector including {horizontal component, vertical component}, and the horizontal component and the vertical component are respectively accessed by [0] and [1]. As another access method, for example, the vertical component and the horizontal component may be respectively accessed by [0] and [1]. The vertical component is processed after the horizontal component, but the order of processing is not limited to this. For example, the vertical component may be processed before the horizontal component (the same applies hereinafter).

Figure 17:
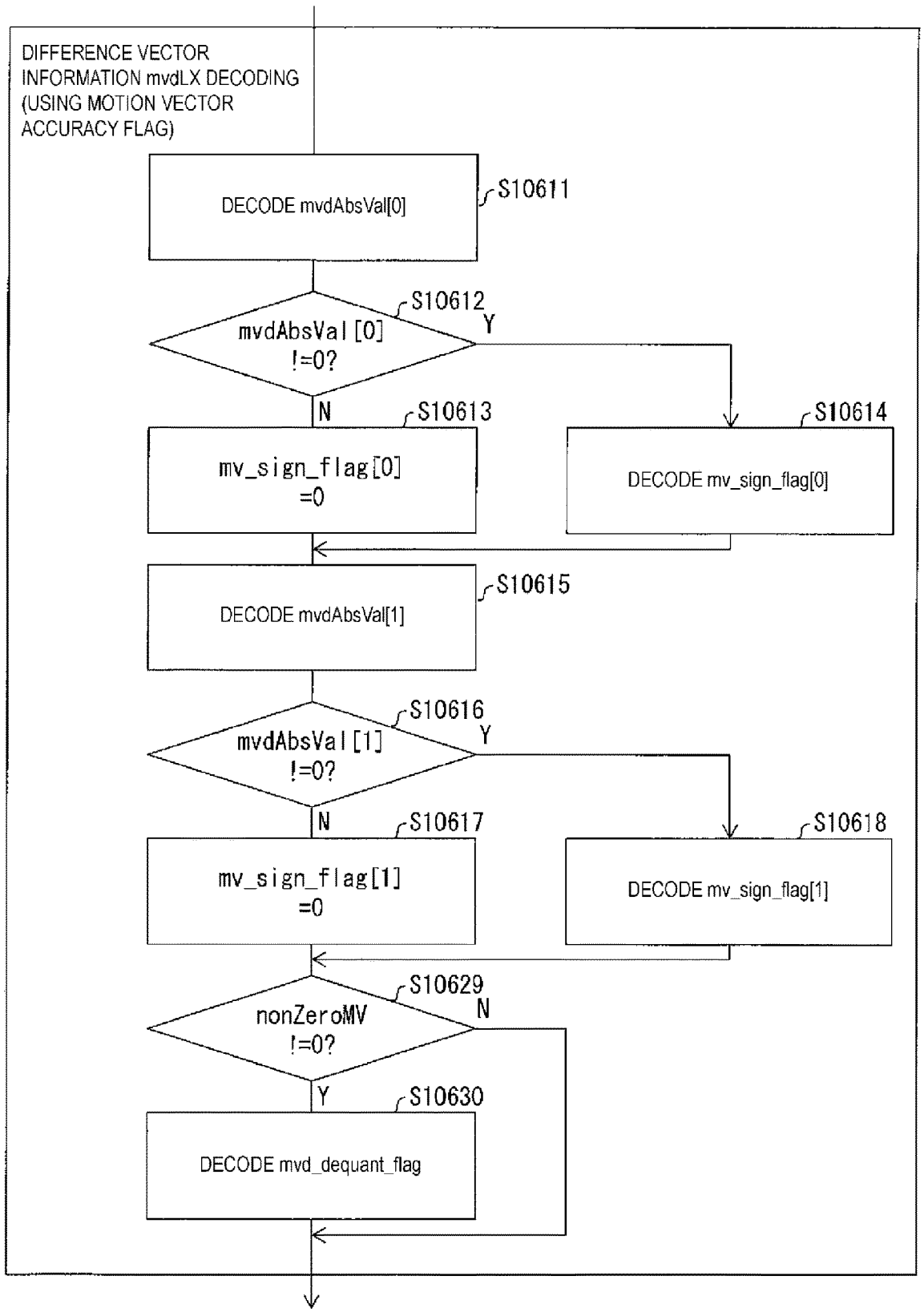
FIG. 17 is a flowchart illustrating another example of the difference vector decoding processing according to the present embodiment.

FIG. 17 is a flowchart illustrating an example of processing of decoding a difference vector in Steps S106 and S109 by a method different from the processing exemplified in FIG. 16. The steps already described in FIG. 16 will be provided with the same reference numerals in FIG. 17, and description thereof will be omitted.

The example illustrated in FIG. 17 is different from FIG. 16 in that a motion vector accuracy flag mvd_dequant_flag is further decoded.

In other words, in the example illustrated in FIG. 17, a variable nonZeroMV indicating whether the difference vector is 0 is derived, and whether the difference vector is 0 nonZeroMV!=0?

is determined in S10629 after S10617 and S10618 already described.

Here, the variable nonZeroMV can be derived as follows.

nonZeroMV=mvdAbsVal[0]+mvdAbsVal[1]

In a case that nonZeroMV!=0 is true (Y in S10629), that is, in a case that the difference vector is other than 0, the motion vector accuracy flag mvd_dequant_flag is decoded from the coded data in S10630. Further, in a case that nonZeroMV !=0 is false (N in S10629), mvd_dequant_flag is not decoded from the coded data and is set to 0. In other words, in a case that the difference vector is other than 0, that is, only in a case that nonZeroMV !=0, mvd_dequant_flag is decoded.

Note that the motion vector accuracy flag mvd_dequant_flag is used to switch accuracy of a motion vector. Further, in a case that the flag is assumed to be a flag selecting whether accuracy of the motion vector is a full pel, the flag may be written (expressed) as integer_mv_flag.

Motion Vector Derivation Processing

Next, motion vector derivation processing wilt be described by using FIGS. 18 to 27.

Figure 18A:
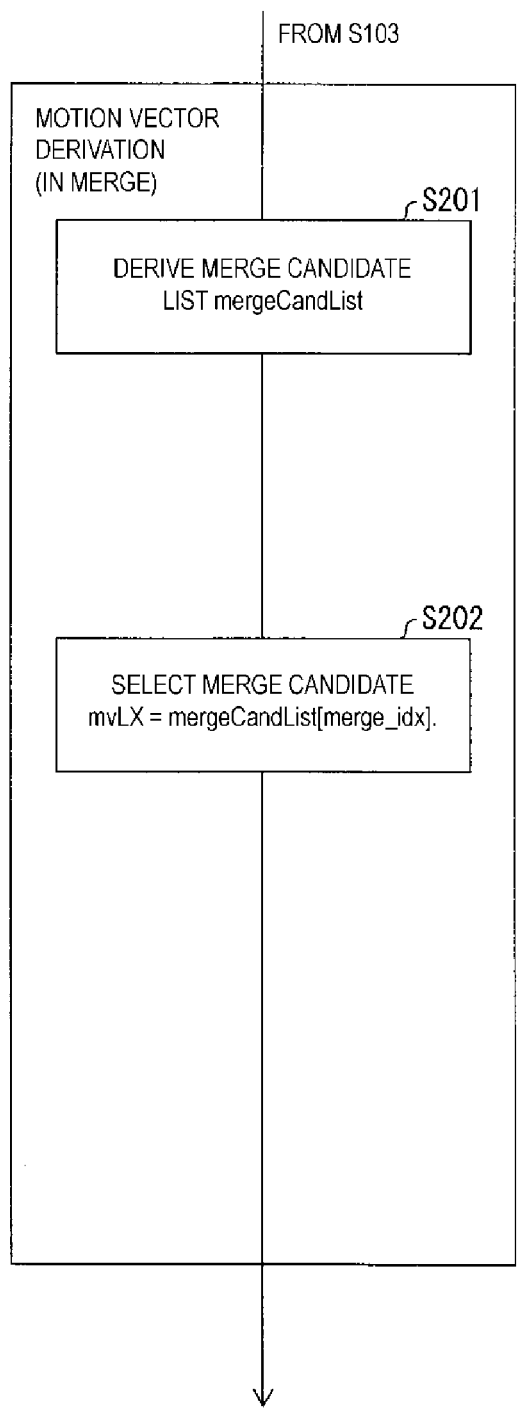
FIGS. 18A and 18B are flowcharts illustrating a flow of motion vector derivation processing performed by the inter-prediction parameter decoding unit according to the present embodiment.
Figure 18B:
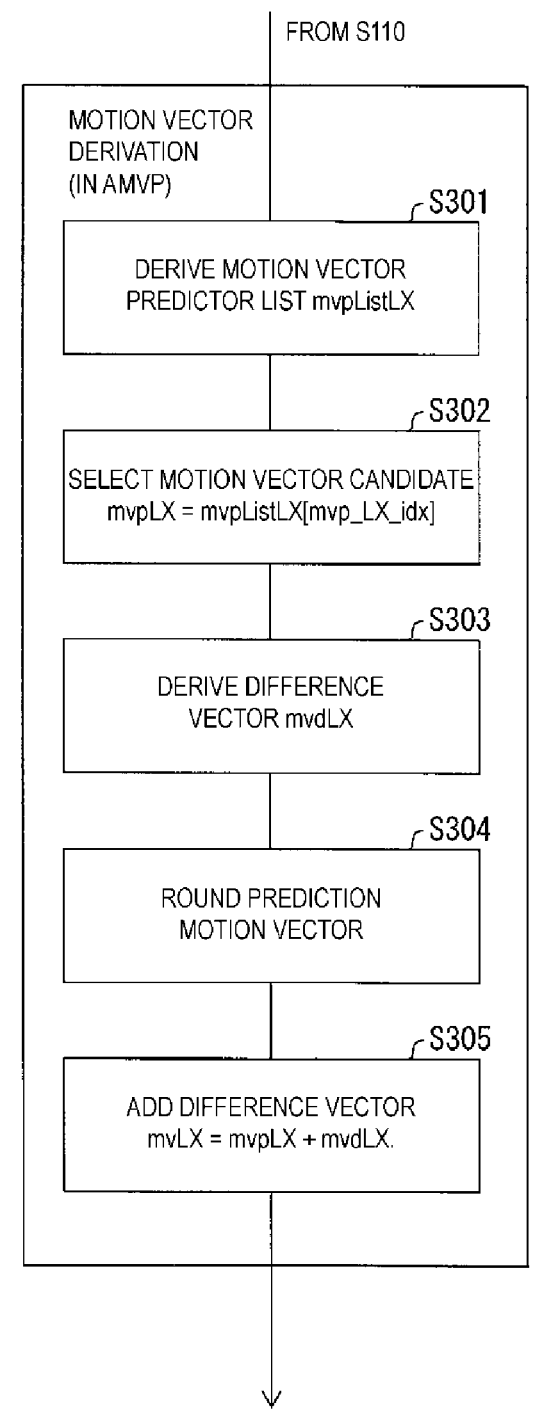

FIGS. 18A and 18B are flowcharts illustrating a flow of motion vector derivation processing performed by the inter-prediction parameter decoding unit 303 according to the present embodiment.

Motion Vector Derivation Processing in Merge Prediction Mode

FIG. 18A is a flowchart illustrating a flow of motion vector derivation processing in a merge prediction mode. As illustrated in FIG. 18A, the merge candidate derivation unit 30361 derives a merge candidate list mergeCandList in S201. The merge candidate selection unit 30362 selects a merge candidate mvLX designated by a merge index merge_idx, based on mergeCandList[merge_idx] in S202. For example, the merge candidate mvLX is derived from mvLX=mergeCandList[merge_idx].

Motion Vector Derivation Processing in AMVP Mode

In the AMVP mode, a difference motion vector mvdLX is derived from decoded syntaxes mvdAbsVal and mv_sign_flag, and a motion vector mvLX is derived by adding the difference motion vector mvdLX to a prediction vector mvpLX. In the description of the syntax, the horizontal component and the vertical component are distinguished from each other by using [0] and [1] like mvdAbsVal[0] and mvdAbsVal[1], but the components are not distinguished hereinafter for the sake of simplification and are simply described as mvdAbsVal and the like. The motion vector actually includes the horizontal component and the vertical component, so that processing described without distinguishing components may be performed in order of components.

On the other hand, FIG. 18B is a flowchart illustrating a flow of the motion vector derivation processing in the AMVP mode. As illustrated in FIG. 18B, the vector candidate derivation unit 3033 derives a motion vector predictor list mvpListLX in S301. In S302, the vector candidate selection unit 3034 selects a motion vector candidate (prediction vector, prediction motion vector) mvpLX=mvpListLX[mvp_LX_idx] designated by a prediction vector index mvp_LX_idx.

Figure 19:
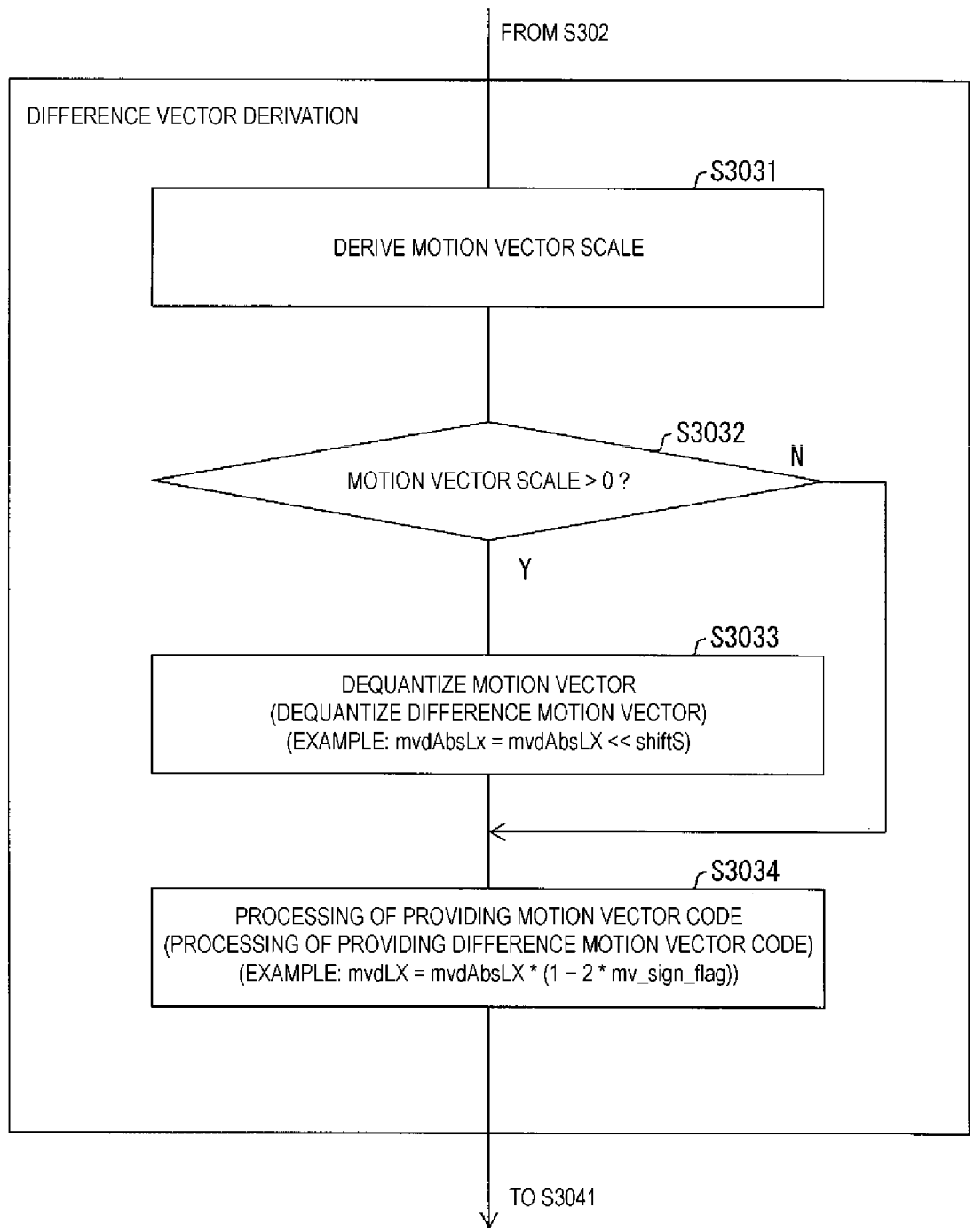
FIG. 19 is a flowchart illustrating an example of difference vector derivation processing according to the present embodiment.

Next, in S303, the inter-prediction parameter decoding control unit 3031 derives a difference vector mvdLX. As illustrated in S304 in FIG. 18B, the vector candidate selection unit 3034 may perform round processing on the selected prediction vector. Next, in S305, the addition unit 3035 adds the prediction vector mvpLX and the difference vector mvdLX to calculate a motion vector mvLX. In other words, mvLX is calculated from $mvLX=mvpLX+mvdLX.$ Difference Vector Derivation Processing Next, motion vector derivation processing will be described using FIG. 19. FIG. 19 is a flowchart more specifically illustrating the difference vector derivation processing in Step S303 mentioned above. The difference vector derivation processing includes two processing described below. Dequantization processing (PS_DQMV): processing of dequantizing a motion vector difference absolute value mvdAbsVal (quantization value) being a value decoded from the coded data and a quantized value, and deriving the motion vector difference absolute value mvdAbsVal with specific accuracy (for example, basic vector accuracy described below). Sign providing processing (PS_SIGN): processing of determining a code of the derived motion vector difference absolute value mvdAbsVal and deriving a motion vector difference mvdLX.

In the following description of FIG. 19, each step is performed by the inter-prediction parameter decoding control unit 3031 unless explicitly described otherwise.

As illustrated in FIG. 19, a motion vector scale shiftS being a parameter that designates motion vector accuracy is derived in S3031, and whether the motion vector scale>0 is determined in S3032. In a case that the motion vector scale>0 is true, that is, in a case that shiftS>0 (Y in S3032), a difference vector is dequantized by, for example, bit shift processing by using shiftS in S3033. Here, more specifically, the bit shift processing is performed by, for example, processing (processing PS_DQMV0) of shifting a quantized motion vector difference absolute value mvdAbsVal by shiftS to the left:

$mvdAbsVal=mvdAbsVal<<shiftS$     Equation (Scale)

Then, the code providing processing is performed on the difference vector in S3034, and the processing proceeds to S3041. Note that the sign providing processing (processing PS_SIGN) is performed by $mvdLX=mvdAbsVal*(1-2*mv\_sign\_flag)$     Equation (sign).

In other words, the motion vector difference mvdLX is derived from the motion vector difference absolute value mvdAbsVal according to a value of mv_sign_flag. Note that in a case that the motion vector scale>0 is false, that is, in a case that shiftS=0 (N in S3032), the processing proceeds to S3034 without passing through S3033. Note that dequantization of a difference vector to which a shift at a value 0 (shiftS=0) is applied does not affect a value of the difference vector. Thus, also in the case that the motion vector scale>0 is false, S3033 may be performed after the motion vector scale is derived as 0 (shiftS=0) without skipping S3033.

Further, a value of greater than or equal to 0 is generally used for the motion vector scale, and thus in a case that the motion vector scale is other than 0, the motion vector scale is always positive (>0). Thus, "motion vector scale !=0" may be used for determination instead of determination of "motion vector scale>0". Note that the same also applies to other processing of determining "motion vector scale>0" herein.

Prediction Vector Round Processing

Figure 20:
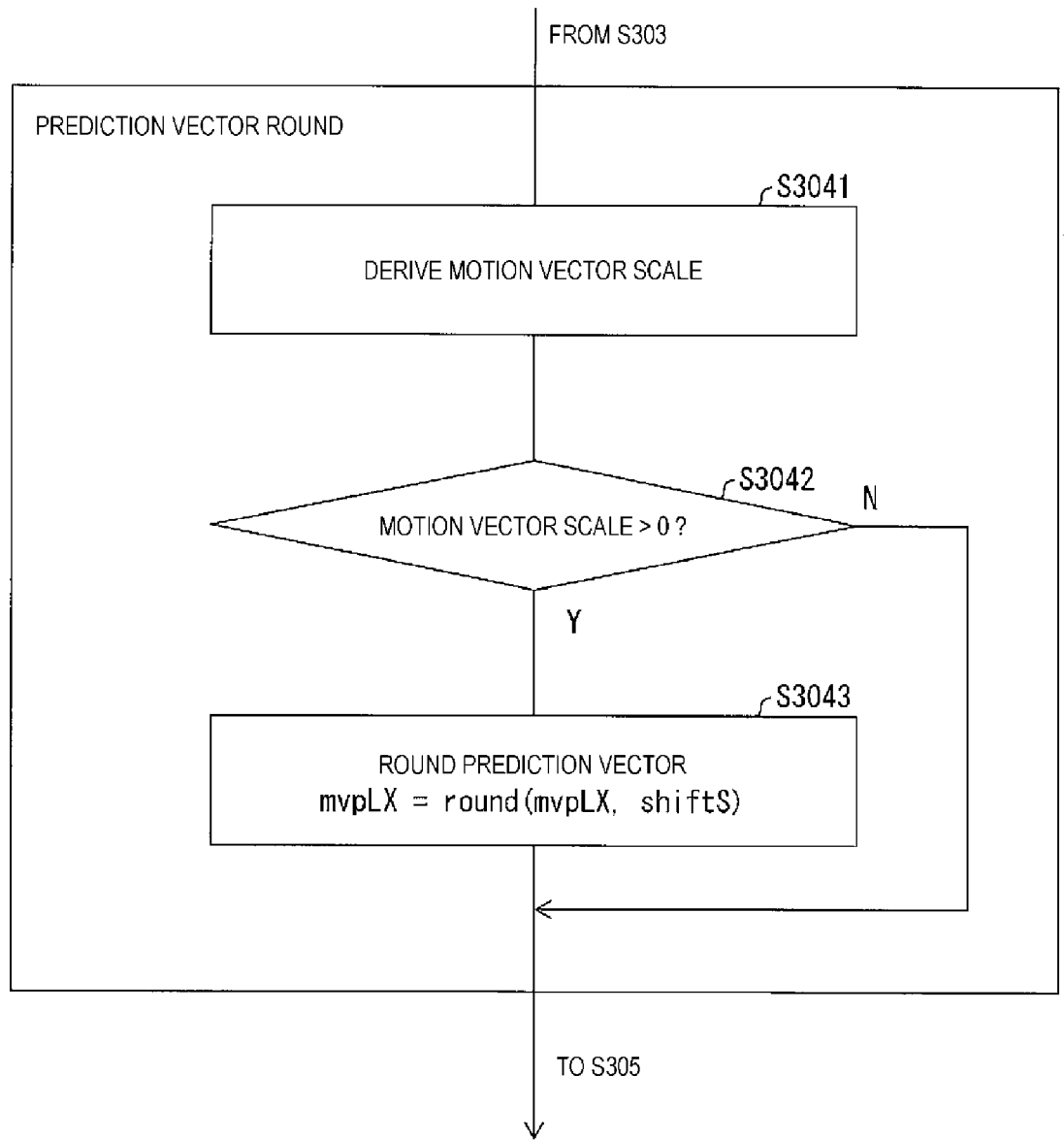
FIG. 20 is a flowchart illustrating an example of prediction vector round processing according to the present embodiment.

Next, prediction vector round processing (prediction motion vector round processing) will be described using FIG. 20. FIG. 20 is a flowchart more specifically illustrating the prediction vector round processing in Step S304 mentioned above. In the following description of FIG. 20, each step is performed by the vector candidate selection unit 3034 unless explicitly described otherwise. As illustrated in FIG. 20, a motion vector scale is derived in S3041, and whether the motion vector scale>0 is determined in S3042. In a case that the motion vector scale>0 is true (Y in S3042), that is, in a case that a difference vector is dequantized by the motion vector scale, round processing (processing PS_PMVROUND) may be performed on a prediction motion vector mvpLX by round, which is $$mvpLX = \text{round}(mvpLX, shiftS),$$

based on the motion vector scale in S3043. Here, the round(mvpLX, shiftS) represents a function that performs the round processing with shiftS on the prediction motion vector mvpLX. For example, the round processing may set the prediction motion vector mvpLX to a value in 1<<shiftS units (discrete value) by using equations (SHIFT-1) to (SHIFT-4) described below.

After S304, the processing proceeds to S305. In S305, a motion vector mvLX is derived from the prediction vector mvpLX and the difference vector mvdLX. Note that, in a case that the motion vector scale>0 is false (N in S3042), the processing proceeds to S305 without rounding the prediction motion vector mvpLX, and the motion vector mvLX is derived.

Motion Vector Scale Derivation Processing using Motion Vector Accuracy Flag

Figure 21:
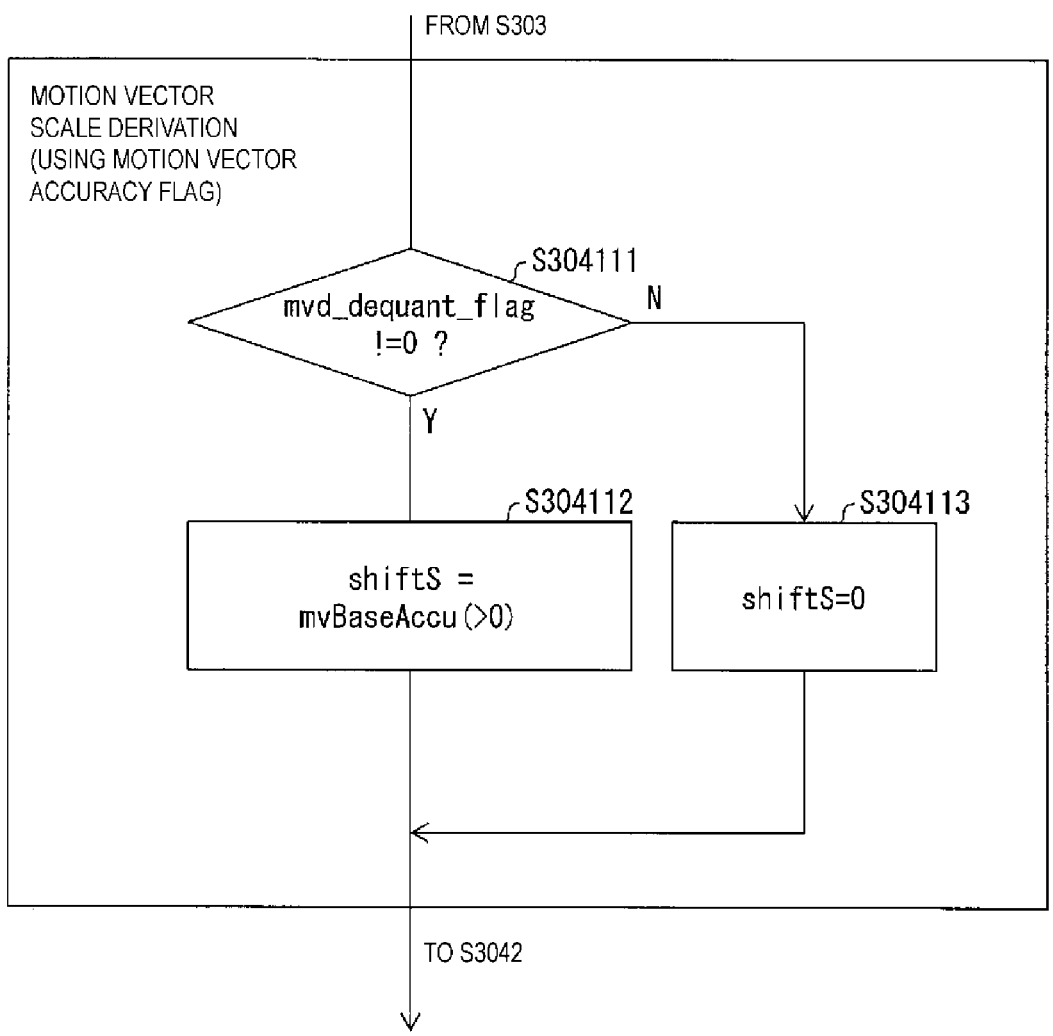
FIG. 21 is a flowchart specifically illustrating an example of motion vector scale derivation processing according to the present embodiment.

Next, motion vector scale derivation processing (PS_P0) using a motion vector accuracy flag will be described using FIG. 21. FIG. 21 is a flowchart more specifically illustrating the motion vector scale derivation processing in Steps S3031 (see FIG. 19) and S3041 (see FIG. 20) mentioned above. FIG. 21 specifically exemplifies the processing in S3041 for the sake of description, but the processing illustrated in FIG. 21 may be applied to S3031.

In the following description of FIG. 21, each step is performed by the inter-prediction parameter decoding control unit 3031 unless explicitly described otherwise.

As illustrated in FIG. 21, whether the motion vector accuracy flag mvd_dequant_flag satisfies mvd_dequant_flag !=0 is determined in S304111. In a case that $$mvd\_dequant\_flag != 0$$

is true (Y in S304111), for example, in a case that mvd_dequant_flag=1, for example, shiftS is configured to be equal to motion vector basic accuracy mvBaseAccu (>0) being a parameter indicating a reference of the motion vector accuracy in S304112, and the accuracy of the motion vector is configured to be a full pel. Here, a value of mvBaseAccu is, for example, 2. After S304112, the processing proceeds to S3042. In a case that the motion vector accuracy flag mvd_dequant_flag !=0 is false (N in S304111), for example, in a case that mvd_dequant_flag=0, shiftS=0 is configured in S304113, and the processing proceeds to S3042. In this case, the accuracy of the motion vector is configured to be a ¼ pel. Note that, for example, shiftS may be configured to be motion vector basic accuracy mvBaseAccu−1, the motion vector basic accuracy mvBaseAccu being the parameter indicating the reference of the motion vector accuracy in S304112. In this case, in a case that mvd_dequant_flag is 1 (other than 0), the accuracy of the motion vector is configured to be a half pel.

Note that, in the configuration described above, the accuracy of the motion vector is reduced in the case that mvd_dequant_flag is 1, and the accuracy of the motion vector is maintained in the case that mvd_dequant_flag is 0. In another configuration, the motion vector accuracy may be reduced in a case that a value of mvd_dequant_flag is a different value, for example, 0, and the motion vector accuracy may be maintained in the case that mvd_dequant_flag is 1. In other words, a flag indicated herein can be obtained by combining a numerical value of the flag and a content indicated by the flag.

In this way, according to the above-described configuration, accuracy of a motion vector is switched by referring to a motion vector accuracy flag, and thus a motion vector having more appropriate accuracy can be used. On the other hand, the motion vector accuracy flag needs to be included in the coded data, and thus a code amount increases, and coding efficiency may not be improved as it is expected.

Hereinafter, an example of a configuration for using a motion vector having appropriate accuracy while improving coding efficiency will be described.

Motion Vector Scale Derivation Processing using Block Size of Target Block

Figure 22:
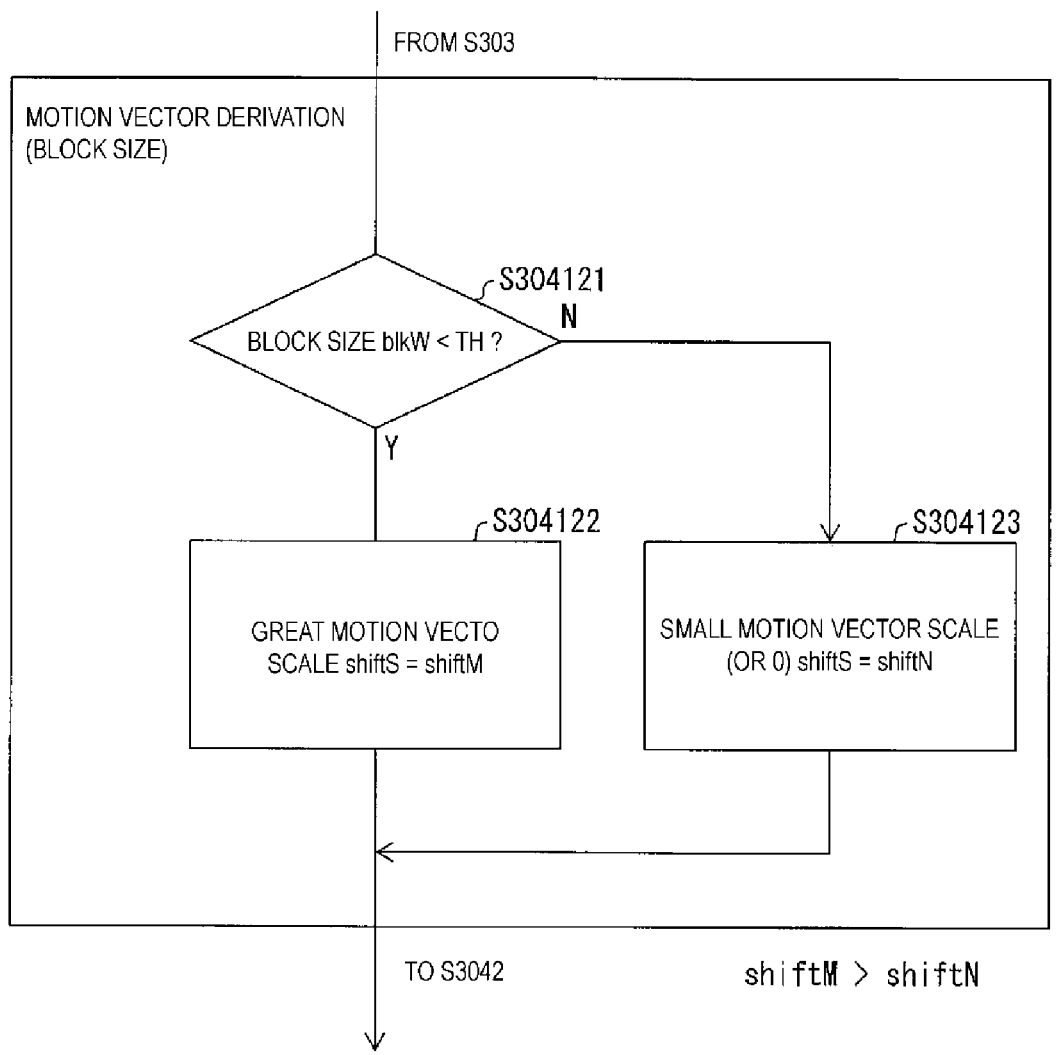
FIG. 22 is a flowchart more specifically illustrating another example of the motion vector scale derivation processing according to the present embodiment.

FIG. 22 is used as an example of a configuration (derivation processing PS_P1A) for using a motion vector having appropriate accuracy while improving coding efficiency to describe motion vector scale derivation processing using a block size of a target block. FIG. 22 is a flowchart more specifically illustrating the motion vector scale derivation processing in Steps S3031 (see FIG. 19) and S3041 (see FIG. 20) mentioned above. FIG. 22 specifically exemplifies the processing in S3041 for the sake of description, but the processing illustrated in FIG. 22 may be applied to S3031.

In the following description of FIG. 22, each step is performed by the inter-prediction parameter decoding control unit 3031 unless explicitly described otherwise.

As illustrated in FIG. 22, whether a block size blkW satisfies $$blkW < TH \text{ (where TH is a prescribed threshold value)}$$

is determined in S304121. In a case that the block size blkW<TH is true (Y in S304121), that is, in a case that the block size blkW is smaller, $$shiftS = shiftM$$

is configured in S304122, and the processing proceeds to S3042. Further, in a case that the block size blkW<TH is false (N in S304121), that is, in a case that the block size blkW is greater, $$shiftS = shiftN$$

is configured in S304123, and the processing proceeds to S3042. Here, shiftM and shiftN are scale parameters that satisfy shiftM>shiftN, and shiftN may be 0.

Note that the processing in FIG. 22 may also be collectively expressed in the following equation.

$$shiftS = (blkW < TH)?shiftM:shiftN \qquad \text{(Equation P1A)}$$

Note that, in a configuration in which a width blkW of the block size is different from a height blkH, blkW+blkH<TH may be used instead of blkW<TH as determination for a threshold value of a block size. Note that the above-described modification may also be appropriately applied to other processing herein.

Further, for the branching determination, ≤(less than or equal to) may be used instead of <(greater than), and branching of Y and N may be reversed by using > and ≥ as the equivalent configuration. Note that the above-described modification may also be appropriately applied to other processing herein.

As described above, the motion vector scale is derived such that a value of the motion vector scale is reduced (the motion vector accuracy is increased) with a greater block size according to the block size. As in the above-described example, in a configuration in which a block size is classified according to the block size and a motion vector scale is switched according to the classification, the number of classifications of the block size is not limited to two and may be greater than or equal to three.

In this way, according to the above-described configuration, accuracy of a difference vector can be switched according to a block size. For example, accuracy can be switched to high accuracy of a vector in a case that a block size is greater than a prescribed value, and can be switched to low accuracy of a motion vector in a case that a block size is smaller than the prescribed value. In this way, a motion vector having more appropriate accuracy can be used by switching accuracy of the motion vector according to a block size.

Further, in the above-described configuration, accuracy of a difference vector can be switched without using a motion vector accuracy flag. Therefore, the motion vector accuracy flag does not need to be coded and decoded, and thus a code amount of the coded data is reduced. Moreover, this can improve coding efficiency.

Figure 23:
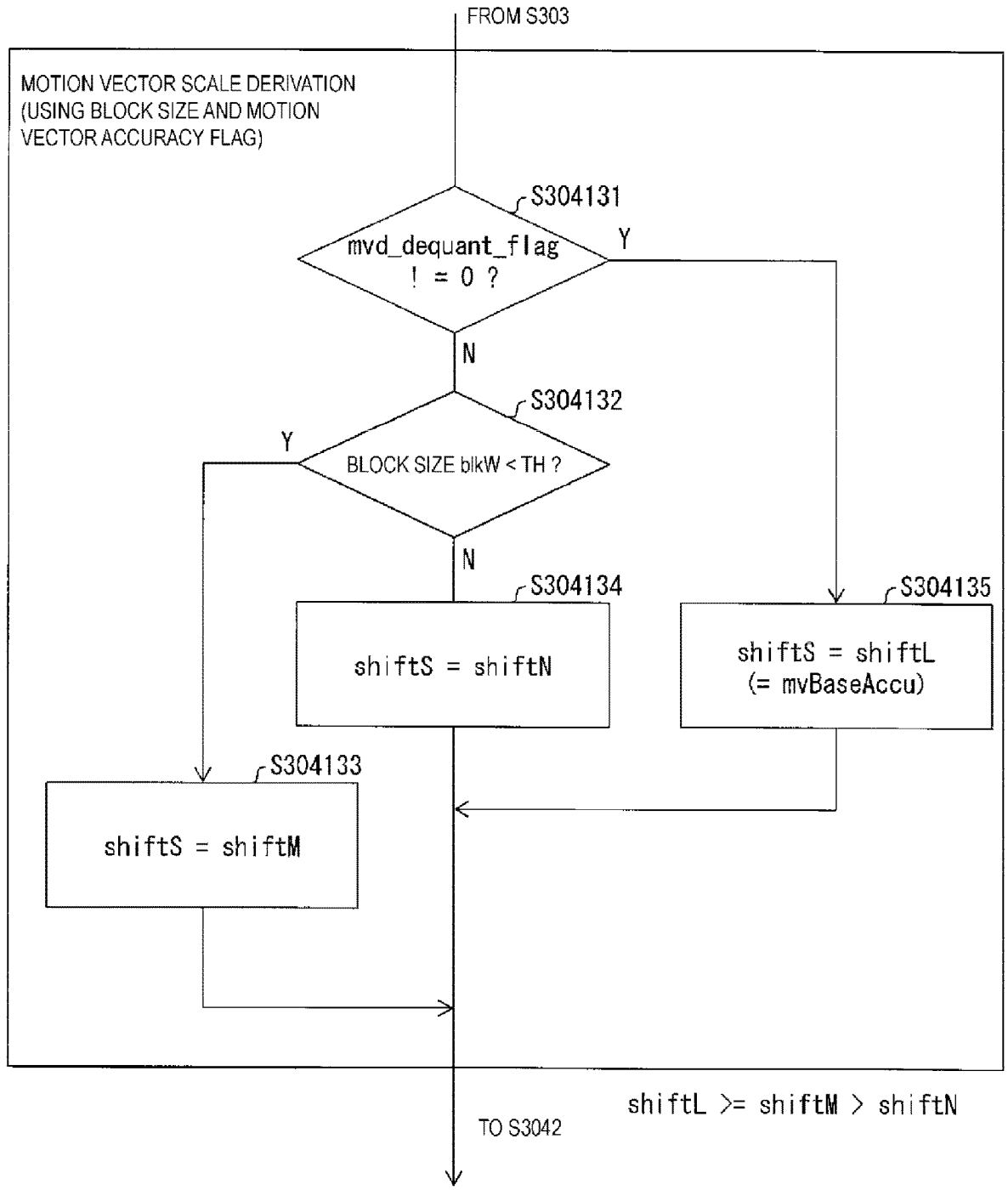
FIG. 23 is a flowchart more specifically illustrating another example of the motion vector scale derivation processing according to the present embodiment.

Motion Vector Scale Derivation Processing using Block Size and Motion Vector Accuracy Flag FIG. 23 is used as another example of a configuration (derivation processing PS_P1B) to describe motion vector scale derivation processing using a block size of a target block and a motion vector accuracy flag. FIG. 23 is a flowchart more specifically illustrating the motion vector scale derivation processing in Steps S3031 and S3041 mentioned above. FIG. 23 specifically exemplifies the processing in S3041 for the sake of description, but the processing illustrated in FIG. 23 may be applied to S3031.

As illustrated in FIG. 23, whether mvd_dequant_flag !=0 is determined in S304131. In a case that mvd_dequant_flag !=0 is false (N in S304131), that is, in a case that mvd_dequant_flag is 0, whether the block size blkW satisfies blk$W$<TH (where TH is a prescribed threshold value)

is determined in S304132. In a case that the block size blkW<TH is true (Y in S304132), that is, in a case that the block size blkW is smaller, shift$S$=shift$M$ is configured in S304133, and the processing proceeds to S3042. In a case that the block size blkW<TH is false (N in S304132), that is, in a case that the block size blkW is greater, shift$S$=shift$N$ which is a value different from a value (shiftM) in the case that the block value is smaller, is configured as a motion vector scale in S304133, and the processing proceeds to S3042.

Further, in a case that mvd_dequant_flag !=0 is true (Y in S304131), that is, in a case that mvd_dequant_flag=1, shiftS=shiftL is configured, and the processing proceeds to S3042. Here, shiftL, shiftM, and shiftN are scale parameters that satisfy shiftL≥shiftM=shiftN, and shiftN may be 0. shiftN=0 corresponds to no dequantization on a motion vector (difference motion vector) (a motion vector that is not coarse by a quantization scale is coded). Note that configuring shiftL=mvBaseAccu and a full pel may be appropriate in the case that mvd_dequant_flag is 1.

Note that a part of the processing in FIG. 23 and the processing in S304132 to S304134 (corresponding to FIG. 22) can also be expressed by the above-mentioned (Equation P1A).

The whole processing in FIG. 23 may also be collectively expressed in the following equation (Equation P1B).

shift$S$=mvd_dequant_flag!=0?shift$L$:
(blk$W$<TH)?shift$M$:shift$N$    (Equation P1B)

As described above, a constitution is used in which a block size is classified into modes using motion vectors having multiple degrees of accuracy according to the block size, and motion vector accuracy is switched such that a value of the motion vector scale is reduced (the motion vector accuracy is increased) with a greater block size. Note that the block size may be classified into three or more instead of two.

According to the above-described configuration, accuracy of a motion vector is determined by referring to both of a block size and a motion vector accuracy flag, and thus a motion vector having more appropriate accuracy can be used. For example, in a case that accuracy of a motion vector is indicated as integer accuracy (low accuracy) by a motion vector accuracy flag, accuracy of a difference vector is configured to be integer accuracy (low accuracy) regardless of a block size. In a case that accuracy of a motion vector is indicated as fractional accuracy (high accuracy) by a motion vector accuracy flag, accuracy of a difference vector can be further switched according to a block size.

Therefore, according to the above-described configuration, coding efficiency can be improved by using a motion vector having more appropriate accuracy.

Note that the above-mentioned motion vector derivation can be put in other words as follows. Specifically, the inter-prediction parameter decoding unit 303 (motion vector derivation unit) derives a motion vector by adding a difference vector to a prediction vector or subtracting a difference vector from a prediction vector for each prediction block. The inter-prediction parameter decoding unit 303 switches accuracy of a motion vector derived for a prediction block (particularly, a shift value used to derive a motion vector difference absolute value) according to the size of the prediction block.

Further, a motion vector to be derived by the above-mentioned processing of deriving a motion vector can be expressed by the following equation. In other words, in a case that a motion vector as a derivation target, a prediction vector, a difference vector, and round processing are respectively expressed as mvLX, mvpLX, mvdLX, and round ( ), a shift amount shiftS is determined according to the size of a prediction block, and mvLX may be determined by mv$LX$=round(mvp$LX$)+(mvd$LX$<<shift$S$).

Note that a motion vector difference absolute value may be dequantized instead of the difference vector mvdLX represented by a term of the above-described (mvdLX<<shiftS). In other words, processing of dequantizing the motion vector difference absolute value mvdAbsVal may be performed, and coding processing may be then performed as follows.

mvdAbsVal=mvdAbsVal(=|qmvd|)<<shiftS mvdLX=mvdAbsVal*(1−2*mv_sign_flag)

mvLX=round(mvpLX)+mvdLX

In the above, the variables mvdAbsVal and mvdLX are expressed by being updated, but can be expressed with "'" to clarify the processing as follows.

mvdAbsVal'=mvdAbsVal(=|qmvd|)<<shiftS mvdLX'=mvdAbsVal'*(1−2*mv_sign_flag)

mvLX=round(mvpLX)+mvdLX'

As described in the above-described parenthesis ( ), a difference motion vector absolute value before dequantization (that has been quantized) may be represented by qmvd instead of mvdAbsVal.

Various Specific Examples of Round Processing

Round processing is mentioned in the description above. A specific example of the round processing does not limit the present embodiment, and, for example, round(mvpLX)=(mvpLX>>shiftS<<shiftS)  (SHIFT-1)

may be used. Further, a variable in round( ) is not limited to mvpLX. Examples of the round processing may include round processing using the following equation in addition to the above-mentioned example. For example, round(mvpLX)=((mvpLX+offsetS)==shiftS)<<shiftS  (SHIFT-2)

may be used with an offset value of offsetS=1<<(shiftS−1)

Further, round(mvpLX)=mvpLX>0?(mvpLX>>shiftS)
    <<shiftS:−(((−mvpLX)>>shiftS)<<shiftS)  (SHIFT-3), in other words, in a case that a round target is negative, the round target may be converted into a positive value once by being multiplied by −1, the same processing as (Equation: SHIFT-1) may be performed, and the round target may be then converted into a negative value by being multiplied by −1.

Further, round(mvpLX)=mvpLX>0?((mvpLX+
    offsetS)>>shiftS)<<shiftS:−((((−mvpLX+
    offsetS))>>shiftS)<<shiftS)  (SHIFT-4)

in other words, the processing obtained by combining the processing of Equation (SHIFT-2) and Equation (SHIFT-3) may be used.

Example of Motion Vector Accuracy Switched by using Block Size

A specific example of motion vector accuracy switched by using a block size of a target block (derivation processing P1A) will be described below by using FIGS. 24A to 24C. FIGS. 24A to 24C are tables illustrating a relationship between basic vector accuracy and a parameter (shiftS) indicating motion vector accuracy configured (switched) depending on a block size of a target block. For example, the inter-prediction parameter decoding control unit 3031 may perform the processing in S304121 to S304123 illustrated in FIG. 22 mentioned above in a manner as the examples illustrated in FIGS. 24A to 24C.

Note that, herein, a concept of a "basic vector" is introduced, and a parameter specifying accuracy of this basic vector is assumed to be represented by mvBaseAccu. The "basic vector" is assumed to be decoded virtually with accuracy of 1<<mvBaseAccu. However, the name of the "basic vector" is only used for the sake of convenience, and the "basic vector" is merely introduced as a reference for specifying accuracy of a motion vector. In this patent, accuracy of a vector when being input to the motion compensation filter unit 30912 is given by the basic vector accuracy. For example, in a case that mvBaseAccu=2, the basic vector is assumed to be handled with ¼ (=1/(1<<mvBaseAccu)) pel accuracy. The motion compensation filter unit 30912 performs filter processing by using a set of filter coefficients (filter coefficients from 0 to M−1) of phases from 0 to M−1 (M=(1<<mvBaseAccu)). Further, a derived (used) motion vector may be stored in the prediction parameter memory 108 by using the accuracy of the basic vector.

FIG. 24A is a table illustrating a relationship among a block size of a target block, basic vector accuracy, and a parameter shiftS indicating motion vector accuracy in a case that the motion vector accuracy is switched between two values. In the example indicated by "I" in FIG. 24A, mvBaseAccu=3, and the accuracy of the basic vector is ⅛ pel. In the example indicated by "I", when the block size blkW of the target block satisfies blkW>=64, shiftS=0 is configured and the motion vector accuracy is ⅛ pel. On the other hand, when the block size blkW satisfies blkW<64, shiftS=1 is configured and the motion vector accuracy is ¼ pel.

In the example indicated by "II" in FIG. 24A, mvBaseAccu=4, and accuracy of a basic vector is 1/16 pel. In the example indicated by "II", when the block size blkW of the target block satisfies blkW>=64, shiftS=0 is configured and the motion vector accuracy is 1/16 pel. On the other hand, when the block size blkW satisfies blkW<64, shiftS=2 is configured and the motion vector accuracy is ¼ pel.

In the example indicated by "III" in FIG. 24A, mvBaseAccu=6, and the accuracy of the basic vector is 1/64 pel. In the example indicated by "III", when the block size blkW of the target block satisfies blkW>=64, shiftS=0 is configured and the motion vector accuracy is 1/64 pel. On the other hand, when the block size blkW satisfies blkW<64, shiftS=4 is configured and the motion vector accuracy is ¼ pel.

FIG. 24B is a table illustrating a relationship among a block size of a target block, basic vector accuracy, and a parameter (shiftS) indicating motion vector accuracy in a case that the motion vector accuracy is switched among three values.

In the example illustrated in FIG. 24B, the basic vector accuracy is 1/64 pel. In a case that the block size blkW of the target block satisfies blkW>=64, shiftS=0 is configured and the motion vector accuracy is 1/64 pel. In a case that the block size blkW satisfies blkW>32 && blkW<64, shiftS=2 is configured and the motion vector accuracy is 1/16 pel. In a case that the block size blkW satisfies blkW<32, shiftS=4 is configured and the motion vector accuracy is ¼ pel.

FIG. 24C is a table illustrating a relationship among a block size of a target block, basic vector accuracy, and a parameter (shiftS) indicating motion vector accuracy in a case that the motion vector accuracy is switched among five values.

In the example illustrated in FIG. 24C, the basic vector accuracy is 1/64 pel. In a case that the block size blkW of the target block satisfies blkW>=128, shiftS=0 is configured and the motion vector accuracy is 1/64 pel. In a case that the block size blkW satisfies blkW>64 && blkW<128, shiftS=1 is configured and the motion vector accuracy is 1/32 pel. In a case that the block size blkW satisfies blkW>=32 && blkW<64, shiftS=2 is configured and the motion vector accuracy is 1/16 pel. In a case that the block size blkW satisfies blkW>=16 && blkW<32, shiftS=3 is configured and the motion vector accuracy is 1/8 pel. In a case that the block size blkW satisfies blkW<16, shiftS=4 is configured and the motion vector accuracy is 1/4 pel.

Use of Motion Vector Accuracy MVQStep

The inter-prediction parameter decoding control unit 3031 may perform dequantization by the product of quantization step size MVQStep of a motion vector instead of a left shift by the motion vector scale shiftS. In other words, dequantization may be performed by the following equation instead of Equation (Scale).

$$mvdAbsVal = mvdAbsVal * MVQStep \quad \text{Equation (QStep)}$$

Here, MVQStep and shiftS satisfy a relationship of $$shiftS = \log_2(MVQStep)$$

This is equivalent to the following equation.

$$MVQStep = 1 << shiftS = 2^{shiftS}$$

With accuracy of a basic motion vector of 1/8, accuracy (MVStep) of a motion vector to be coded is 1/8 in a case that a quantization step MVQStep is 1, and the accuracy (MVStep) of the motion vector to be coded is 1/4 in a case that the quantization step MVQStep is 2. Therefore, with the accuracy of the basic motion vector of 1/mvBaseAccu, the accuracy MVStep of the motion vector to be coded is 1/mvBaseAccu*MVQStep in the quantization step MVQStep. For example, in a case that switching the motion vector accuracy indicated by "I" in FIG. 24A is performed by using a product of MVQStep instead of a shift in the quantization scale shiftS, MVQStep=1 (=1<<ShiftS=1<<0=1) is configured in a case that the block size blkW satisfies blkW>=64. In other words, MVStep 1/8 (1/mvBaseAccu*MVQStep=1/8*1) is configured. On the other hand, when the block size blkW satisfies blkW<64, MVQStep=2 (=1<<ShiftS=1<<1=2) is configured. In other words, MVStep=1/4=(1/8*2) is configured.

In a case that switching the motion vector accuracy illustrated in FIG. 24B is performed by using MVQstep, MVQStep=1 (=1<<shiftS=1<<0) is configured when the block size blkW satisfies blkW>=64. In other words, MVStep=1/64=(1/64*1) is configured. In a case that the block size blkW satisfies blkW>=32 && blkW<64, MVQStep=4 (=1<<ShiftS=1<<2=4) is configured. In other words, MVStep=1/16=(1/64*4) is configured. In a case that the block size blkW satisfies NM<32, MVQStep=16 (=1<<ShiftS=1<<4) is configured. In other words, MVStep=1/4=(1/64*16) is configured.

In a case that switching the motion vector accuracy illustrated in FIG. 24C is performed by using MVQStep, MVQStep=1 is configured when the block size blkW satisfies blkW>=128. In other words, MVStep=1/64 is configured. In a case that the block size blkW satisfies blkW>=6.4 && blkW<128, MVQStep=2 is configured. In other words, MVStep=1/32 is configured. In a case that the block size blkW satisfies blkW>=32 && blkW<64, MVQStep=3 is configured. In other words, MVStep=1/16 is configured. In a case that the block size blkW satisfies blkW>=16 && <32, MVQStep=4 is configured. In other words, MVStep=1/8 is configured. In a case that the block size blkW satisfies blkW<16, MVQStep=5 is configured. In other words, MVStep=1/4 is configured.

Example of Motion Vector Accuracy Switched by using Block Size and Motion Vector Accuracy Flag Next, a specific example of motion vector accuracy switched by using a block size and mvd_dequant_flag being a motion vector accuracy flag (derivation processing PS_P1B) will be described using FIGS. 25A to 25C. FIGS. 25A to 25C are tables illustrating a relationship of a parameter (shiftS) indicating motion vector accuracy configured (switched) depending on a block size of a target block and a motion vector accuracy flag. Note that, each of FIGS. 25A to 25C illustrates the example in which the basic vector accuracy is 1/16, but an arbitrary value is applicable to a value of the basic vector accuracy. The inter-prediction parameter decoding control unit 3031 may perform the processing in S304131 to S304135 illustrated in FIG. 23 mentioned above in a manner as the examples illustrated in FIGS. 25A to 25C.

In the example illustrated in FIG. 25A, in a case that the motion vector accuracy flag is mvd_dequant_flag=0 and a block size is greater than a prescribed value (great block size), shiftS=0 is configured and the motion vector accuracy is 1/16 pel. In a case that the motion vector accuracy flag is mvd_dequant_flag=0 and the block size is smaller than the prescribed value (small block size), shiftS=2 is configured and the motion vector accuracy is 1/4 pel. On the other hand, in a case that the motion vector accuracy flag is mvd_dequant±flag=1, shiftS=4 is configured and the motion vector accuracy is 1 pel (full pel). This is expressed by the following equation.

$$shiftS = mvd\_dequant\_flag!=0?4:(blkW<TH)?2:0$$

(corresponding to Equation P1B)

In the example illustrated in FIG. 25B, in the case that the motion vector accuracy flag is mvd_dequant_flag=0 and the block size is greater than the prescribed value (great block size), shiftS=0 is configured and the motion vector accuracy MVStep is 1/16 pel. In a case that the motion vector accuracy flag is mvd_dequant_flag=0 and the block size is smaller than the prescribed value (small block size), shiftS=2 is configured and the motion vector accuracy is 1/4 pel. On the other hand, in a case that the motion vector accuracy flag is mvd_dequant_flag=1 and the block size is greater than the prescribed value (great block size), shiftS=3 is configured and the motion vector accuracy is 1/2 pel (half pel). In a case that the motion vector accuracy flag is mvd_dequant_flag=1 and the block size is smaller than the prescribed value (small block size), shiftS=4 is configured and the motion vector accuracy is 1 pel (full pel).

In the example illustrated in FIG. 25C, in the case that the motion vector accuracy flag is mvd_dequant_flag=0 and the block size is greater than the prescribed value (great block size), shiftS=0 is configured and the motion vector accuracy is 1/16 pel. In the case that the motion vector accuracy flag is mvd_dequant_flag=0 and the block size is smaller than the prescribed value (small block size), shiftS=1 is configured and the motion vector accuracy is 1/8 pel. On the other hand, in the case that the motion vector accuracy flag is mvd_dequant_flag=1 and the block size is greater than the prescribed value (great block size), shiftS=2 is configured and the motion vector accuracy is 1/4 pel. In the case that the motion vector accuracy flag is mvd_dequant_flag=1 and the block size is smaller than the prescribed value (small block size), shiftS=3 is configured and the motion vector accuracy is 1/2 pel (half pel).

Example of Motion Vector Accuracy Switched by using QP

Note that the configuration in which shiftS is derived based on a block size of a target block is described in the above-mentioned example. Another configuration in which the inter-prediction parameter decoding control unit 3031 (motion vector derivation unit) derives shiftS, based on a Quantization Parameter (QP) being a quantization parameter instead of a block size of a target block may be used (derivation processing PS_P2A). Particularly, by deriving shiftS according to magnitude of QP (or a prediction value of QP), a motion vector with high accuracy (small shiftS) is used for small QP, and a motion vector with low accuracy (great shiftS) is used for great QP. For example, QP is determined according to a prescribed value. A motion vector with high accuracy is used in a case that QP is smaller than a prescribed value, and a motion vector with low accuracy is used in other cases.

Here, an example of motion vector accuracy switched by using QP will be described with reference to FIGS. 26A to 26C. FIGS. 26A to 26C are tables illustrating a parameter (shiftS) indicating motion vector accuracy configured (switched) depending on QP. For example, the inter-prediction parameter decoding control unit 3031 may perform the processing of deriving a difference vector in a manner as the examples illustrated in FIGS. 26A to 26C. In the description of FIGS. 26A to 26C, a value of basic vector accuracy is not particularly mentioned, and an arbitrary value can be used for basic vector accuracy. FIGS. 26A to 26C respectively illustrate examples of switching two, three, and five values according to QP, but the number of switching (the number of classifications of QP) is not limited to these. Also, a threshold value used to classify QP is not limited to the examples of the drawing.

FIG. 26A is a table illustrating a relationship between QP and motion vector accuracy (shiftS) in a case that the motion vector accuracy is switched between two values. In the example illustrated in FIG. 26A, in a case that QP is small (QP<24), shiftS=0 is configured. On the other hand, in a case that QP is great (QP>=24), a value greater than a value for small QP is configured to shiftS, which is shiftS=1 in this case.

The example illustrated in FIG. 26B is a table illustrating a relationship between QP and a parameter (shiftS) indicating motion vector accuracy in a case that the motion vector accuracy is switched among three values. As illustrated in FIG. 26B, in a case that QP is small (QP<12), shiftS=0 is configured. In a case that QP is intermediate (QP>=12 && QP<24), shiftS=1 is configured. In a case that QP is great (QP>=36), shiftS=2 is configured.

FIG. 26C is a table illustrating a correspondence between QP and a parameter (shiftS) indicating motion vector accuracy in a case that the motion vector accuracy is switched among five values. As illustrated in FIG. 26C, in a case that QP<12 is satisfied, shiftS=0 is configured. In a case that QP>=12 && QP<18 is satisfied, shiftS=1 is configured. In a case that QP>=18 && QP<24 is satisfied, shiftS=2 is configured. In a case that QP>=24 && QP<36 is satisfied, shiftS=3 is configured. In a case that QP>=36 is satisfied, shiftS=4 is configured.

According to the above-described configuration, accuracy of a motion vector derived for the prediction block is switched according to magnitude of a quantization parameter, and thus a prediction image can be generated by using a motion vector having appropriate accuracy. Note that the configuration in which accuracy of a motion vector is switched according to a flag can also be used together.

Use of Motion Vector Accuracy MVQStep

The inter-prediction parameter decoding control unit 3031 may derive MVQStep as motion vector accuracy instead of shiftS mentioned above according to a block size of a target block.

For example, in a case that switching the motion vector accuracy illustrated in FIG. 26A is performed by using MVQStep, MVQStep=16 is configured when QP<24 is satisfied. In other words, MVStep=1/16 is configured. On the other hand, when QP>=24 is satisfied, MVQStep=4 is configured. In other words, MVStep=1/4 is configured.

In a case that switching the motion vector accuracy illustrated in FIG. 26B is performed by using MVQStep, MVQStep=64 is configured when QP<12 is satisfied. In other words, MVStep=1/64 is configured. In a case that QP>=12 && QP<36 is satisfied, MVQStep=16 is configured. In other words, MVStep=1/16 is configured. In a case that QP<36 is satisfied, MVQStep=4 is configured. In other words, MVStep=1/4 is configured.

In a case that switching the motion vector accuracy illustrated in FIG. 26C is performed by using MVQStep, MVQStep=64 is configured when QP<12 is satisfied. In other words, MVStep=1/64 is configured. In a case that QP>=12 && QP<18 is satisfied, MVQStep=32 is configured. In other words, MVStep=1/32 is configured. In a case that QP>=18 && QP<24 is satisfied, MVQStep=16 is configured. In other words, MVStep=1/16 is configured. In a case that QP>=24 && QP<36 is satisfied, MVQStep=8 is configured. In other words, MVStep=1/8 is configured. In a case that QP>=36 is satisfied, MVQStep=4 is configured. In other words, MVStep=1/4 is configured.

Figures 27A, 27B, 28:
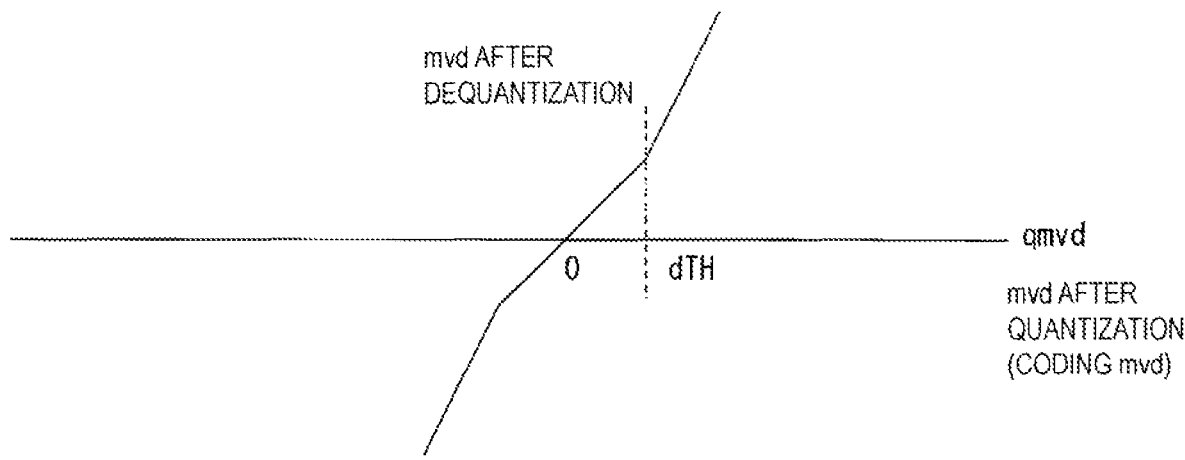
FIGS. 27A and 27B are tables illustrating motion vector accuracy (shiftS) configured (switched) depending on QP according to the present embodiment and a motion vector accuracy flag.
FIG. 28 is a graph illustrating a relationship between a quantized difference vector and a dequantized difference vector according to the present embodiment.

Example of Motion Vector Accuracy Switched by using QP and Motion Vector Accuracy Flag Next, an example of motion vector accuracy switched by using QP and mvd_dequant_flag being a motion vector accuracy flag (derivation processing PS_P2B) will be described with reference to FIGS. 27A and 27B. FIGS. 27A and 27B are tables illustrating motion vector accuracy (shiftS) configured (switched) depending on QP and a motion vector accuracy flag. The inter-prediction parameter decoding control unit 3031 may perform the processing of deriving a difference vector in a manner as the examples illustrated in FIGS. 27A and 27B.

Note that, each of FIGS. 27A and 27B illustrates the example in which the basic vector accuracy is 1/16 pel (mvBaseAccu=4), but an arbitrary value is applicable to a value of the basic vector accuracy (mvBaseAccu).

In the example illustrated in FIG. 27A, in a case that the motion vector accuracy flag mvd_dequant_flag is 1 (other than 0), a value of shiftS is determined to be a fixed value regardless of QP. In a case that the motion vector accuracy flag mvd_dequant_flag is 0, a value of motion vector scale shiftS is determined according to QP. For example, in a case that the motion vector accuracy flag is mvd_dequant_flag=0 and QP is smaller than a prescribed value (small QP), shiftS=0 is configured and the motion vector accuracy is 1/16 pel. In a case that the motion vector accuracy flag is mvd_dequant_flag=0 and QP is greater than the prescribed value (great QP), shiftS=2 is configured and the motion vector accuracy is 1/4 pel. On the other hand, in a case that the motion vector accuracy flag is mvd_dequant_flag=1, shiftS=mvBaseAccu (=4) is fixedly configured and the motion vector accuracy is 1 pel (full pel). In this way, also when shiftS is changed according to QP, it is appropriate that shiftS in the case that the motion vector accuracy flag mvd_dequant_flag is 1 is greater (motion vector accuracy is lower accuracy) than shiftS in other cases (mvd_dequant_flag is 0).

The example illustrated in FIG. 27B illustrates the example of deriving the motion vector scale shiftS according to QP also in the case that the motion accuracy scale flag is 1 (other than 0). Specifically, in the case that the motion vector accuracy flag is mvd_dequant_flag=0 and QP is smaller than the prescribed value (small QP), shiftS=0 is configured and the motion vector accuracy is ¼₁₆ pel. In the case that the motion vector accuracy flag is mvd_dequant_flag=0 and QP is greater than the prescribed value (great QP), shiftS=4 is configured and the motion vector accuracy is 1 pel. On the other hand, in a case that the motion vector accuracy flag is mvd_dequant_flag=1 and QP is smaller than the prescribed value (small QP), shiftS=3 is configured and the motion vector accuracy is ½ pel (half pel). In a case that the motion vector accuracy flag is mvd_dequant_flag=1 and QP is greater than the prescribed value (great QP), shiftS=mvBaseAccu (=4) is configured and the motion vector accuracy is 1 pel (full pel). In this way, in the case that the motion vector accuracy flag mvd_dequant_flag is 1, it is appropriate to switch the motion vector accuracy between a half pel and a full pel.

Further, a motion vector to be derived by the above-mentioned processing of deriving a motion vector can be expressed by the following equation. Specifically, in a case that a motion vector as a derivation target, a prediction vector, a difference vector, and round processing are respectively expressed as mvLX, mvpLX, mvdLX, and round ( ), a shift amount shiftS is determined according to the size of a prediction block, and mvLX is determined by $$mvLX = \text{round}(mvpLX) + (mvdLX << shiftS).$$

Processing of Dequantizing Difference Vector

Hereinafter, processing of dequantizing a difference vector according to the present embodiment will be described with reference to FIGS. 28 and 29.

The processing described below is performed by the inter-prediction parameter decoding control unit 3031 unless explicitly described otherwise.

Dequantization Processing Example 1:
Dequantizing Difference Vector with Motion Vector Accuracy According to Quantized Difference Vector Hereinafter, nonlinear dequantization processing on a quantized difference vector qmvd (quantization value, quantized difference vector) by the inter-prediction parameter decoding control unit 3031 will be described.

Note that a quantized difference vector is equivalent to a difference vector absolute value mvdAbsVal at a point in time when a syntax of the coded data is obtained by decoding (at a point of time before dequantization), and an absolute value of qmvd is mvdAbsVal. Note that FIG. 28 illustrates an example in which a quantization value qmvd of a difference vector can be either positive or negative to clarify an image in either case that the difference vector is negative or positive. On the other hand, in actual processing, qmvd may be an absolute value of a difference vector, that is, qmvd=mvdAbsVal. In the following description, qmvd is processed as an absolute value.

FIG. 28 is a graph illustrating a relationship between a quantized difference vector and a dequantized difference vector in the processing example. The horizontal axis of the graph illustrated in FIG. 28 is qmvd (obtained by decoding a difference vector that is quantized and coded in a coding device without being dequantized, that is, a quantization value of a difference vector) being a quantized difference vector. The vertical axis of the graph illustrated in FIG. 28 is a difference vector (also simply referred to as a dequantized difference vector) mvd after dequantization (=dequantized mvdAbsVal). The inter-prediction parameter decoding control unit 3031 performs dequantization processing on the quantized difference vector qmvd as illustrated in the graph illustrated in FIG. 28.

$$mvdAbsVal = mvdAbsVal(=qmvd) << shiftS$$

Subsequently, the addition unit 3035 adds a dequantized difference vector to a prediction vector or subtracts the dequantized difference vector from the prediction vector to derive a motion vector. For example, the motion vector is derived from $$mvdLX = mvdAbsVal * (1 - 2 * mv\_sign\_flag)$$

$$mvLX = \text{round}(mvpLX) + mvdLX.$$

The graph illustrated in FIG. 28 will be described below in detail. As illustrated in FIG. 28, the inter-prediction parameter decoding control unit 3031 switches accuracy of the dequantization processing on the quantized motion vector according to a relationship in the size between a quantized motion vector difference decoded from the coded data and a prescribed value (dTH).

For example, accuracy of the motion vector is configured to be high in a case that the difference vector mvd has a small absolute value, and accuracy of the motion vector is configured to be low in a case that the difference vector mvd has a great absolute value.

In other words, the dequantized difference vector mvd slightly changes with a change in the quantized difference vector qmvd when the difference vector mvd is located in the vicinity of a zero point (in the case that the difference vector mvd has a small absolute value) in comparison with when an absolute value of the difference vector mvd is located away from the vicinity of the zero point.

The dequantized difference vector greatly changes with a change in the quantized difference vector qmvd when the difference vector mvd is located away from the vicinity of the zero point (in the case that the difference vector has a great absolute value) in comparison with in a case that the difference vector mvd is located in the vicinity of the zero point.

This can be achieved by the following configuration. Specifically, in a case that an absolute value of qmvd being the quantized difference vector is less than (or less than or equal to) the prescribed value (threshold value) dTH, the inter-prediction parameter decoding control unit 3031 performs dequantization specified by a prescribed inclination (proportional coefficient) with respect to the quantized difference vector qmvd. Also, in a case that the quantized difference vector qmvd is greater than the prescribed value dTH, the inter-prediction parameter decoding control unit 3031 performs dequantization specified by an inclination obtained by bit-shifting the prescribed inclination to the left by the motion vector scale shiftS. Herein, the prescribed inclination may be, for example, 1.

The description above is summarized as follows (derivation processing Q2). Specifically, the inter-prediction parameter decoding control unit 3031 does not perform dequantization processing in a case that the quantized difference vector has a small absolute value (qmvd<dTH). Alternatively, the inter-prediction parameter decoding control unit 3031 performs only basic dequantization by multiplication by K (or a left shift by log 2(K)), and mvdAbsVal is derived from $$mvdAbsVal = K * qmvd \qquad \text{Equation Q1.}$$

Further, in a case that the quantized difference vector has a great absolute value (qmvd>=dTH is satisfied), the inter-prediction parameter decoding control unit 3031 further performs supplemental dequantization by a prescribed dequantization scale shiftS in addition to the basic dequantization, and mvdAbsVal is derived from $$\text{mvdAbsVal}=K*(\text{dTH}+(\text{qmvd}-\text{dTH})<<\text{shiftS}) \quad \text{Equation Q2.}$$

Note that dTH is expressed in the equation, and this is for connection such that a value in Equation Q1 is equal to a value in Equation Q2 in qmvd=dTH. With a focus on a coefficient (inclination) of qmvd, it may be noted that K*1<<shiftS, that is, a dequantization scale is increased by shiftS.

Here, mvdAbsVal is an absolute value of a difference vector after dequantization, and K represents a prescribed proportional coefficient. As mentioned above, K=1 or K may not be 1. The multiplication by K may be realized by a left shift by log 2(K). Note that in a case of K=1, dequantization is performed by shiftS only in a case that the quantized difference vector qmvd>=dTH is satisfied, and dequantization by shiftS is not performed in a case that qmvd is small.

Specifically, the basic vector accuracy may be ⅛ pel (mvBaseAccu=3), shiftS=1, dTH=16 in Equation Q1 and Equation Q2 described above. In this case, in a case that the quantized difference vector qmvd is greater than or equal to 16 (motion vector accuracy corresponds to 2 pel or greater), qmvd is dequantized by a left shift by shiftS=1, and the motion vector accuracy is configured to be ¼ pel. In other words, in a case that qmvd is great, the motion vector accuracy may be configured to be low.

In another example, the basic vector accuracy may be 1/16 pel (mvBaseAccu=4), shiftS=1, dTH=16 in Equation Q1 and Equation Q2 described above. In this case, in a case that the quantized difference vector qmvd is greater than or equal to 16 (motion vector accuracy corresponds to 1 pel or greater), qmvd is dequantized by a left shift by shiftS=1, and the motion vector accuracy is configured to be ⅛ pel. In other words, in a case that qmvd is great, the motion vector accuracy may be configured to be low.

Note that it can be said that the inter-prediction parameter decoding control unit 3031 derives mvdAbsVal being a difference vector absolute value from $$\text{mvdAbsVal}=\min(\text{qmvd},\text{dTH})+\max(0,(\text{qmvd}-\text{dTH})<<\text{shiftS}) \quad \text{Equation Q3}$$

when Equation Q1 and Equation Q2 are expressed by one equation.

As another configuration, in a case that the quantized difference vector qmvd is less than (or less than or equal to) a threshold value dTH, the inter-prediction parameter decoding control unit 3031 performs dequantization specified by an inclination obtained from.

$$1<<\text{shiftS1}$$

In a case that the quantized difference vector qmvd is greater than or equal to the threshold value dTH (or greater than dTH), the inter-prediction parameter decoding control unit 3031 performs dequantization specified by an inclination obtained from $$1<<\text{shiftS2}$$

Here, shiftS1 and shiftS2 may or may not have values equal to each other.

According to the above-described configuration, accuracy of the dequantization processing on a difference vector is switched according to a value of a quantized difference vector, and thus a prediction image cart be generated by using a motion vector having more appropriate accuracy.

Further, a code amount of a difference vector can be reduced, and thus coding efficiency is improved.

Dequantization Processing Example 2A: Example of Dequantizing Difference Vector with Motion Vector Accuracy According to Motion Vector Accuracy Flag and Quantized Difference Vector Next, an example of dequantizing a difference vector with motion vector accuracy according to mvd_dequant_flag being a motion vector accuracy flag and a quantized difference vector will be described (derivation processing PS_P2A). In the processing example, in a case that the motion vector accuracy flag satisfies mvd_dequant_flag=1, mvdAbsVal is derived from $$\text{mvdAbsVal}=\text{qmvd}<<\text{shiftA} \quad \text{Equation Q4.}$$

On the other hand, in a case that the motion vector accuracy flag satisfies mvd_dequant_flag=0 and quantized difference vector qmvd<prescribed value dTHS is satisfied, mvdAbsVal is derived from $$\text{mvdAbsVal}=\text{qmvd} \quad \text{Equation Q5.}$$

In a case that the motion vector accuracy flag satisfies mvd_dequant_flag=0 and quantized difference vector qmvd>=prescribed value dTHS is satisfied, mvdAbsVal is derived from $$\text{mvdAbsVal}=\text{dTHS}+(\text{qmvd}-\text{dTHS})<<\text{shiftS} \quad \text{Equation Q6.}$$

In other words, nonlinear dequantization is performed in a case that the motion vector accuracy flag mvd_dequant_flag==0, and linear dequantization is performed in a case that the motion vector accuracy flag mvd_dequant_flag==1.

The description above is summarized by the following equation.

$$\text{mvdAbsVal}=\text{mvd\_quant\_flag}==1?$$

$$\text{qmvd}<<\text{shiftA}$$

:

$$\text{qmvd}<\text{dTHS}?\text{qmvd}:\text{dTHS}+(\text{qmvd}-\text{dTHS})<<\text{shiftS}$$

In other words, the inter-prediction parameter decoding control unit 3031 switches accuracy of the dequantization processing on a difference vector according to a value (quantization value) of a quantized difference vector in a case that a flag indicating accuracy of a motion vector indicates a first value (in a case of mvd_dequant_flag==0), and performs the dequantization processing on a difference vector with fixed accuracy regardless of a quantization value of a quantized difference vector in a case that a flag indicating accuracy of a motion vector indicates a second value (in a case of mvd_dequant_flag==1).

For example, in a case that the basic vector accuracy is ⅛ pel (mvBaseAccu=3), shiftA=3, shiftS=1, and dTHS=16 in Equation Q4 to Equation Q6 described above, the inter-prediction parameter decoding control unit 3031 performs dequantization on a motion vector by shifting a motion vector qmvd after quantization (difference motion vector absolute value) by shiftA (=3 bits) to the left regardless of qmvd when the motion vector accuracy flag mvd_dequant_flag=1 is satisfied. In other words, the motion vector accuracy is a full pel, and thus the motion vector accuracy is fixedly configured to be lower than that in a case of mvd_dequant_flag=0. On the other hand, when the motion vector accuracy flag mvd_dequant_flag=0 is satisfied, the inter-prediction parameter decoding control unit 3031 performs dequantization on a motion vector by shifting a motion vector qmvd after quantization by shiftS (=1 bit) to the left in a case that qmvd is greater than or equal to a prescribed threshold value of 16 (corresponding to 2 pel). In other words, the motion vector accuracy is a ¼ pel, and thus the motion vector accuracy is configured to be lower than that in a case that qmvd is less than a prescribed threshold value of 16.

In another example, in a case that the basic vector accuracy is ¹⁄₁₆ pel (mvBaseAccu=4), shiftA=4, shiftS=2, and dTHS=16 in Equation Q4 to Equation Q6 described above, the inter-prediction parameter decoding control unit 3031 performs dequantization on a motion vector by shifting a motion vector qmvd after quantization by shiftA (=4 bits) to the left regardless of qmvd when the motion vector accuracy flag mvd_dequant_flag=1 is satisfied. In other words, the motion vector accuracy is a full pel, and the motion vector accuracy is configured to be low. On the other hand, when the motion vector accuracy flag mvd_dequant_flag=0 is satisfied, the inter-prediction parameter decoding control unit 3031 performs dequantization on a motion vector by shifting a motion vector qmvd after quantization by shiftS (=2 bits) to the left in a case that a prescribed threshold value qmvd is greater than or equal to 16 (corresponding to 1 pel). In other words, the motion vector accuracy is a ¼ pel, and the motion vector accuracy is configured to be low.

Note that different values regardless of the above-described example can be used as a prescribed threshold value and a value of a dequantization scale (shiftS, shiftA) also in the configuration of Q4 to Q6 described above.

According to the above-described configuration, a prediction image can be generated by using a motion vector having more appropriate accuracy. This improves prediction accuracy, and thus coding efficiency is improved.

Dequantization Processing Example 2B: Another Example of Dequantizing Difference Vector with Motion Vector Accuracy According to Motion Vector Accuracy Flag and Quantized Difference Vector Next, another example (derivation processing Q2B) of dequantizing a difference vector with motion vector accuracy according to a motion vector accuracy flag and a quantized difference vector will be described. In the present processing example, in a case that the motion vector accuracy flag satisfies mvd_dequant±flag=1 and quantized difference vector qmvd<prescribed value dTHA is satisfied, mvdAbsVal is derived from $$\text{mvdAbsVal}=\text{qmvd}<<\text{shift}A1 \qquad \text{Equation Q7.}$$

In a case that the motion vector accuracy flag satisfies mvd_dequant_flag=1 and quantized difference vector qmvd>=prescribed value dTHA is satisfied, mvdAbsVal is derived from $$\text{mvdAbsVal}=\text{dTHA}<<\text{shift}A1+\\(\text{qmvd}-\text{dTHA})<<\text{shift}A2 \qquad \text{Equation Q8.}$$

On the other hand, in a case that the motion vector accuracy flag satisfies mvd_dequant_flag=0 and quantized difference vector qmvd<prescribed value dTHS is satisfied, mvdAbsVal is derived from $$\text{mvdAbsVal}=\text{qmvd} \qquad \text{Equation Q9.}$$

In a case that the motion vector accuracy flag satisfies mvd_dequant_flag=0 and quantized difference vector qmvd>=dTHS is satisfied, mvdAbsVal is derived from $$\text{mvdAbsVal}=\text{dTHS}+(\text{qmvd}-\text{dTHS})<<\text{shift}S \qquad \text{Equation Q10.}$$

In other words, nonlinear dequantization is performed on a quantized difference vector in either case that the motion vector accuracy flag mvd_dequant_flag==0 or the motion vector accuracy flag mvd_dequant_flag==1.

The description above is summarized by the following equation.

$$\text{mvdAbsVal}=\text{mvd\_quant\_flag}==1?$$

$$\text{qmvd}<\text{dTHA?qmvd}<<\text{shift}A1:\text{dTHA}<<\text{shift}A1+\\(\text{qmvd}-\text{dTHA})<<\text{shift}A2$$

:

$$\text{qmvd}<\text{dTHS?qmvd}:\text{dTHS}+(\text{qmvd}-\text{dTHS})<<\text{shift}S$$

In other words, the inter-prediction parameter decoding control unit 3031 switches accuracy of the dequantization processing on a difference vector between first accuracy and second accuracy according to a quantization value (a value qmvd before dequantization) of a quantized difference vector in a case that a flag indicating accuracy of a motion vector indicates a first value (in a case of mvd_dequant_flag==0), and switches accuracy of the dequantization processing on a difference vector between third accuracy and fourth accuracy according to a quantization value of a quantized difference vector in a case that a flag indicating accuracy of a motion vector indicates a second value (in a case of mvd_dequant_flag==1). At least any of the first accuracy and the second accuracy has higher accuracy than that of the third accuracy and the fourth accuracy.

For example, assuming that the basic vector accuracy is ⅛ pel, shiftA1=2, shiftA2=3, dTHA=4, shiftS=2, and dTHS=16 in Equation Q7 to Equation Q10 described above, in a case that the motion vector accuracy flag mvd_dequant_flag=1 is satisfied and the quantized difference vector qmvd is less than dTHA=4, the inter-prediction parameter decoding control unit 3031 performs dequantization on a motion vector by shifting a quantized difference vector qmvd (difference motion vector absolute value) by shiftA1=2 to the left. In other words, the motion vector accuracy is configured to be a ½ pel, and the motion vector accuracy is configured to be low.

In a case that the motion vector accuracy flag mvd_dequant_flag=1 is satisfied and the quantized difference vector qmvd is greater than or equal to dTHA=4, the inter-prediction parameter decoding control unit 3031 performs dequantization on a motion vector by shifting a quantized difference vector qmvd (difference motion vector absolute value) by shiftA2=3 to the left. In other words, the motion vector accuracy is configured to be a 1 pel, and the motion vector accuracy is configured to be low.

On the other hand, in a case that the motion vector accuracy flag mvd_dequant$_{13}$ flag=0 is satisfied and the quantized difference vector qmvd is less than dTHS=16, the inter-prediction parameter decoding control unit 3031 configures the motion vector accuracy to be ⅛ being the basic vector accuracy.

In a case that the motion vector accuracy flag mvd_dequant_flag=0 is satisfied and the quantized difference vector qmvd is greater than or equal to dTHS=16, the inter-prediction parameter decoding control unit 3031 performs dequantization on a motion vector by shifting a quantized difference vector qmvd by shiftS=2 to the left. In other words, the motion vector accuracy is configured to be a ½ pel, and the motion vector accuracy is configured to be low.

According to the above-described configuration, a prediction image can be generated by using a motion vector having more appropriate accuracy. This improves prediction accuracy, and thus coding efficiency is improved.

Dequantization Processing Example 3:
Dequantization of Difference Vector According to Quantized Difference Vector and Round Processing on Prediction Vector Next, description is given of an example of performing round processing on a prediction vector in a case that dequantization is performed on a difference vector according to a quantized difference vector.

In the present processing example, in a case that the inter-prediction parameter decoding control unit 3031 performs dequantization processing on a difference vector with lower accuracy, a motion vector is derived by adding a dequantized difference vector to a prediction vector on which the round processing is performed by the vector candidate selection unit 3034 or subtracting the dequantized difference vector from the prediction vector.

For example, $$mvdAbsVal=qmvd+(qmvd-dTH)<<shiftS \qquad \text{Equation Q20}$$

can be set from Equation Q3 described in Dequantizing Difference Vector with Motion Vector Accuracy according to Quantized Difference Vector mentioned above.

In a case that qmvd being a quantized difference vector is greater than or equal to a prescribed value dTH, a motion vector mvLX is derived as a sum of the prediction vector mvpLX on which the round processing is performed and the difference vector mvdLX. In other words, the motion vector mvLX is derived from $$mvLX=round(mvpLX,shiftS)+mvdLX.$$

Here, the motion vector accuracy of mvpLX is reduced to accuracy in 1<<shiftS units by round(mvpLX, shiftS). The processing of deriving mvdLX from mvdAbsVal is as described as the sign providing processing PS_SIGN.

On the other hand, in a case that qmvd being the quantized difference vector is less than the prescribed value dTH, the motion vector mvLX is derived as a sum of the prediction vector mvpLX and the difference vector mvdLX. In other words, the motion vector mvLX is derived from $$mvLX=mvpLX+mvdLX$$

Dequantization Processing Example 4:
Dequantization of Difference Vector According to Values of Motion Vector Accuracy Flag and Quantized Difference Vector and Round Processing on Prediction Vector In the present processing example, a motion vector is derived by adding, to a prediction vector on which the round processing is performed by the vector candidate selection unit 3034, a difference vector dequantized according to a motion vector accuracy flag and a quantized difference vector or by subtracting the dequantized difference vector from the prediction vector, by the inter-prediction parameter decoding control unit 3031.

For example, in a case that a motion vector accuracy flag is mvd_dequant_flag=1, mvdAbs is derived from $$mvdAbsVal=qmvd<<shiftA$$

Then, the motion vector mvLX is derived as a sum of the prediction vector mvpLX on which the round processing is performed and the difference vector mvdLX, from $$mvLX=round(mvpLX,shiftA)+mvdLX$$

Here, the motion vector accuracy of mvpLX is reduced to accuracy in 1<<shiftA units by round(mvpLX, shiftA). The processing of deriving mvdLX from mvdAbsVal here is as described as the sign providing processing PS_SIGN.

On the other hand, the case that the motion vector accuracy flag is mvd_dequant_flag=0 is as follows. In a case that the quantized difference vector qmvd is less than the prescribed value dTH, the absolute value mvdAbsVal of the difference vector is derived to be equal to the quantized difference vector qmvd. In other words, the absolute value mvdAbsVal is derived from mvdAbsVal=qmvd. Then, the motion vector mvLX is the sum of the prediction vector mvpLX and the difference vector mvdLX. In other words, the motion vector mvLX is derived from $$mvLX=mvpLX+mvdLX$$

In a case that the quantized difference vector qmvd is greater than or equal to the prescribed value dTH, the absolute value mvdAbsVal of the difference vector is derived from $$mvdAbsVal=dTHS+(qmvd-dTHS)<<shiftS$$

Then, the motion vector mvLX is the sum of the prediction vector mvpLX on which the round processing is performed and the difference vector mvdLX. In other words, the motion vector mvLX is derived from $$mvLX=round(mvpLX,shiftS)+mvdLX$$

Here, the motion vector accuracy of mvpLX is reduced to accuracy in 1<<shiftS units by round(mvpLX, shiftS). The processing of deriving mvdLX from mvdAbsVal here is as described as the sign providing processing PS_SIGN.

Dequantization Processing Example 5: Another Example of Dequantization of Difference Vector According to Motion Vector Accuracy Flag and Quantized Difference Vector and Round Processing on Prediction Vector Next, another example of dequantization of a difference vector according to a motion vector accuracy flag and a quantized difference vector and round processing on a prediction vector will be described.

In the present processing example, in a case that the inter-prediction parameter decoding control unit 3031 performs dequantization processing on a difference vector with accuracy other than the highest accuracy among first accuracy, second accuracy, third accuracy, and fourth accuracy, the addition unit 3035 adds a dequantized difference vector to a prediction vector on which the round processing is performed by the vector candidate selection unit 3034 or subtracts the dequantized difference vector from the prediction vector to derive a motion vector.

One example of the present embodiment will be described below in detail.

In a case that the motion vector accuracy flag is mvd_dequant_flag=1, when it is satisfied that the quantized difference vector is less than the prescribed value dTHA, mvdAbsVal is derived from $$mvdAbsVal=qmvd<<shiftA1$$

Then, the motion vector mvLX is derived as the sum of the prediction vector mvpLX on which the round processing is performed and the difference vector mvdLX. In other words, the motion vector mvLX is derived from $$mvLX = round(mvpLX, shiftA1) + mvdLX$$

Here, the motion vector accuracy of mvpLX is reduced to accuracy in 1<<shiftA1 units by round(mvpLX, shiftA1).

In a case that the motion vector accuracy flag is mvd_dequant_flag=1, when it is satisfied that the quantized difference vector is greater than or equal to the prescribed value dTHA, mvdAbsVal is derived from $$mvdAbsVal = dTHA << shiftA1 + (qmvd - dTHA) << shiftA2$$

Then, the motion vector mvLX is derived as the sum of the prediction vector mvpLX on which the round processing is performed and the difference vector mvdLX. In other words, the motion vector mvLX is derived from $$mvLX = round(mvpLX, shiftA2) + mvdLX$$

Here, the motion vector accuracy of mvpLX is reduced to accuracy in 1<<shiftA2 units by round(mvpLX, shiftA2). The processing of deriving mvdLX from mvdAbsVal here is as described as the sign providing processing PS_SIGN.

On the other hand, the case that the motion vector accuracy flag is mvd_dequant_flag=0 is as follows. In a case that the quantized difference vector qmvd is less than the prescribed value dTH, the absolute value mvdAbsVal of the difference vector is derived to be equal to the quantized difference vector qmvd. In other words, the absolute value mvdAbsVal is derived from mvdAbsVal=qmvd. Then, the motion vector mvLX is the sum of the prediction vector mvpLX and the difference vector mvdLX. In other words, the motion vector mvLX is derived from $$mvLX = mvpLX + mvdLX$$

In a case that the quantized difference vector qmvd is greater than or equal to the prescribed value dTH, the absolute value mvdAbsVal of the difference vector is derived from $$mvdAbsVal = dTHS + (qmvd - dTHS) << shiftS$$

Then, the motion vector mvLX is the sum of the prediction vector mvpLX on which the round processing is performed and the difference vector mvdLX. In other words, the motion vector mvLX is derived from $$mvLX = round(mvpLX, shiftS) + mvdLX$$

Here, the motion vector accuracy of mvpLX is reduced to accuracy in 1<<shiftS units by round(mvpLX, shiftS). The processing of deriving mvdLX from mvdAbsVal here is as described as the sign providing processing PS_SIGN.

Figure 29:
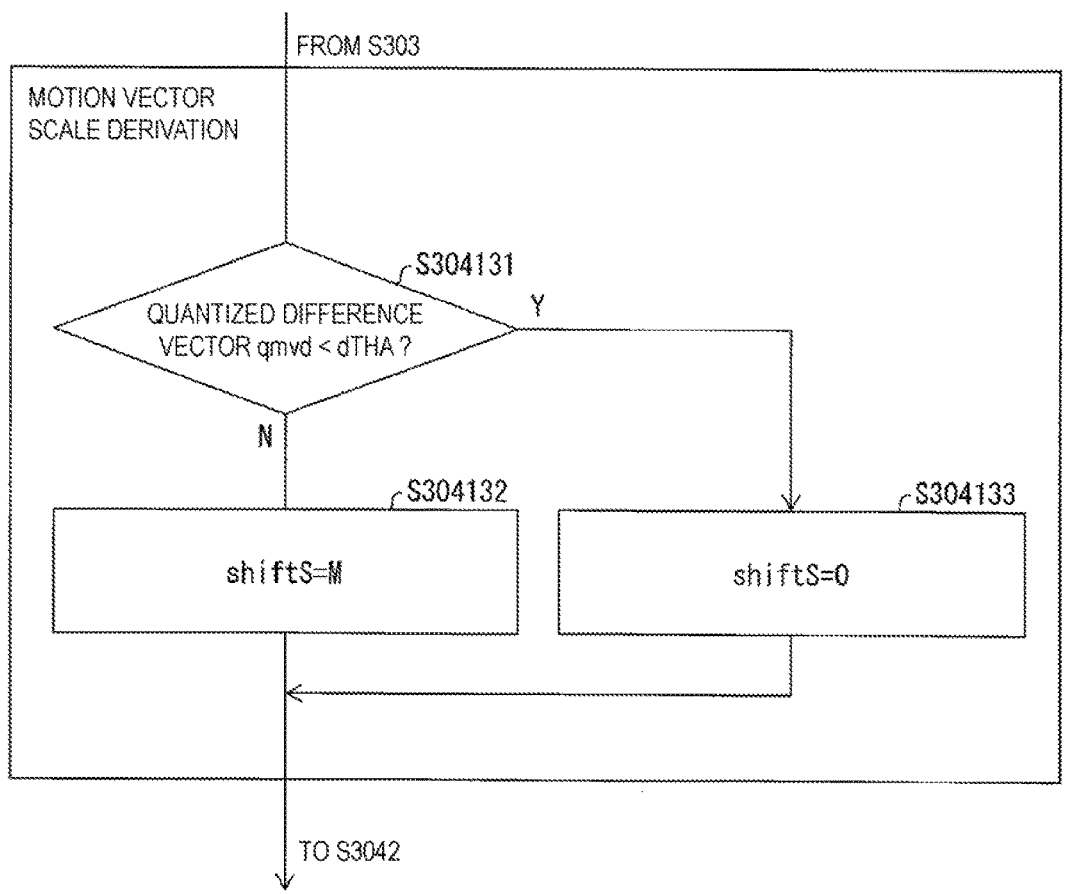
FIG. 29 is a flowchart more specifically illustrating another example of the motion vector scale derivation processing according to the present embodiment.

Flow of Motion Vector Scale Derivation Processing Using Quantized Difference Vector FIG. 29 is a flowchart more specifically illustrating the motion vector scale derivation processing in Steps S3031 (see FIG. 19) and S3041 (see FIG. 20) mentioned above. FIG. 29 specifically exemplifies the processing in S3041 for the sake of description, but the processing illustrated in FIG. 22 may be applied to S3031.

As illustrated in FIG. 29, it is determined whether quantized difference vector qmvd<prescribed value dTH is satisfied in S304131. In a case that quantized difference vector qmvd<prescribed value dTH is false (N in S304131), shiftS=M is configured in S304132. In a case that quantized difference vector qmvd<prescribed value dTH is true (Y in S304131), shiftS=0 is configured in S304133. Next, the processing proceeds to S3042.

Motion Compensation Filter

Hereinafter, a motion compensation filter provided in the motion compensation unit 3091 will be described with reference to FIGS. 30 to 32.

Figure 30:
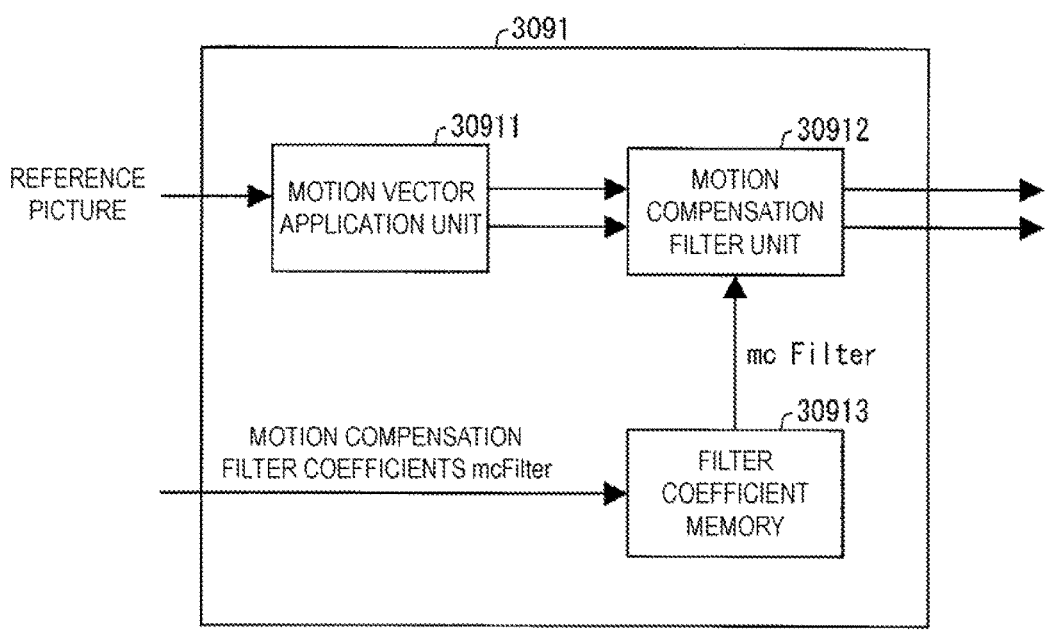
FIG. 30 is a block diagram illustrating a specific configuration of a motion compensation unit according to the present embodiment.

FIG. 30 is a block diagram illustrating a specific configuration of the motion compensation unit 3091. As illustrated in FIG. 30, the motion compensation unit 3091 includes a motion vector application unit 30911, a motion compensation filter unit (filter unit) 30912, and a filter coefficient memory 30913.

Based on a prediction list using flag predFlagLX, a reference picture index refIdxLx, and a motion vector mvLX input from the inter-prediction parameter decoding unit 303, the motion vector application unit 3091 reads a block in a position deviated by a motion vector mvLX from a position of a decoding target block of a reference picture designated in the reference picture index refIdxLx from the reference picture memory 306, and thus generates a motion vector applied image.

In a case that the motion vector mvLX is not integer accuracy and is 1/M pixel accuracy (where M is a natural number of two or greater), the motion vector applied image is also the 1/M pixel accuracy.

In a case that the motion vector mvLX is not integer accuracy, the motion compensation filter 30912 causes a filter using filter coefficients mcFilter[i][k] (where i is an integer of 0 or greater and M−1 or less, k is an integer of 0 or greater and Ntaps−1 or less) to act on the motion vector applied image, and thus generates the above-mentioned motion compensation image (predSamplesL0 in a case of a motion compensation image with L0 prediction, predSamplesL1 in a case of a motion compensation image with L1 prediction, and predSamplesLX in a case of no distinction between the both predictions).

In a case that the motion vector mvLX is integer accuracy, the motion compensation filter 30912 does not cause to the filter to act on a motion vector applied image, and the motion vector applied image serves as a motion compensation image without change.

The filter coefficient memory 30913 stores a motion compensation filter coefficient decoded from the coded data. More specifically, the filter coefficient memory 30913 stores at least a part of filter coefficients related to i among filter coefficients mcFilter[i][k] (where i is an integer of 0 or greater and M−1 or less, k is an integer of 0 or greater and Ntaps−1 or less) used by the motion compensation filter 30912.

Filter Coefficients

Now, details of the filter coefficients mcFilter[i][k] will be described by using FIG. 31. FIG. 31 is a diagram illustrating one example of filter coefficients according to the present embodiment.

FIG. 31 exemplifies filter coefficients mcFilter[i][k] in which a total number of phases (i=0 to 15) of a motion vector applied image is 16 and the number of taps of a filter is 8 (8 taps (k=0 to 7)). In this example, a total number of phases (i=0 to 15) is 16. In a case that the total number of phases is 16, accuracy of a motion vector is 1/16 pixel accuracy. In other words, in a case that the total number of phases is M, accuracy of a motion vector is pixel accuracy.

For example, filter coefficients {0, 0, 0, 64, 0, 0, 0, 0} indicated in the highest column in FIG. 31 represents a filter coefficient in each coefficient position in a phase i=0. Here, the coefficient position represents a relative position of a pixel on which a filter coefficient acts. Similarly, each filter coefficient indicated in another column in FIG. 31 is a filter coefficient for corresponding coefficient position of another phase (i=1 to 15).

The total number of filter coefficients is a value obtained by multiplying the number of taps of a filter and the number of phases (namely, a reciprocal of accuracy of a motion vector).

Calculation of Filter Coefficients

The above-described filter coefficients mcFilter[i][k] used by the motion compensation filter unit (filter unit) 30912 may include a filter coefficient calculated by using filter coefficients mcFilter[p][k] (p≠i) and filter coefficients mcFilter[q][k] (q≠i). Details of an example of calculating the filter coefficients mcFilter[i][k] are as follows.

Calculation Example 1: Calculating Filter Coefficient of Phase i from Average of Filter Coefficients of Phases i−1 and i+1

One example of calculating the filter coefficients according to the present embodiment will be described by using FIGS. 32A and 32B.

FIG. 32A illustrates an example in which the motion compensation filter unit 30912 calculates, from filter coefficients of a part of (here, even) phases, filter coefficients of another phase (here, an odd phase), and the calculated filter coefficient is used. In FIG. 32A, the filter coefficients of even phases are underlined.

In the example illustrated in FIG. 32A, the filter coefficient memory 30913 stores the filter coefficients of the even phases. Then, the filter coefficients of an odd phase i are calculated from an average of filter coefficients of even phases i−1 and i+1. In other words, in a case that i %2=1 (a reminder is 1 when dividing i by 2), mcFilter[i][k]=(mcFilter[i−1][k]+mcFilter[i+1][k])/2. Further, mcFilter[i][k] stored in the filter coefficient memory 30913 is used as the filter coefficients of the even phase i. In other words, in a case that i %2=0 (a reminder is 0 when dividing i by 2), mcFilter[i][k]=mcFilter[i][k].

In the case of i %2=1, mcFilter[i][k]=mcFilter[i−1][k]+mcFilter[i+1][k])>>1 may be set.

Further, filter coefficients of a part of odd phases may be stored in the filter coefficient memory 30913, and the motion compensation filter unit 30912 may use the stored filter coefficients as the filter coefficients.

Note that the above-described configuration is equivalent to a configuration in which filter coefficients mcFilterC as a reference are stored in the filter coefficient memory 30913 and the filter coefficients mcFilter being actually used is derived from the following equation.

$$mcFilter[i][k]=mcFilterC[i>>1][k](i=0,2,4,\ldots,2n, 2n+1,n=7)$$

$$mcFilter[i][k]=(mcFilterC[i>>1][k]mcFilterC[(i>>1)+1][k])/2\ (i=1,3,5,\ldots,2n1,n=6)$$

Here, the division described with /2 may be >>1.

For example, in the example illustrated in FIG. 32A, the following table may be used as mcFilterC.

```
mcFilterC[ ][ ] =
{
{ 0, 0, 0, 64, 0, 0, 0, 0 },
{ −1, 2, −5, 62, 8, −3, 1, 0 },
{ −1, 4, −10, 58, 17, −5, 1, 0 },
{ −1, 3, −9, 47, 31, −10, 4, −1 },
{ −1, 4, −11, 40, 40, −11, 4, −1 },
{ −1, 4, −10, 31, 47, −9, 3, −1 },
{ 0, 1, −5, 17, 58, −10, 4, −1 },
{ 0, 1, −3, 8, 62, −5, 2, −1 },
{ 0, 1, −2, 4, 63, −3, 1, 0 }
}
```

On the other hand, FIG. 32B illustrates an example in which the motion compensation filter unit 30912 calculates, from the filter coefficients of a part of (here, odd) phases, the filter coefficients of another phase (here, an even phase). In FIG. 32B, the filter coefficients of odd phases are underlined.

In the example illustrated in FIG. 32B, the filter coefficient memory 30913 stores the filter coefficients of the odd phases. Then, the filter coefficients of an even phase i are calculated from an average of filter coefficients of odd phases i−1 and i+1. In other words, in a case that i %2=0 (a reminder is 0 when dividing i by 2), mcFilter[i][k]=(mcFilter[i−1][k]+mcFilter[i+1][k])/2. Further, mcFilter[i][k] stored in the filter coefficient memory 30913 is used in the odd phase i. In other words, in a case that i %2=1 (a reminder is 1 when dividing i by 2), mcFilter[i][k]=mcFilter[i][k].

In the case of i %2=0, mcFilter[i][k]=(mcFilter[i−1][k]+mcFilter[i+1][k])>>1 may be set.

The above-described configuration is equivalent to a configuration in which the filter coefficients mcFilterC as a reference are stored in the filter coefficient memory 30913 and the filter coefficients mcFilter being actually used is derived from the following equation.

$$mcFilter[i][k]=mcFilterC[i>>1][k](i=0,1,3,5,\ldots,2n+1,n=7)$$

$$mcFilter[i][k]=(mcFilterC[i>>1][k]+mcFilterC[(i>>1)+1][k])/2\ (i=0,2,4,6,\ldots,2n+1,n=7)$$

Here, /2 may be >>1.

For example, in the example illustrated in FIG. 32B, the following table may be used as mcFilterC.

```
mcFilterC[ ][ ] =
{
{ 0, 0, 0, 64, 0, 0, 0, 0 },
{ 0, 1, −3, 63, 4, −2, 1, 0 },
{ −1, 3, −8, 60, 13, −4, 1, 0 },
{ −1, 4, −11, 52, 26, −8, 3, −1 },
{ −1, 4, −11, 45, 34, −10, 4, −1 },
{ −1, 4, −10, 34, 45, −11, 4, −1 },
{ −1, 3, −8, 26, 52, −11, 4, −1 },
{ 0, 1, −4, 13, 60, −8, 3, −1 },
{ 0, 1, −2, 4, 63, −3, 1, 0 }
}
```

Further, filter coefficients of a part of even phases may be stored in the filter coefficient memory 30913, and the motion compensation filter unit 30912 may use the stored filter coefficients as the filter coefficients.

Calculation Example 2: Calculating Filter Coefficient of Phase I by Linear Interpolation of Filter Coefficients of Other Adjacent Phases Next, an example in which the motion compensation filter unit 30912 calculates the filter coefficients of the phase i by linear interpolation of filter coefficients of other adjacent phases will be described. The motion compensation filter unit 30912 calculates the filter coefficients of the phase i by using the following equation.

$$mcFilter[i][k]=((N-w)*mcFilter[i0][k]+w*mcFilter[i1][k])>>\log(N)$$

Here, i0=(i/N)*N, i1=i0+N, w=(I % N), and N is an integer of two or greater.

In other words, the above-described filter coefficients Filter[i][k] include filter coefficients that satisfy mcFilter[i][k]=((N−w)*mcFilter[i0][k]+w*mcFilter[i1][k])>>log 2(N), where i0=(i/N)*N, i1=i0+N, w=(i % N), and N is an integer of two or greater.

The above-described configuration is equivalent to a configuration in which the filter coefficients mcFilterC as a reference are stored in the filter coefficient memory 30913 and the filter coefficients mcFilter being actually used is derived from the following equation.

The above-described configuration is equivalent to a configuration in which the filter coefficients mcFilterC as a reference are stored in the filter coefficient memory 30913 and the filter coefficients mcFilter being actually used is derived from the following equation.

$$mcFilter[i][k]=mcFilterC[i>>\log 2(N)][k](i=N*n)$$

$$mcFilter[i][k]=((N-w)*mcFilterC[i>>\log 2(N)][k]+w*mcFilter[i>>\log 2(N))+1][k])>>\log 2(N)$$
$$(i!=N*n)$$

The following configuration may be used.

$$mcFilter[i][k]=mcFilterC[i>>\log 2(N)][k](i=0,N*n+1)$$

$$mcFilter[i][k]=((N-w)*mcFilterC[i>>\log 2(N)][k]+w*mcFilter[i>>\log 2(N))+1][k])>>\log 2(N)$$
$$(i!=N*n+1)$$

According to the configuration illustrated in the calculation examples above, all of the motion compensation filter coefficients may not be stored in the filter coefficient memory 30913. Therefore, the capacity of memory for storing filter coefficients can be reduced. Further, a part of filter coefficients among motion compensation filter coefficients may be included in the coded data, and thus a code amount of the coded data is reduced and improvement in coding efficiency can be expected.

(Configuration of Image Coding Device)

Figure 12:
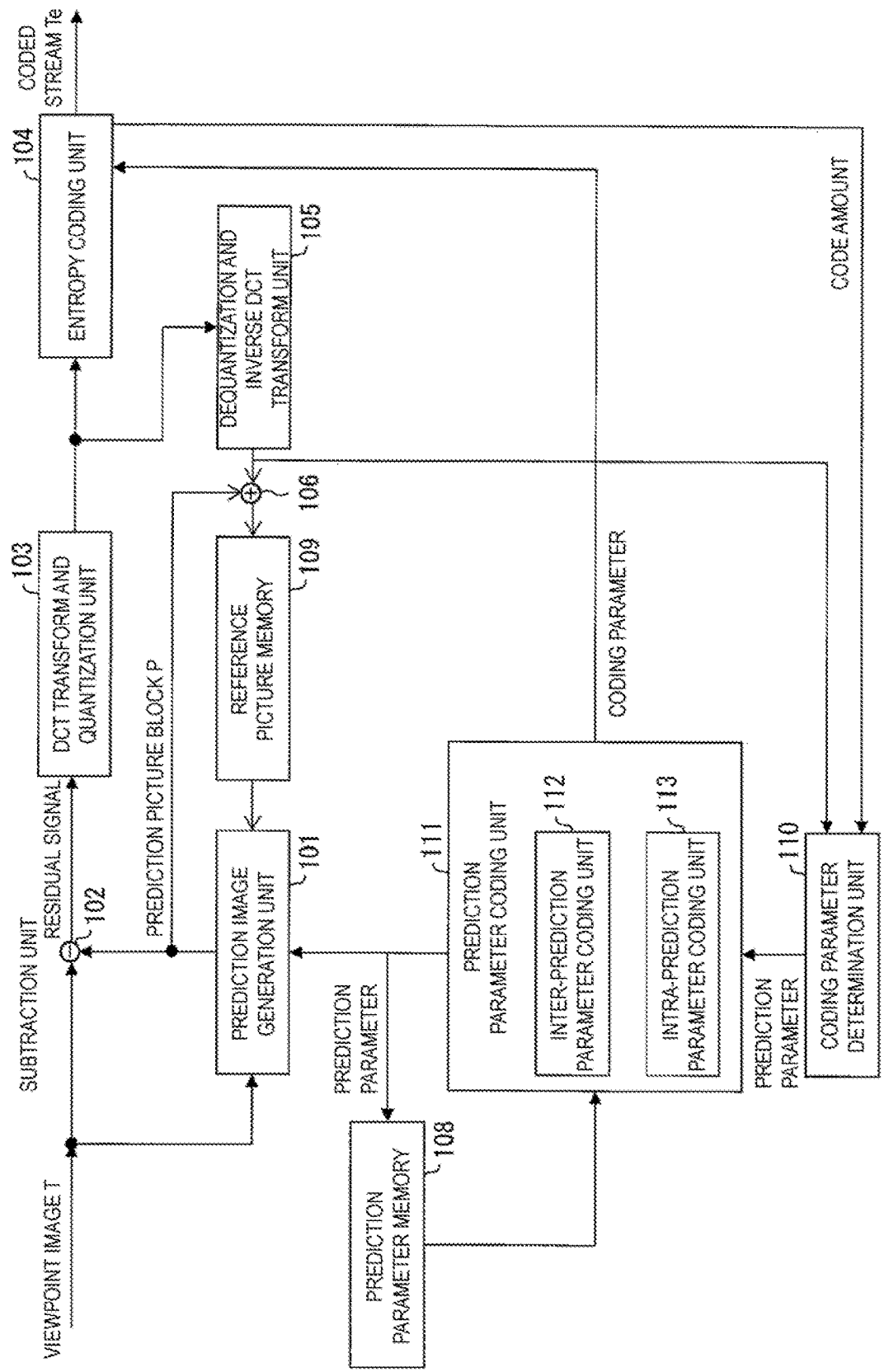
FIG. 12 is a block diagram illustrating a configuration of an image coding device according to the present embodiment.

Next, a configuration of the image coding device 11 according to the present embodiment will be described. FIG. 12 is a block diagram illustrating the configuration of the image coding device 11 according to the present embodiment. The image coding device 11 is configured to include a prediction image generation unit 101, a subtraction unit 102, a DCT and quantization unit 103, an entropy coding unit 104, a dequantization and inverse DCT unit 105, an addition unit 106, a prediction parameter memory (prediction parameter storage unit, frame memory) 108, a reference picture memory (reference image storage unit, frame memory) 109, a coding parameter determination unit 110, a prediction parameter coding unit 111, and a residual storage unit 313 (residual recording unit). The prediction parameter coding unit 111 is configured to include an inter-prediction parameter coding unit 112 and an intra-prediction parameter coding unit 113.

The prediction image generation unit 101 generates a prediction picture block P of a picture for each block, the picture being of a layer image T input from outside for each viewpoint, the block being an area obtained by partitioning the picture. Here, the prediction image generation unit 101 reads out a reference picture block, based on a prediction parameter input from the prediction parameter coding unit 111 from the reference picture memory 109. The prediction parameter input from the prediction parameter coding unit 111 is a motion vector or a displacement vector, for example. The prediction image generation unit 101 reads out a reference picture block of a block at a location indicated by a motion vector or displacement vector predicted with a starting point being a coding target block. The prediction image generation unit 101 generates the prediction picture block P for the read out reference picture block by use of one prediction scheme of multiple prediction schemes. The prediction image generation unit 101 outputs the generated prediction picture block P to the subtraction unit 102. The prediction image generation unit 101 operates in the same way as the prediction image generation unit 308 described already, and therefore, a detailed description of generating the prediction picture block P is omitted.

The prediction image generation unit 101, in selecting the prediction scheme, selects a prediction scheme which minimizes an error value based on a difference between a signal value for each pixel in the block included in the image and a signal value for each of corresponding pixels in the prediction picture block P, for example. The method of selecting the prediction scheme is not limited to the above.

Multiple prediction schemes include the intra-prediction, the motion prediction, and the merge prediction. The motion prediction is the prediction between display times among the inter-predictions described above. The merge prediction is prediction using the reference picture block and prediction parameter the same as for a block which is already coded and in a predefined range from the coding target block.

The prediction image generation unit 101, in a case of selecting the intra-prediction, outputs a prediction mode IntrapredMode indicating the intra-prediction mode which has been used in generating the prediction picture block P to the prediction parameter coding unit 111.

The prediction image generation unit 101, in a case of selecting the motion prediction, stores the motion vector mvLX which has been used in generating the prediction picture block P in the prediction parameter memory 108, and outputs the motion vector to the inter-prediction parameter coding unit 112. The motion vector mvLX indicates a vector from a location of the coding target block to a location of the reference picture block in generating the prediction picture block P. Information indicating the motion vector mvLX includes information indicating the reference picture reference picture index refIdxLX, picture order count POC), and may indicate the prediction parameter. The prediction image generation unit 101 outputs the prediction mode predMode indicating the inter-prediction mode to the prediction parameter coding unit 111.

The prediction image generation unit 101, in a case of selecting the merge prediction, outputs the merge index merge_idx indicating the selected reference picture block to the inter-prediction parameter coding unit 112. The prediction image generation unit 101 outputs the prediction mode predMode indicating the merge prediction mode to the prediction parameter coding unit 111.

The prediction image generation unit 101 may be configured to generate the motion compensation filter coefficients to which the motion compensation unit 3091 included in the image decoding device 31 refers.

The prediction image generation unit 101 may have a configuration corresponding to switching of accuracy of the motion vector described as to the image decoding device 31. In other words, the prediction image generation unit 101 may switch the accuracy of the motion vector depending on the block size, QP, and the like. The prediction image generation unit 101 may be configured to code the motion vector accuracy flag mvd_dequant_flag referred when switching the accuracy of the motion vector in the image decoding device 31.

The subtraction unit 102 subtracts for each pixel the signal value of the prediction picture block P input from the prediction image generation unit 101 from the signal value of the corresponding block of the layer image input from outside to generate a residual signal. The subtraction unit 102 outputs the generated residual signal to the DCT and quantization unit 103 and the coding parameter determination unit 110.

The DCT and quantization unit 103 performs DCT on the residual signal input from the subtraction unit 102 to compute DCT coefficients. The DCT and quantization unit 103 quantizes the computed DCT coefficients to find quantized coefficients. The DCT and quantization unit 103 outputs the found quantized coefficients to the entropy coding unit 104 and the dequantization and inverse DCT unit 105.

To the entropy coding unit 104, input are the quantized coefficients from the DCT and quantization unit 103 and coding parameters from the coding parameter determination unit 110. Examples of the input coding parameters include the codes such as the reference picture index refIdxLX, the prediction vector index mvp_LX_idx, the difference vector mvdLX, the prediction mode predMode, and the merge index merge_idx.

The entropy coding unit 104 may be configured to perform processing that corresponds to nonlinear dequantization processing described as to the image decoding device 31, that is, nonlinear dequantization processing to a difference vector, before coding the difference vector mvdLX.

The entropy coding unit 104 performs entropy coding on the input quantized coefficients and coding parameters to generate a coded stream Te, and outputs, to outside, the generated coded stream Te.

The dequantization and inverse DCT unit 105 dequantizes the quantized coefficients input from the DCT and quantization unit 103 to find DCT coefficients. The dequantization and inverse DCT unit 105 performs inverse DCT on the found DCT coefficients to compute a decoded residual signal. The dequantization and inverse DCT unit 105 outputs the computed decoded residual signal to the addition unit 106.

The addition unit 106 adds for each pixel a signal value of the prediction picture block P input from the prediction image generation unit 101 and a signal value of the decoded residual signal input from the dequantization and inverse DCT unit 105 to generate a reference picture block. The addition unit 106 store the generated reference picture block in the reference picture memory 109.

The prediction parameter memory 108 stores the prediction parameter generated by the prediction parameter coding unit 111 in a predefined location for each coding target picture and block.

The reference picture memory 109 stores the reference picture block generated by the addition unit 106 in a predefined location for each coding target picture and block.

The coding parameter determination unit 110 selects one set from among multiple sets coding parameters. The coding parameters are the prediction parameters described above or parameters to be predicted that are generated in association with the prediction parameters. The prediction image generation unit 101 uses each of these sets of coding parameters to generate the prediction picture block P.

The coding parameter determination unit 110 computes a cost value indicating a size of an amount of information and a coding error for each of multiple sets. The cost value is a sum of a code amount and a value obtained by multiplying a square error by a coefficient λ, for example. The code amount is an amount of information of the coded stream Te obtained by performing entropy coding on the quantization error and the coding parameters. The square error is a sum of squares of residual error values of the residual signals computed by the subtraction unit 102 for respective pixels. The coefficient X is a preconfigured real number greater than zero. The coding parameter determination unit 110 selects a set of coding parameters for which the computed cost value is minimum. This allows the entropy coding unit 104 to output, to outside, the selected set of coding parameters as the coded stream Te and not to output the not selected set of coding parameters.

The prediction parameter coding unit 111 derives a prediction parameter used for generating the prediction picture, based on the parameter input from the prediction image generation unit 101 and codes the derived prediction parameter to generate a set of coding parameters. The prediction parameter coding unit 111 outputs the generated set of coding parameters to the entropy coding unit 104.

The prediction parameter coding unit 111 stores the prediction parameter corresponding to the set selected by the coding parameter determination unit 110 among the generated set of coding parameters in the prediction parameter memory 108.

In a case that the prediction mode predMode input from the prediction image generation unit 101 specifies the inter-prediction mode, the prediction parameter coding unit 111 makes the inter-prediction parameter coding unit 112 operate. In a case that the prediction mode predMode specifies the intra-prediction mode, the prediction parameter coding unit 111 makes the intra-prediction parameter coding unit 113 operate.

The inter-prediction parameter coding unit 112 derives an inter-prediction parameter, based on the prediction parameter input from the coding parameter determination unit 110. The inter-prediction parameter coding unit 112 has, as a configuration for deriving the inter-prediction parameter, a configuration the same as the configuration in which the inter-prediction parameter decoding unit 303 (see FIG. 5, or the like) derives the inter-prediction parameter. The configuration of the inter-prediction parameter coding unit 112 is described below.

The intra-prediction parameter coding unit 113 defines, as a set of inter-prediction parameters, the intra-prediction mode IntraPredMode which is specified by the prediction mode predMode input from the coding parameter determination unit 110.

Configuration of Inter-Prediction Parameter Coding Unit

Next, a description is given of the configuration of the inter-prediction parameter coding unit 112. The inter-prediction parameter coding unit 112 is means corresponding to the inter-prediction parameter decoding unit 303.

Figure 13:
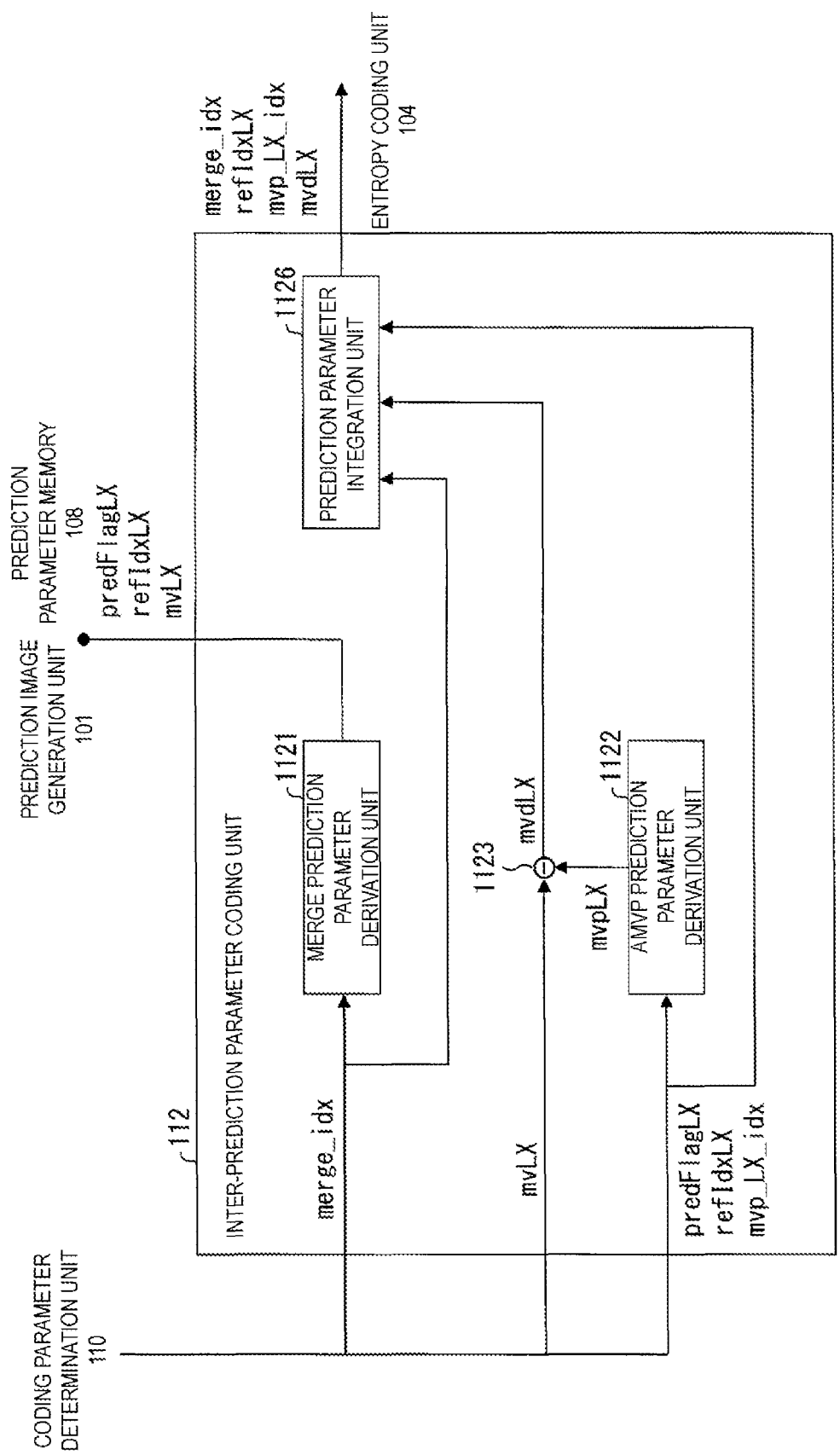
FIG. 13 is a schematic diagram illustrating a configuration of an inter-prediction parameter coding unit according to the present embodiment.

FIG. 13 is a schematic diagram illustrating the configuration of the inter-prediction parameter coding unit 112 according to the present embodiment.

The inter-prediction parameter coding unit 112 is configured to include a merge prediction parameter derivation unit 1121, an AMVP prediction parameter derivation unit 1122, a subtraction unit 1123, and a prediction parameter integration unit 1126.

The merge prediction parameter derivation unit 1121 has a configuration similar to the merge prediction parameter derivation unit 3036 described above (see FIG. 7) and the AMVP prediction parameter derivation unit 1122 has a configuration similar to the AMVP prediction parameter derivation unit 3032 described above (see FIG. 8).

In a case that prediction mode predMode input from the prediction image generation unit 101 specifies the merge prediction mode, the merge index merge_idx is input from the coding parameter determination unit 110 to the merge prediction parameter derivation unit 1121. The merge index merge_idx is output to the prediction parameter integration unit 1126. The merge prediction parameter derivation unit 1121 reads out a reference picture index refIdxLX and motion vector mvLX of a reference block indicated by the merge index merge_idx among the merge candidates from the prediction parameter memory 108. The merge candidate is a reference block in a predefined range from the coding target block to be coded (e.g., a reference block in contact with a lower left end, upper left end, or upper right end of coding target block), is a reference block on which the coding processing is completed.

The AMVP prediction parameter derivation unit 1122 has a configuration similar to the AMVP prediction parameter derivation unit 3032 described above (see FIG. 8).

To be more specific, in a case that the prediction mode predMode input from the prediction image generation unit 101 specifies the inter-prediction mode, the motion vector mvLX is input from the coding parameter determination unit 110 to the AMVP prediction parameter derivation unit 1122. The AMVP prediction parameter derivation unit 1122 derives a prediction vector mvpLX, based on the input motion vector mvLX. The AMVP prediction parameter derivation unit 1122 outputs the derived prediction vector mvpLX to the subtraction unit 1123. The reference picture index refIdx and the prediction vector index mvp_LX_idx are output to the prediction parameter integration unit 1126.

The subtraction unit 1123 subtracts the prediction vector mvpLX input from the AMVP prediction parameter derivation unit 1122 from the motion vector mvLX input from the coding parameter determination unit 110 to generate a difference vector mvdLX. The difference vector mvdLX is output to the prediction parameter integration unit 1126.

In a case that prediction mode predMode input front the prediction image generation unit 101 specifies the merge prediction mode, the prediction parameter integration unit 1126 outputs the merge index merge_idx input from the coding parameter determination unit 110 to the entropy coding unit 104.

In a case that the prediction mode predMode input from the prediction image generation unit 101 specifies the inter-prediction mode, the prediction parameter integration unit 1126 performs the processing below.

The prediction parameter integration unit 1126 integrates the reference picture index refIdxLX and prediction vector index mvp_LX_idx input from the coding parameter determination unit 110 and the difference vector mvdLX input from the subtraction unit 1123. The prediction parameter integration unit 1126 outputs the integrated code to the entropy coding unit 104.

The inter-prediction parameter coding control unit 112 may include an inter-prediction parameter coding control unit (not illustrated) which instructs the entropy coding unit 104 to decode the code (syntax element) associated with the inter-prediction to code the code (syntax element) included in the coded data, for example, the partition mode part_mode, the merge flag merge_flag, the merge index merge_idx, the inter-prediction flag inter_pred_idc, the reference picture index refIdxLX, the prediction vector index mvp_LX_idx, and the difference vector mvdLX.

In this case, an inter-prediction parameter coding control unit 1031 is configured to include a merge index coding unit (corresponding to the merge index decoding unit 30312 in FIG. 10), a vector candidate index coding unit (corresponding to the vector candidate index decoding unit 30313 in FIG. 10), and a partition mode coding unit, a merge flag coding unit, an inter-prediction flag coding unit, a reference picture index coding unit, a vector difference coding unit, and the like. The partition mode coding unit, the merge flag coding unit, the merge index coding unit, the inter-prediction flag coding unit, the reference picture index coding unit, the vector candidate index coding unit, and the vector difference coding unit code respectively the partition mode part_mode, the merge flag merge_flag, the merge index merge_idx, the inter-prediction flag inter_pred_idc, the reference picture index refIdxLX, the prediction vector index mvp_LX_idx, and the difference vector mvdLX.

A part of the image coding device 11 and the image decoding device 31 in the embodiment described above, for example, the entropy decoding unit 301, the prediction parameter decoding unit 302, the prediction image generation unit 101, the DCT and quantization unit 103, the entropy coding unit 104, the dequantization and inverse DCT unit 105, the coding parameter determination unit 110, the prediction parameter coding unit 111, the entropy decoding unit 301, the prediction parameter decoding unit 302, the prediction image generation unit 308, and the dequantization and inverse DCT unit 311 may be implemented by a computer. In this case, this configuration may be realized by recording a program for realizing such control functions on a computer-readable recording medium and causing a computer system to read the program recorded on the recording medium for execution. Note that it is assumed that the "computer system" herein refers to a computer system built into any of the image coding devices 11 to 11h, the image decoding devices 31 to 31h, and the computer system includes an OS and hardware components such as a peripheral device. Furthermore, the "computer-readable recording medium" refers to a portable medium such as a flexible disk, a magneto-optical disk, a ROM, and a CD-ROM, and a storage device such as a hard disk built into the computer system. Moreover, the "computer-readable recording medium" may include a medium that dynamically retains the program for a short period of time, such as a communication line that is used to transmit the program over a network such as the Internet or over a communication line such as a telephone line, and a medium that retains, in that case, the program for a fixed period of time, such as a volatile memory within the computer system which functions as a server or a client. Furthermore, the program may be configured to realize some of the functions described above, and also may be configured to be capable of realizing the functions described above in combination with a program already recorded in the computer system.

The image coding device 11 and image decoding device 31 in the present embodiment described above may be partially or completely realized as an integrated circuit such as a Large Scale Integration (LSI) circuit. The functional blocks of the image coding device 11 and the image decoding device 31 may be individually realized as processors, or may be partially or completely integrated into a processor. The circuit integration technique is not limited to LSI, and the integrated circuits for the functional blocks may be realized as dedicated circuits or a multi-purpose processor. Furthermore, in a case where with advances in semiconductor technology, a circuit integration technology with which an LSI is replaced appears, an integrated circuit based on the technology may be used.

The embodiment of the disclosure has been described in detail above referring to the drawings, but the specific configuration is not limited to the above embodiments and various amendments can be made to a design that fall within the scope that does not depart from the gist of the disclosure.

Application Example

The image coding device 11 and the image decoding device 31 described above can be used in a state of being equipped on various devices for transmitting, receiving, recording, and reproducing a video. The video may be a natural video imaged by a camera or the like, or an artificial video (including CG and GUI) generated by using a computer or the like.

Figure 33A:
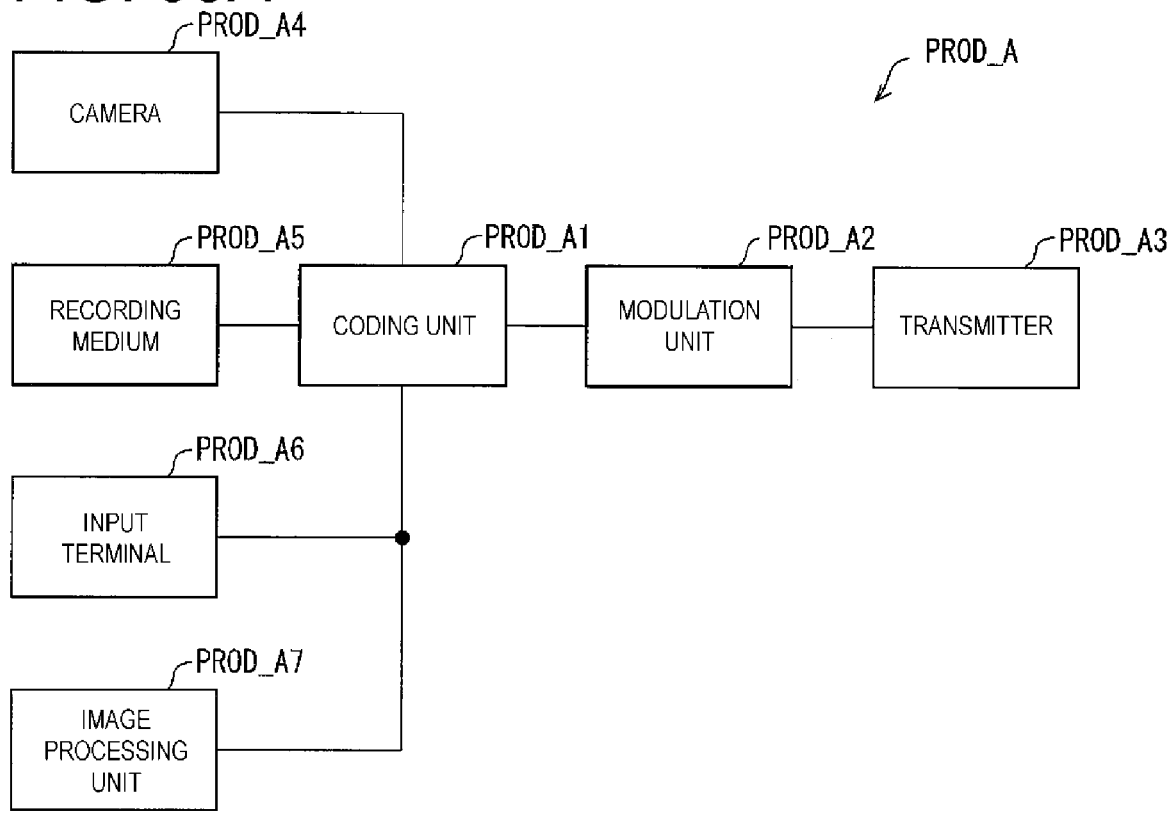
FIGS. 33A and 33B are diagrams illustrating configurations of a transmission device equipped with the above image coding device and a reception device equipped with the above image decoding device.
Figure 33B:
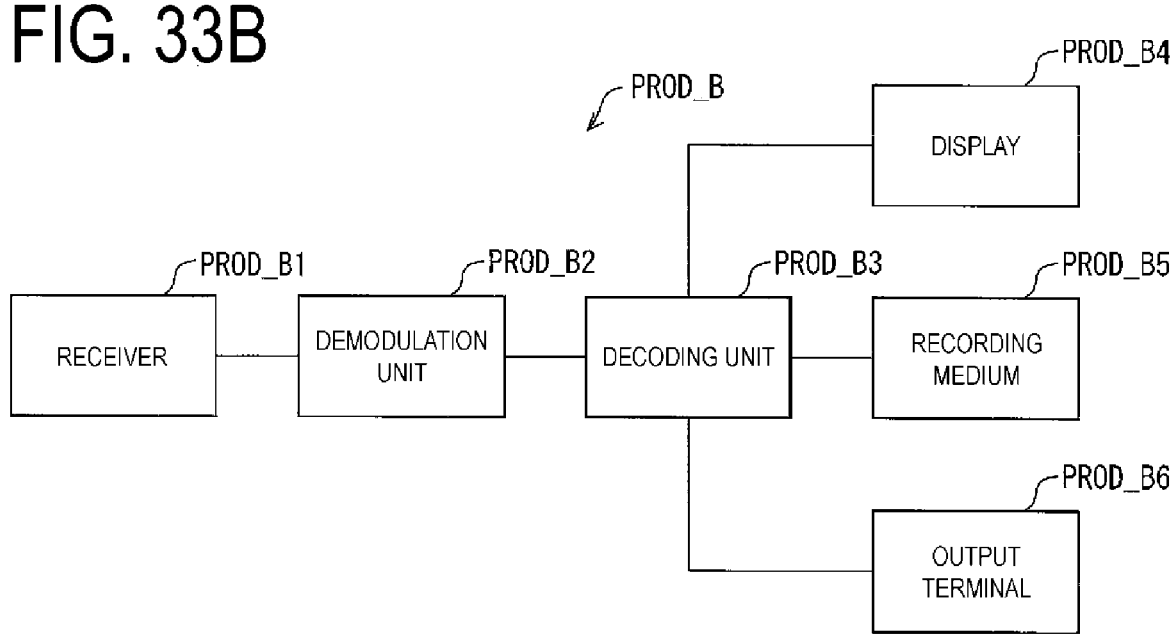

First, a description is given of that the image coding device 11 and the image decoding device 31 described above can be used to receive and transmit the video with reference to FIGS. 33A and 33B.

FIG. 33A is a block diagram illustrating a configuration of a transmission device PROD_A equipped with the image coding device 11. As illustrated in FIG. 33A, the transmission device PROD_A includes a coding unit PROD_A1 that codes a video to acquire coded data, a modulation unit PROD_A2 that modulates a carrier wave by using the coded data acquired by the coding unit PROD_A1 to acquire a modulated signal, and a transmitter PROD_A3 that transmits the modulated signal acquired by the modulation unit PROD_A2. The image coding device 11 described above is used as the coding unit PROD_A1.

The transmission device PROD_A may further include, as resources for supplying a video input to the coding unit PROD_A1, a camera PROD_A4 that images a video, a recording medium PROD_A5 that records a video therein, an input terminal PROD_A6 that inputs a video from outside, and an image processing unit A7 that generates or processes an image. FIG. 33A illustrates the configuration in which the transmission device PROD_A includes all of the above components, but some of these may be omitted.

The recording medium PROD_A5 may recode the video not coded, or the video coded using a coding scheme for recording different from the coding scheme for transmission. In the latter case, a decoding unit (not illustrated) which decodes the coded data read out from the recording medium PROD_A5 in accordance with the coding scheme for recording may be provided between the recording medium PROD_A5 and the coding unit PROD_A1.

FIG. 33B is a block diagram illustrating a configuration of a reception device PROD_B equipped with the image decoding device 31. As illustrated in FIG. 33B, the reception device PROD_B includes a receiver PROD_B1 that receives a modulated signal, a demodulation unit PROD_B2 that demodulate the modulated signal received by the receiver PROD_B1 to acquire coded data, and a decoding unit PROD_B3 that decodes the coded data acquired by the demodulation unit PROD_B2 to acquire a video. The image decoding device 31 described above is used as the decoding unit PROD_B3.

The reception device PROD_B may further include, as supply destinations of the video output by the decoding unit PROD_B3, a display PROD_B4 that displays the video, a recording medium PROD_B5 that records the video, and an output terminal PROD_B6 that outputs the video to outside. FIG. 33B illustrates the configuration in which the reception device PROD_B includes all of the above components, but some of these may be omitted.

The recording medium PROD_B5 may be configured to recode the video not coded, or the video coded using a coding scheme for recording different from the coding scheme for transmission. In the latter case, a coding unit (not illustrated) which codes the video acquired from the decoding unit PROD_B3 in accordance with the coding scheme for recording may be provided between the decoding unit PROD_B3 and the recording medium PROD_B5.

A transmission medium for transmitting the modulated signal may be wireless or wired. A transmission aspect of transmitting the modulated signal may be a broadcast (here, referred to a transmission aspect of which transmission destination is not specified in advance), or a communication (here, referred to a transmission aspect of which transmission destination is specified in advance). To be more specific, transmission of the modulated signal may be achieved by any of a radio broadcast, a cable broadcast, a radio communication, and a cable communication.

For example, a broadcast station (such as broadcast facilities)/receiving station (such as a TV set) of digital terrestrial broadcasting is an example of the transmission device PROD_A/reception device PROD_B transmitting and/or receiving the modulated signal on the radio broadcast. A broadcast station (such as broadcast facilities)/receiving station (such as a TV set) of a cable television broadcasting is an example of the transmission device PROD_A/reception device PROD_B transmitting and/or receiving the modulated signal on the cable broadcast.

A server (such as a workstation)/client (such as a TV set, a personal computer, a smartphone) including a Video On Demand (VOD) service or video-sharing service using the Internet is an example of the transmission device PROD_A/reception device PROD_B transmitting and/or receiving the modulated signal on the communication (in general, a wireless or wired transmission medium is used in LAN, and a wired transmission medium is used in WAN). Here, the personal computer includes a desktop PC, laptop PC, and a tablet PC. The smartphone also includes a multifunctional mobile phone terminal.

The video-sharing service client has a function to decode coded data downloaded from the server to display on a display, and a function to code a video imaged by a camera to upload to the server. To be more specific, the video-sharing service client functions as both the transmission device PROD_A and the reception device PROD_B.

Figure 34A:
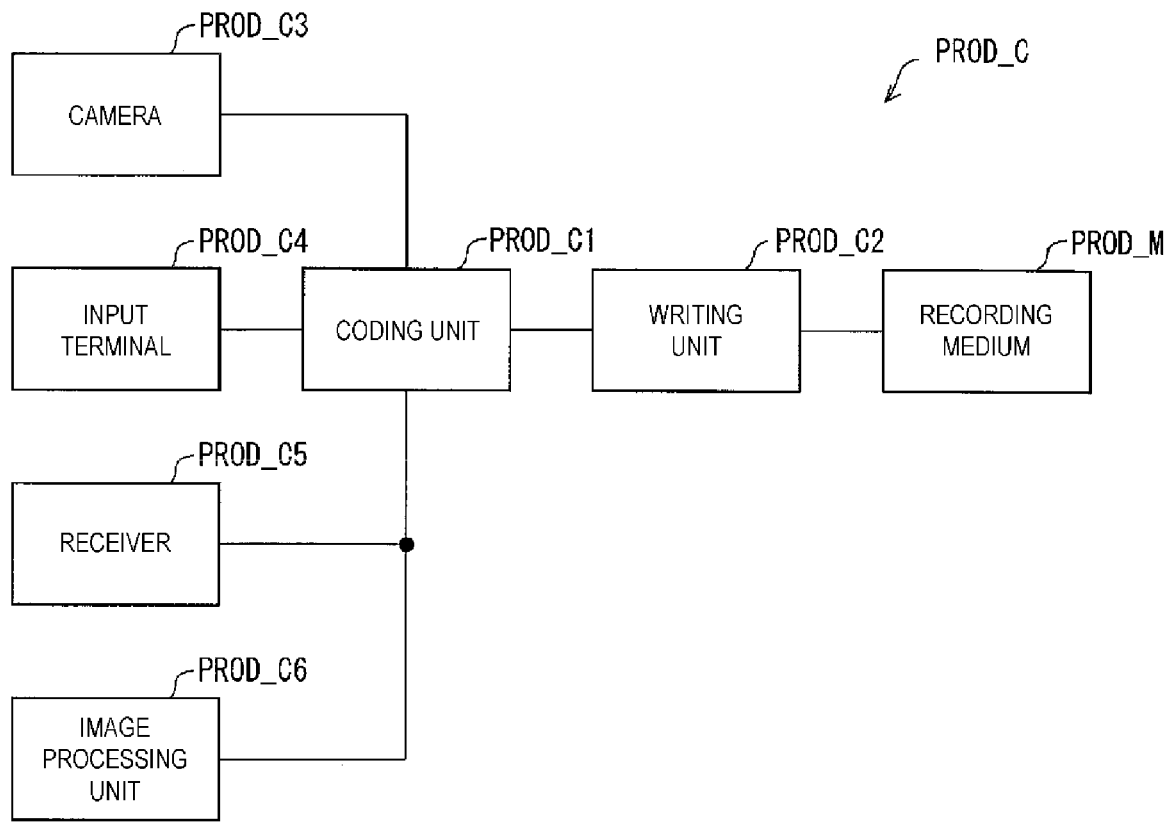
FIGS. 34A and 34B are diagrams illustrating configurations of a recording device equipped with the above image coding device and a reproducing device equipped with the above image decoding device.
Figure 34B:
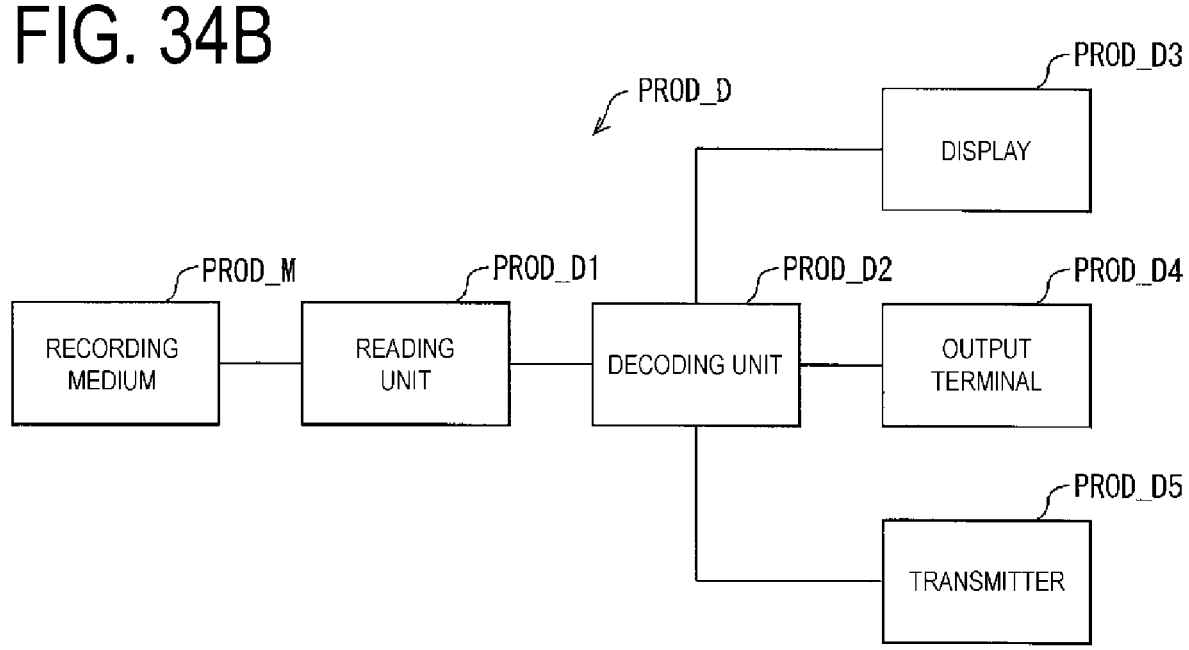

Next, a description is given of that the image coding device 11 and the image decoding device 31 described above can be used to record and reproduce the video with reference to FIGS. 34A and 34B.

FIG. 34A is a block diagram illustrating a configuration of a recording device PROD_C equipped with the image coding device 11 described above. As illustrated in FIG. 34A, the recording device PROD_C includes a coding unit PROD_C1 that codes a video to acquire coded data, and a writing unit PROD_C2 that writes the coded data acquired by the coding unit PROD_C1 into a recording medium PROD_M. The image coding device 11 described above is used as the coding unit PROD_C1.

The recording medium PROD_M may be (1) of a type that is built in the recording device PROD_C such as a Hard Disk Drive (HDD) and a Solid State Drive (SSD), (2) of a type that is connected with the recording device PROD_C such as an SD memory card and a Universal Serial Bus (USB) flash memory, or (3) of a type that is loaded into a drive device (not illustrated) built in the recording device PROD_C such as a Digital Versatile Disc (DVD) and a Blu-ray Disc (registered trademark) (BD).

The recording device PROD_C may further include, as resources for supplying a video input to the coding unit PROD_C1, a camera PROD_C3 that images a video, an input terminal PROD_C4 that inputs a video from outside, a receiver PROD_C5 that receives a video, and an image processing unit C6 that generates or processes an image. FIG. 34A illustrates the configuration in which the recording device PROD_C includes all of the above components, but some of these may be omitted.

The receiver PROD_C5 may receive the video not coded, or the coded data coded using a coding scheme for transmission different from the coding scheme for recording. In the latter case, a decoding unit for transmission (not illustrated) which decodes the coded data coded using the coding scheme for transmission may be provided between the receiver PROD_C5 and the coding unit PROD_C1.

Examples of the recording device PROD_C like this include a DVD recorder, a BD recorder, and a Hard Disk Drive (HDD) recorder (in this case, the input terminal PROD_C4 or the receiver PROD_C5 is mainly the resource for supplying the video). A camcorder (in this case, the camera PROD_C3 is mainly the resource for supplying the video), a personal computer (in this case, the receiver PROD_C5 or the image processing unit C6 is mainly the resource for supplying the video), and a smartphone (in this case, the camera PROD_C3 or the receiver PROD_C5 is mainly the resource for supplying the video) are also included in the examples of the recording device PROD_C like this.

FIG. 34B is a block diagram illustrating a configuration of a reproducing device PROD_D equipped with the image decoding device 31. As illustrated in FIG. 34B, the reproducing device PROD_D includes a reading unit PROD_D1 that reads out coded data written into the recording medium PROD_M, and a decoding unit PROD_D2 that decodes the coded data read out by the reading unit PROD_D1 to acquire a video. The image decoding device 31 described above is used as the decoding unit PROD_D2.

The recording medium PROD_M may be (1) of a type that is built in the reproducing device PROD_D such as an HDD and an SSD, (2) of a type that is connected with the reproducing device PROD_D such as an SD memory card and a USB flash memory, or (3) of a type that is loaded into a drive device (not illustrated) built in the reproducing device PROD_D such as a DVD and a BD.

The reproducing device PROD_D may further include, as supply destinations of the video output by the decoding unit PROD_D2, a display PROD_D3 that displays the video, an output terminal PROD_D4 that outputs the video from outside, and a transmitter PROD_D5 that transmits the video. FIG. 34B illustrates the configuration in which the reproducing device PROD_D includes all of the above components, but some of these may be omitted.

The transmitter PROD_D5 may transmit the video not coded, or the coded data coded using a coding scheme for transmission different from the coding scheme for recording. In the latter case, a coding unit (not illustrated) which codes the video using the coding scheme for transmission may be provided between the decoding unit PROD_D2 and the transmitter PROD_D5.

Examples of the reproducing device PROD_D like this include a DVD player, a BD player, and an HDD player (in this case, the output terminal PROD_D4 connected with a TV set or the like is mainly the supply destination of the video). A TV set (in this case, the display PROD_D3 is mainly the supply destination of the video), a digital signage (also referred to as an electronic signage or an electronic bulletin board, and the display PROD_D3 or the transmitter PROD_D5 is mainly the supply destination of the video), a desktop PC (in this case, the output terminal PROD_D4 or the transmitter PROD_D5 is mainly the supply destination of the video), a laptop or tablet PC (in this case, the display PROD_D3 or the transmitter PROD_D5 is mainly the supply destination of the video), and a smartphone (in this case, the display PROD_D3 or the transmitter PROD_D5 is mainly the supply destination of the video) are also included in the examples of the reproducing device PROD_D like this.

(Hardware Implementation and Software Implementation)

The blocks in the image decoding device 31 and the image coding device 11 described above may be implemented by hardware using a logic circuit formed on an integrated circuit (IC chip), or by software using a Central Processing Unit (CPU).

In the latter case, the above-described devices include a CPU to execute commands of a program for achieving the functions, a Read Only Memory (ROM) to store the program, a Random Access Memory (RAM) to load the program, and a storage device (storage medium) such as a memory to store the program and various types of data. The object of the disclosure can be attained by that software realizing the functions described above that is a program code of a control program for the above respective devices (executable program, intermediate code program, source program) is recoded in a recording medium in a computer-readable manner, the recording medium is supplied to the above respective devices, and the computer (or the CPU or MPU) reads out the program code recorded in the recording medium for execution.

Examples of the above-described recording medium to use include tapes such as a magnetic tape and a cassette tape, disks or discs including a magnetic disk such as a floppy (trade name) disk/hard disk or an optical disc such as a Compact Disc Read-Only Memory (CD-ROM)/Magneto-Optical (MO) disc/Mini Disc (MD)/Digital Versatile Disc (DVD)/CD Recordable (CD-R)/Blu-ray Disc (trade name), cards such as an IC card (including a memory card)/optical card, semiconductor memories such as a mask ROM/Erasable Programmable Read-Only Memory (EPROM)/Electrically Erasable and Programmable Read-Only Memory (EEPROM: trade name)/flash ROM, or logic circuits such as a Programmable logic device (PLD) and a Field Programmable Gate Array (FPGA).

The above-described devices may be configured to be connectable with a communication network to be supplied with the above-described program code through the communication network. This communication network is not specifically limited so long as the program code can be transmitted. For example, the Internet, an intranet, an extranet, a Local Area Network (LAN), an Integrated Services Digital Network (ISDN), a Value-Added Network (VAN), a Community Antenna television/Cable Television (CATV) communication network, a Virtual Private Network, a telephone network, a mobile communication network, a satellite communication network and the like are available. Transmission media constituting this communication network are not limited to a specific configuration or type so long as the program code can be transmitted. For example, a wired medium such as institute of Electrical and Electronic Engineers (IEEE) 1394, a USB, a power-line carrier, a cable TV line, a telephone line, and an Asymmetric Digital Subscriber Line (ADSL), or a wireless medium such as an infrared-ray including Infrared Data Association (IrDA) and a remote controller, Bluetooth (trade name), IEEE 802.11 wireless communication, High Data Rate (HDR), Near Field Communication (NFC), Digital Living Network Alliance (registered trademark) (DLNA), a mobile telephone network, a satellite circuit, and a digital terrestrial network are also available. The disclosure may also be implemented in a form of a computer data signal embedded in a carrier wave in which the above-described program code is embodied by electronic transmission.

The disclosure is not limited to the above described embodiments, and can be variously modified within a scope of the claims. To be more specific, embodiments made by combining technical means which are adequately modified within the scope of the claims are also included in the scope of an embodiment of the disclosure.

CROSS-REFERENCE OF RELATED APPLICATION

This application claims priority based on JP 2016-017444 filed in Japan on Feb. 1, 2016, the contents of which are entirely incorporated herein by reference.

INDUSTRIAL APPLICABILITY

The disclosure can be preferably applied to an image decoding device that decodes coded data in which an image data is coded and an image coding device that generates coded data in which an image data is coded. The disclosure can be also preferably applied to a data structure of the coded data which is generated by the image coding device and referred to by the image decoding device.

REFERENCE NUMERALS LIST

11 Image coding device (video coding device)
31 Image decoding device (video decoding device)
302 Prediction parameter decoding unit (prediction image generation device)
303 Inter-prediction parameter decoding unit (motion vector derivation unit)
308 Prediction image generation unit (prediction image generation device)
3031 inter-prediction parameter decoding control unit (motion vector derivation unit)
30912 Compensation filter unit (filter unit)

The invention claimed is:

1. A prediction image generation device for generating a prediction image, the prediction image generation device comprising:
   a parameter decoding circuitry that decodes a flag specifying an accuracy of a motion vector, in a case that a difference motion vector is other than zero, and that decodes a prediction motion vector index; and
   a motion vector derivation circuitry that derives a motion vector by using a sum of prediction motion vector and a modified difference motion vector, wherein
   the parameter decoding circuitry determines a shift value according to a value of the flag,
   the modified difference motion vector is derived by left shifting the difference motion vector by the shift value,
   the prediction motion vector is derived by using a rounded motion vector, which is derived by performing a rounding process on a motion vector in neighbouring blocks by using the shift value, and
   the prediction motion vector is selected from a motion vector prediction list by using the prediction motion vector index.

2. The prediction image generation device of claim 1, further comprising:
   a vector candidate selection circuitry that derives an offset value by using a value obtained by right shifting one by the shift value minus one,
   wherein
   the rounding process includes a process in which to right shift a sum of the offset value and the motion vector by the shift value, and then left shifting the right shifted sum by the shift value.

3. A prediction image generation device for generating a prediction image, the prediction image generation device comprising:
   a parameter decoding circuitry that decodes a flag specifying an accuracy of a motion vector; and
   a motion vector derivation circuitry that derives a motion vector by using a sum of a modified difference motion vector and a prediction motion vector, wherein:
   the parameter decoding circuitry determines a shift value by using a quantization step size for the motion vector,
   the modified difference motion vector is derived by left shifting a difference motion vector by the shift value,
   the prediction motion vector is derived by using a rounded motion vector, which is derived by performing a rounding process to a motion vector in neighbouring blocks by using the shift value, and
   the prediction motion vector is selected from a motion vector prediction list by using a prediction motion vector index.

4. A prediction image generation device for generating a prediction image, the prediction image generation device comprising:
   a parameter decoding circuitry that decodes a flag specifying an accuracy of a motion vector; and
   a motion vector derivation circuitry that derives a motion vector by using a sum of a modified difference motion vector and a prediction motion vector, wherein:
   the parameter decoding circuitry determines a shift value by using a difference motion vector parsed,
   the modified difference motion vector is derived by left shifting the difference motion vector by the shift value,
   the prediction motion vector is derived by using a rounded motion vector, which is derived by performing a rounding process to a motion vector in neighbouring blocks by using the shift value, and
   the prediction motion vector is selected from a motion vector prediction list by using a prediction motion vector index.

5. A video decoding device comprising:
   the prediction image generation device of claim 1, wherein
   the video decoding device decodes a coding target image by adding a residual image to the prediction image or subtracting the residual image from the prediction image.

6. A video coding device comprising:
   the prediction image generation device of claim 1, wherein
   the video coding device codes a residual of the prediction image and a coding target image.

7. A prediction image generation method for generating a prediction image, the prediction image generation method comprising:
- decoding a flag specifying an accuracy of a motion vector, in a case that a difference motion vector is other than zero,
- decoding a prediction motion vector index,
- deriving a motion vector by using a sum of a prediction motion vector and a modified difference motion vector, and
- determining a shift value according to a value of the flag, wherein:
- the modified difference motion vector is derived by left shifting the difference motion vector by the shift value,
- the prediction motion vector is derived by using a rounded motion vector, which is derived by performing a rounding process on a motion vector in neighbouring blocks by using the shift value, and
- the prediction motion vector is selected from a motion vector prediction list by using the prediction motion vector index.

* * * * *